(12) United States Patent
Campos et al.

(10) Patent No.: US 11,476,949 B2
(45) Date of Patent: Oct. 18, 2022

(54) SYSTEMS AND METHODS FOR COHERENT OPTICS IN AN ACCESS NETWORK

(71) Applicant: CABLE TELEVISION LABORATORIES, INC, Louisville, CO (US)

(72) Inventors: Luis Alberto Campos, Superior, CO (US); Zhensheng Jia, Superior, CO (US); Matthew D. Schmitt, Pleasanton, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/370,873

(22) Filed: Mar. 29, 2019

(65) Prior Publication Data
US 2019/0305854 A1 Oct. 3, 2019

Related U.S. Application Data

(60) Provisional application No. 62/805,509, filed on Feb. 14, 2019, provisional application No. 62/650,079, filed on Mar. 29, 2018.

(51) Int. Cl.
| | |
|---|---|
| *H04B 10/516* | (2013.01) |
| *H04B 10/61* | (2013.01) |
| *H04B 10/63* | (2013.01) |
| *H04J 14/02* | (2006.01) |
| *H04L 12/28* | (2006.01) |
| *H04B 10/27* | (2013.01) |
| *H04B 10/40* | (2013.01) |
| *H04J 14/06* | (2006.01) |

(52) U.S. Cl.
CPC ............ *H04B 10/63* (2013.01); *H04B 10/27* (2013.01); *H04B 10/40* (2013.01); *H04B 10/516* (2013.01); *H04B 10/61* (2013.01); *H04B 10/616* (2013.01); *H04B 10/6164* (2013.01); *H04J 14/02* (2013.01); *H04J 14/06* (2013.01); *H04L 12/2885* (2013.01)

(58) Field of Classification Search
None
See application file for complete search history.

(56) References Cited

U.S. PATENT DOCUMENTS

| | | | | |
|---|---|---|---|---|
| 7,031,574 B2* | 4/2006 | Huang | ................. | G02B 6/2746 385/21 |
| 7,826,752 B1* | 11/2010 | Zanoni | ............... | H04B 10/5055 398/186 |
| 8,009,985 B1* | 8/2011 | Roberts | ................. | H04L 1/0017 398/47 |
| 8,624,762 B2* | 1/2014 | Rival | .................... | H04J 3/1682 341/100 |
| 10,038,498 B1* | 7/2018 | Fan | ..................... | H04B 10/5053 |
| 10,211,917 B1* | 2/2019 | Wang | .................... | H04B 10/032 |
| 10,374,702 B1* | 8/2019 | Yue | .................. | H04B 10/07953 |
| 10,374,722 B2* | 8/2019 | Huang | ................. | H04J 14/005 |

(Continued)

*Primary Examiner* — Li Liu
(74) *Attorney, Agent, or Firm* — Armstrong Teasdale LLP

(57) ABSTRACT

A communication network includes a coherent optics transmitter, a coherent optics receiver, an optical transport medium operably coupling the coherent optics transmitter to the coherent optics receiver, and a coherent optics interface. The coherent optics interface includes a lineside interface portion, a clientside interface portion, and a control interface portion.

14 Claims, 24 Drawing Sheets

(56) References Cited

U.S. PATENT DOCUMENTS

| | | | |
|---|---|---|---|
| 2003/0231887 A1* | 12/2003 | Grassi | H04B 10/1127 398/130 |
| 2007/0233906 A1* | 10/2007 | Tatum | G09G 5/003 710/26 |
| 2008/0239448 A1* | 10/2008 | Tanaka | G02F 1/2255 359/245 |
| 2009/0116851 A1* | 5/2009 | Heffner | H04B 10/677 398/208 |
| 2009/0154491 A1* | 6/2009 | Diab | H04L 5/1446 370/465 |
| 2009/0196602 A1* | 8/2009 | Saunders | H04B 10/5053 398/26 |
| 2009/0245795 A1* | 10/2009 | Joyner | H04B 10/505 398/79 |
| 2010/0021166 A1* | 1/2010 | Way | H04J 14/02 398/79 |
| 2011/0229149 A1* | 9/2011 | Grubb | H04B 10/506 398/188 |
| 2012/0266051 A1* | 10/2012 | Farhoodfar | H03M 13/2918 714/782 |
| 2014/0195878 A1* | 7/2014 | Razzetti | H04B 10/6165 714/776 |
| 2014/0328587 A1* | 11/2014 | Magri | H04L 45/62 398/26 |
| 2014/0328588 A1* | 11/2014 | Sakai | H04B 10/63 398/38 |
| 2015/0043904 A1* | 2/2015 | Boduch | H04B 10/032 398/2 |
| 2016/0105236 A1* | 4/2016 | Zhang | H04B 10/0795 398/152 |
| 2016/0164626 A1* | 6/2016 | Cavaliere | H04L 1/0006 398/183 |
| 2017/0317759 A1* | 11/2017 | Agazzi | H04L 7/0075 |
| 2018/0041280 A1* | 2/2018 | Elahmadi | H04L 1/0045 |
| 2018/0234184 A1* | 8/2018 | Tanimura | H04B 10/2513 |
| 2018/0323871 A1* | 11/2018 | Fan | H04B 10/50 |
| 2019/0052392 A1* | 2/2019 | DeAndrea | H04J 14/0212 |
| 2019/0104078 A1* | 4/2019 | Kachrani | H04L 47/32 |
| 2019/0132049 A1* | 5/2019 | Cai | H04J 3/1611 |
| 2019/0149245 A1* | 5/2019 | Campos | H04B 10/615 398/212 |
| 2019/0273557 A1* | 9/2019 | Ishikawa | H04B 10/516 |

* cited by examiner

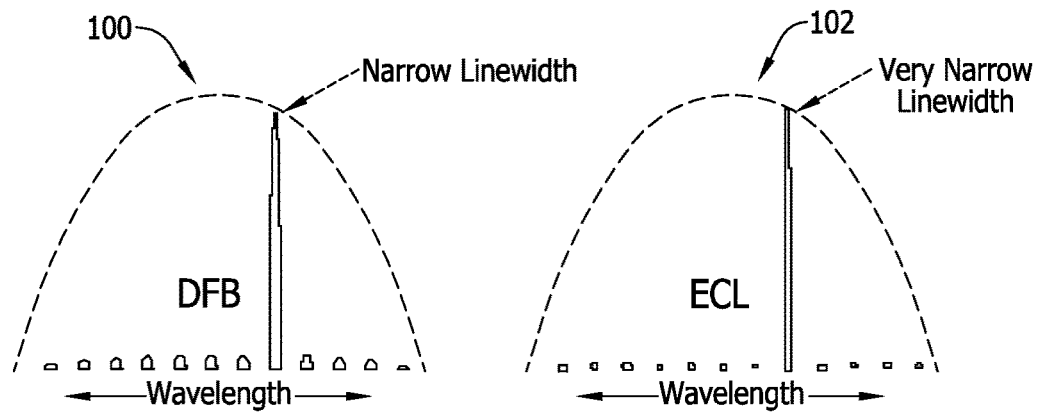
FIG. 1A
FIG. 1B
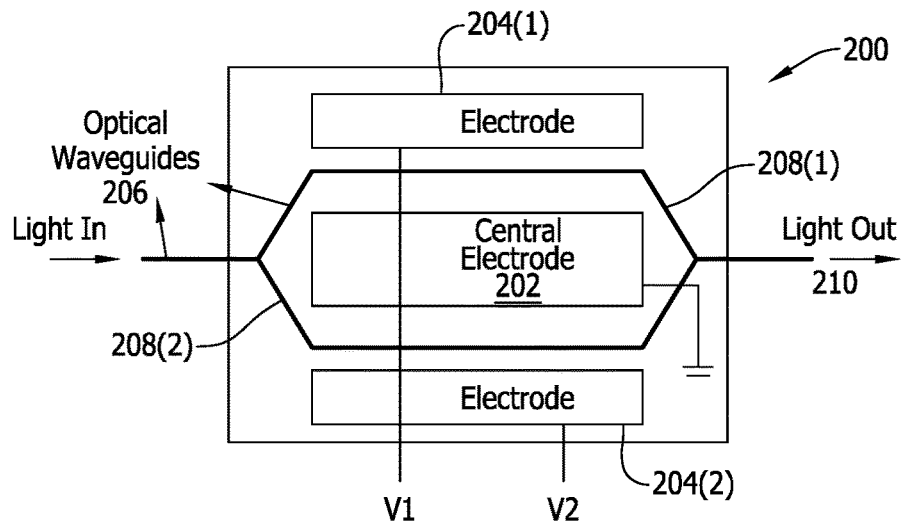
FIG. 2
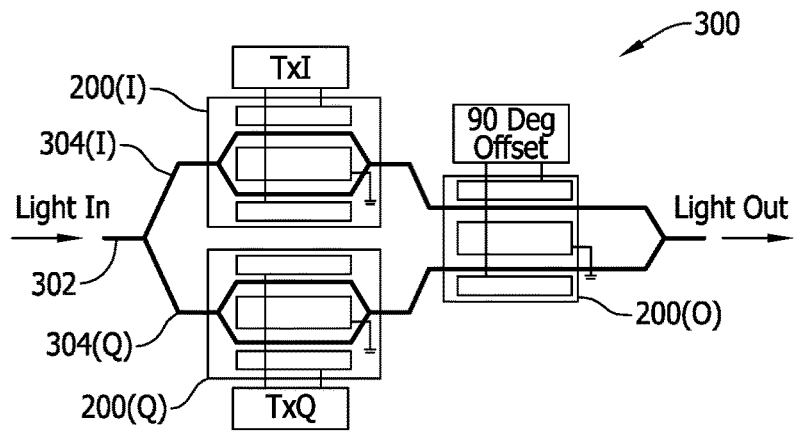
FIG. 3

| 0 1 ... 15<br>16 17 ... 31<br>32...<br>.<br>.<br>.<br>.<br>240 ... 255 | 512...<br>.<br>.<br>.<br>.<br>.<br>.<br>...767 | 1024...<br>.<br>.<br>.<br>.<br>.<br>.<br>...1279 | 1536...<br>.<br>.<br>.<br>.<br>.<br>.<br>...1791 | 2048...<br>.<br>.<br>.<br>.<br>.<br>.<br>...2303 | 2560...<br>.<br>.<br>.<br>.<br>.<br>.<br>...2815 | 3072 3073 ... 3086<br>3087 ... 3101<br>3102 ... 3599<br>.<br>.<br>.<br>.<br>3297 ... 3311 |
|---|---|---|---|---|---|---|
| 256... 271<br>272<br>.<br>.<br>.<br>.<br>496 511 | 768...<br>.<br>.<br>.<br>.<br>.<br>....1023 | 1280...<br>.<br>.<br>.<br>.<br>.<br>....1535 | 1792...<br>.<br>.<br>.<br>.<br>.<br>....2047 | 2304...<br>.<br>.<br>.<br>.<br>.<br>....2559 | 2816...<br>.<br>.<br>.<br>.<br>.<br>....3071 | 3312 ... 3326<br>3327 ...<br>.<br>.<br>.<br>.<br>3537 ... 3551 |

FIG. 36

| 0 1 ... 15<br>16 17 ... 31<br>32...<br>.<br>.<br>.<br>.<br>240 ... 255 | 512...<br>.<br>.<br>.<br>.<br>.<br>.<br>...767 | 1024...<br>.<br>.<br>.<br>.<br>.<br>.<br>...1279 | 1536...<br>.<br>.<br>.<br>.<br>.<br>.<br>...1791 | 2048...<br>.<br>.<br>.<br>.<br>.<br>.<br>...2303 | 2560...<br>.<br>.<br>.<br>.<br>.<br>.<br>...2815 | 3072<br>.<br>.<br>.<br>.<br>.<br>.<br>...3327 | 3584<br>.<br>.<br>.<br>.<br>.<br>.<br>...3839 |
|---|---|---|---|---|---|---|---|
| 256... 271<br>272<br>.<br>.<br>.<br>.<br>496 511 | 768...<br>.<br>.<br>.<br>.<br>.<br>....1023 | 1280...<br>.<br>.<br>.<br>.<br>.<br>....1535 | 1792...<br>.<br>.<br>.<br>.<br>.<br>....2047 | 2304...<br>.<br>.<br>.<br>.<br>.<br>....2559 | 2816...<br>.<br>.<br>.<br>.<br>.<br>....3071 | 3328<br>.<br>.<br>.<br>.<br>.<br>...3583 | 3840<br>.<br>.<br>.<br>.<br>.<br>...4095 |

FIG. 37

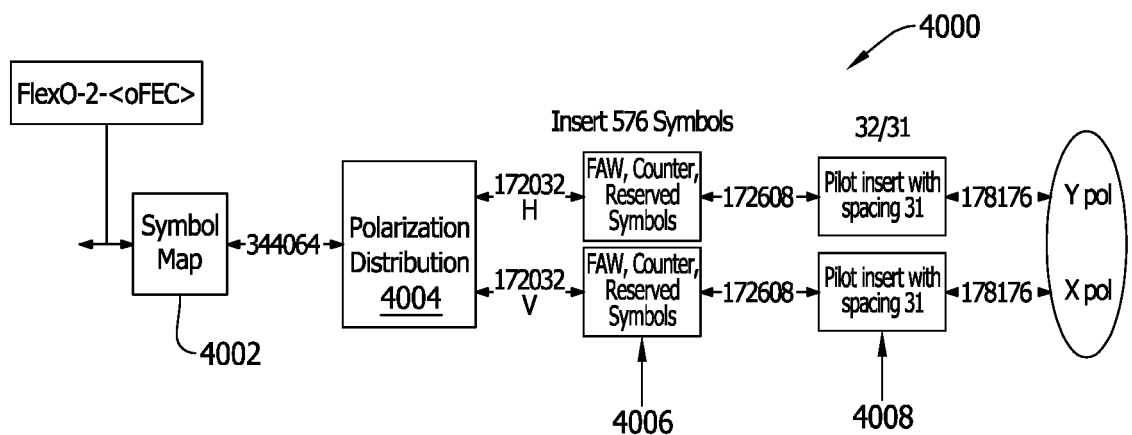
FIG. 40
| Parameter | DP-16-QAM | DP-QPSK |
|---|---|---|
| Mapping 4102 | (16-QAM constellation with outer 4 points filled) | (QPSK constellation) |
| FAW 4106 | Outer 4 points of 16-QAM 22 Symbols | QPSK 22 Symbols |
| Training sequence 4108 | Outer 4 points of 16-QAM 11 symbols per DSP sub-frame | QPSK 11 symbols per DSP sub-frame |
| Pilot symbols 4110 | Outer 4 points of 16-QAM Every 32 symbols | QPSK Every 32 symbols |
FIG. 41
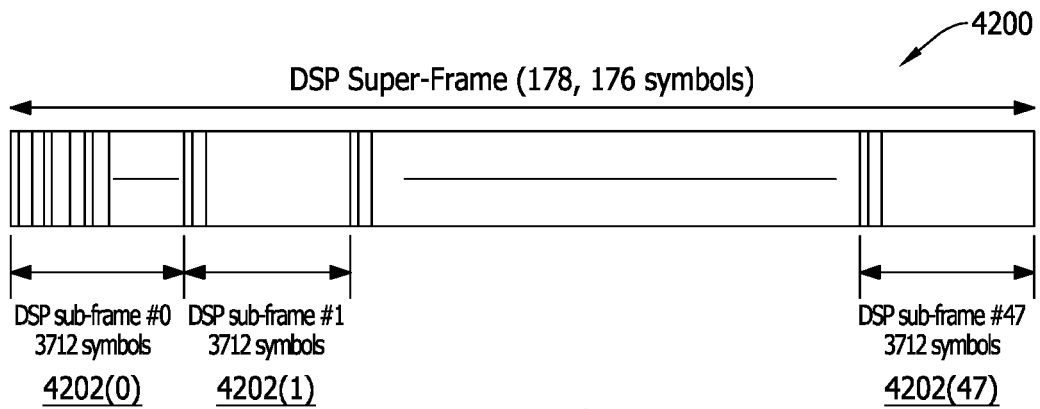
FIG. 42

SYSTEMS AND METHODS FOR COHERENT OPTICS IN AN ACCESS NETWORK

CROSS REFERENCE TO RELATED APPLICATIONS

This application claims the benefit of and priority to U.S. Provisional Patent Application Ser. No. 62/650,079, filed Mar. 29, 2018, and to U.S. Provisional Patent Application Ser. No. 62/805,509, filed Feb. 14, 2019, both of which are incorporated herein by reference in their entireties.

BACKGROUND

The field of the disclosure relates generally to communication networks, and more particularly, to access networks capable of transporting signals according to one or more network protocols.

Most network operators have very limited fiber available between the headend (HE)/hub and the fiber node to use for data and video services, often only just 1-2 fiber strands to serve groups of fiber nodes. With end users demanding more bandwidth to the home, operators need a strategy on how to increase capacity in the access network. One such strategy involves adding more fiber between the HE/hub and the fiber node, but retrenching is costly and time consuming, so return on investment (RoI) considerations make this option unattractive; a solution that more efficiently re-uses the existing infrastructure would be preferred. Accordingly, it has been proposed to use existing infrastructures to meet the bandwidth demand, thereby avoiding retrenching costs, through use of point-to-point (P2P) coherent optics along with wavelength division multiplexing (WDM) in the access network.

Coherent optics technology is becoming common in the subsea, longhaul, and metro networks, but has not yet been applied to access networks due to the relatively high cost of the technology for such applications. However, it is desirable to develop cost-effective coherent optics technology applications for the cable access network because (i) the distances from the HE/hub to the fiber node are much shorter in the access network in comparison with other types of networks, (ii) the access network is always a P2P architecture, and (iii) fixed-wavelength optical passives may be utilized. It is therefore desirable to provide coherent optics systems and methods for the access network realize a larger margin for adding more compact wavelengths, improved resulting signal-to-noise ratios (SNR).

By adapting coherent optics technology to the access network, some of the modules used in other networks (e.g., to conduct distortion compensation, nonlinear compensation, and error correction) may be eliminated, simplified, and/or implemented using components with relaxed requirements, thereby resulting in significant cost savings for a P2P coherent optic link implementation. Additionally, the capabilities, performance, and features of access network transceivers in particular may be further relaxed with respect to optical output power level, transmitter wavelength capability, amount of fiber chromatic dispersion compensation, and transmitter optical-signal-to-noise ratio (OSNR), which would still further lower the design costs and enable use of lower cost components in the access networks.

SUMMARY

In an embodiment, a communication network includes a coherent optics transmitter, a coherent optics receiver, an optical transport medium operably coupling the coherent optics transmitter to the coherent optics receiver, and a coherent optics interface. The coherent optics interface includes a lineside interface portion, a clientside interface portion, and a control interface portion.

BRIEF DESCRIPTION

These and other features, aspects, and advantages of the present disclosure will become better understood when the following detailed description is read with reference to the accompanying drawings in which like characters represent like parts throughout the drawings, wherein:

FIG. 1A depicts an emission spectrum for a distributed feedback laser diode.

FIG. 1B depicts an emission spectrum for an external cavity laser diode.

FIG. 2 is a schematic illustration of an electro-optic modulator.

FIG. 3 is a schematic illustration of an IQ modulator structure utilizing two of the electro-optic modulators depicted in FIG. 2.

Figures 14A, 14B:
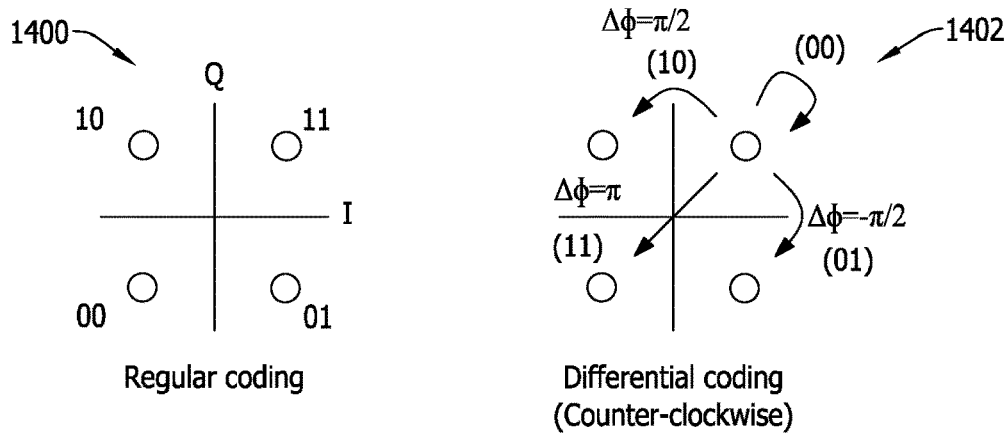

FIGS. 14A-B are graphical illustrations depicting comparative encoding plots.

Figure 15:
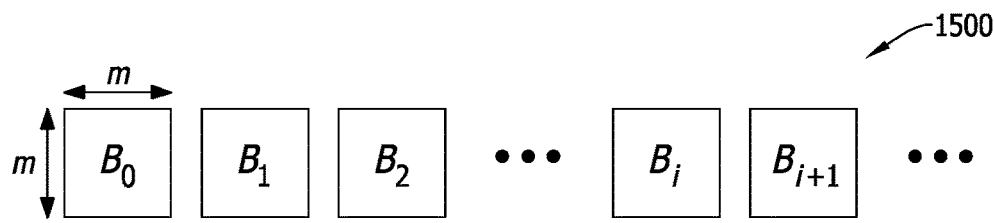

FIG. 15 is a schematic illustration depicting an exemplary symbol stream architecture.

Figure 16:
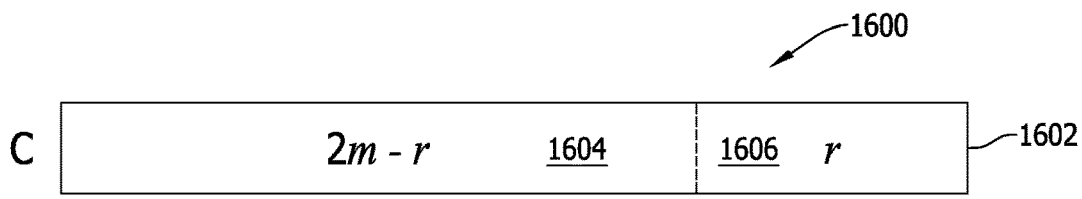

FIG. 16 is a schematic illustration depicting an exemplary codeword architecture.

Figure 17:
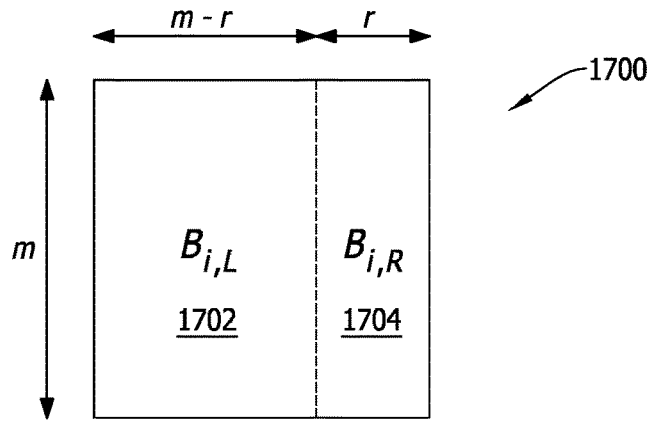

FIG. 17 is a schematic illustration depicting an exemplary block subdivision.

Figure 18:
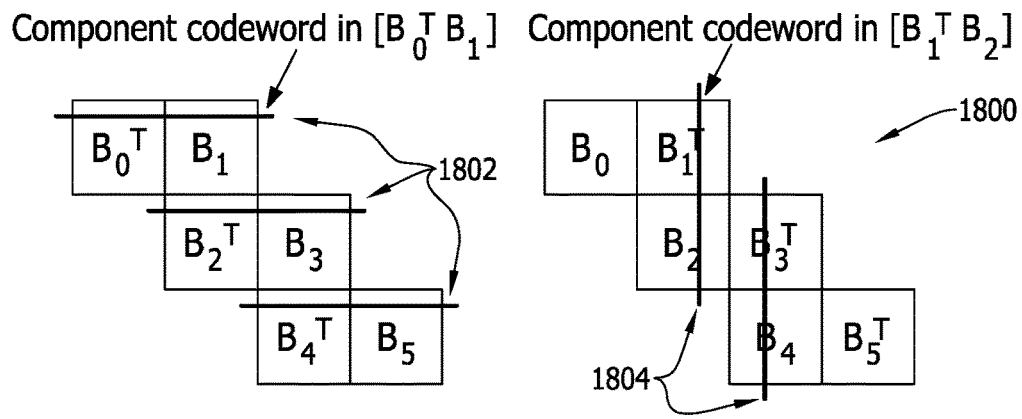

FIG. 18 is a schematic illustration depicting an exemplary staircase coding scheme.

Figure 19:
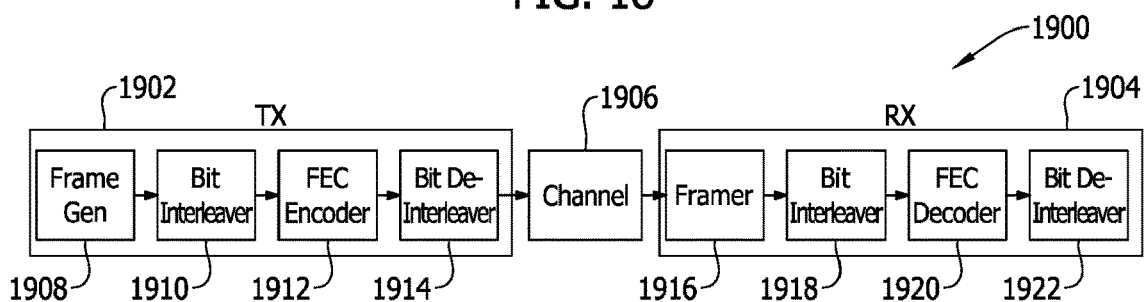

FIG. 19 is a schematic illustration of an exemplary error decorrelator.

Figure 20:
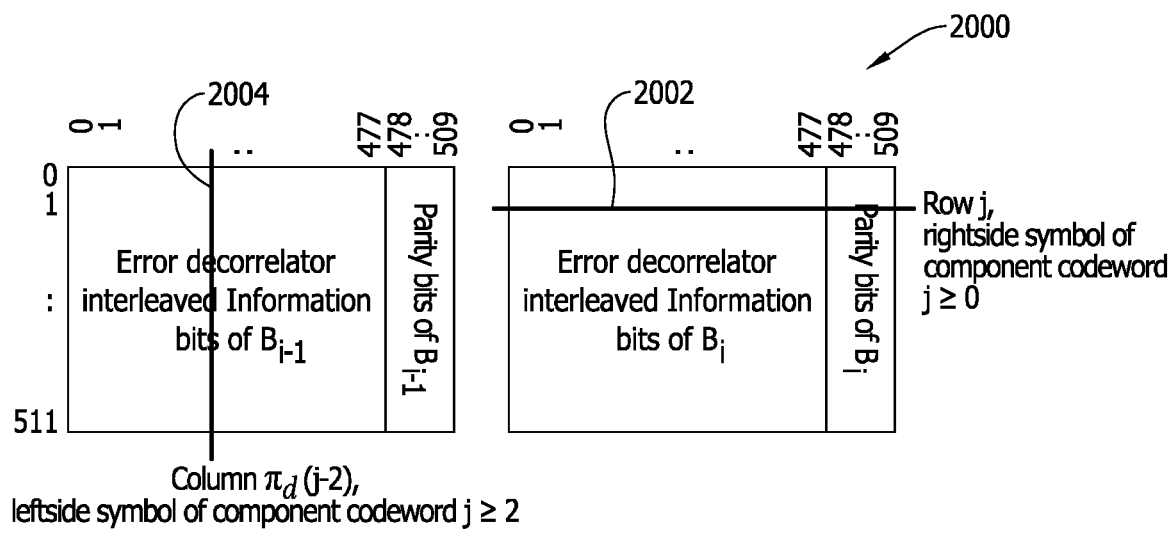

FIG. 20 is a schematic illustration depicting an exemplary staircase code architecture.

Figure 21:
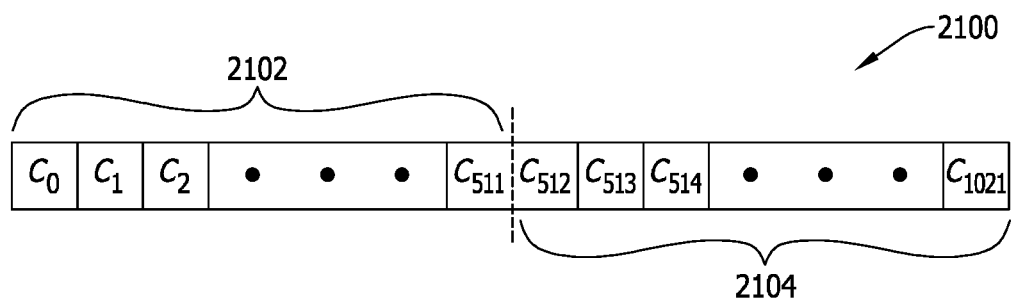

FIG. 21 is a schematic illustration depicting an exemplary component codeword.

Figure 22:
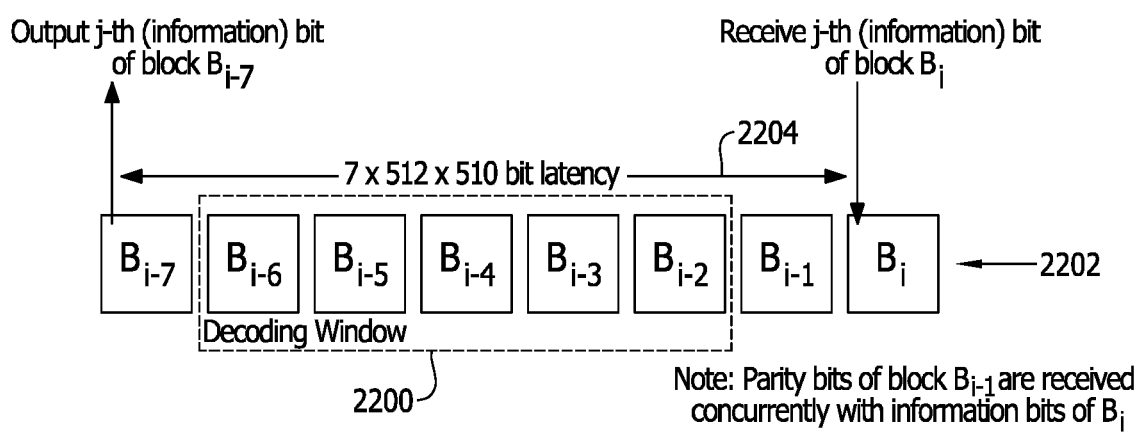

FIG. 22 is a schematic illustration depicting an exemplary staircase decoding window for a series of blocks.

Figure 23:
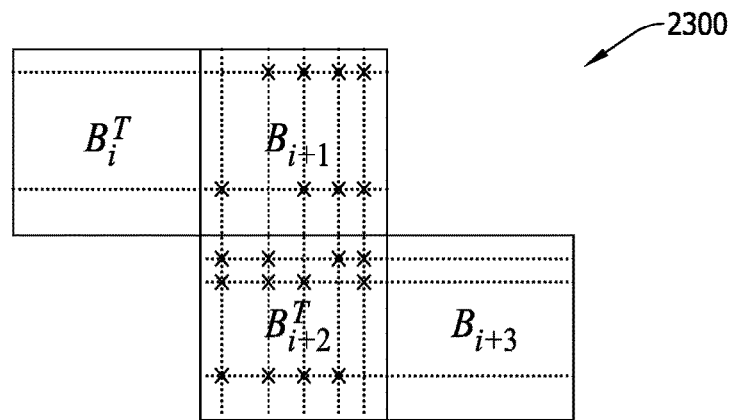

FIG. 23 is a schematic illustration depicting a non-correctable stall error pattern for a staircase coding scheme.

Figure 24:
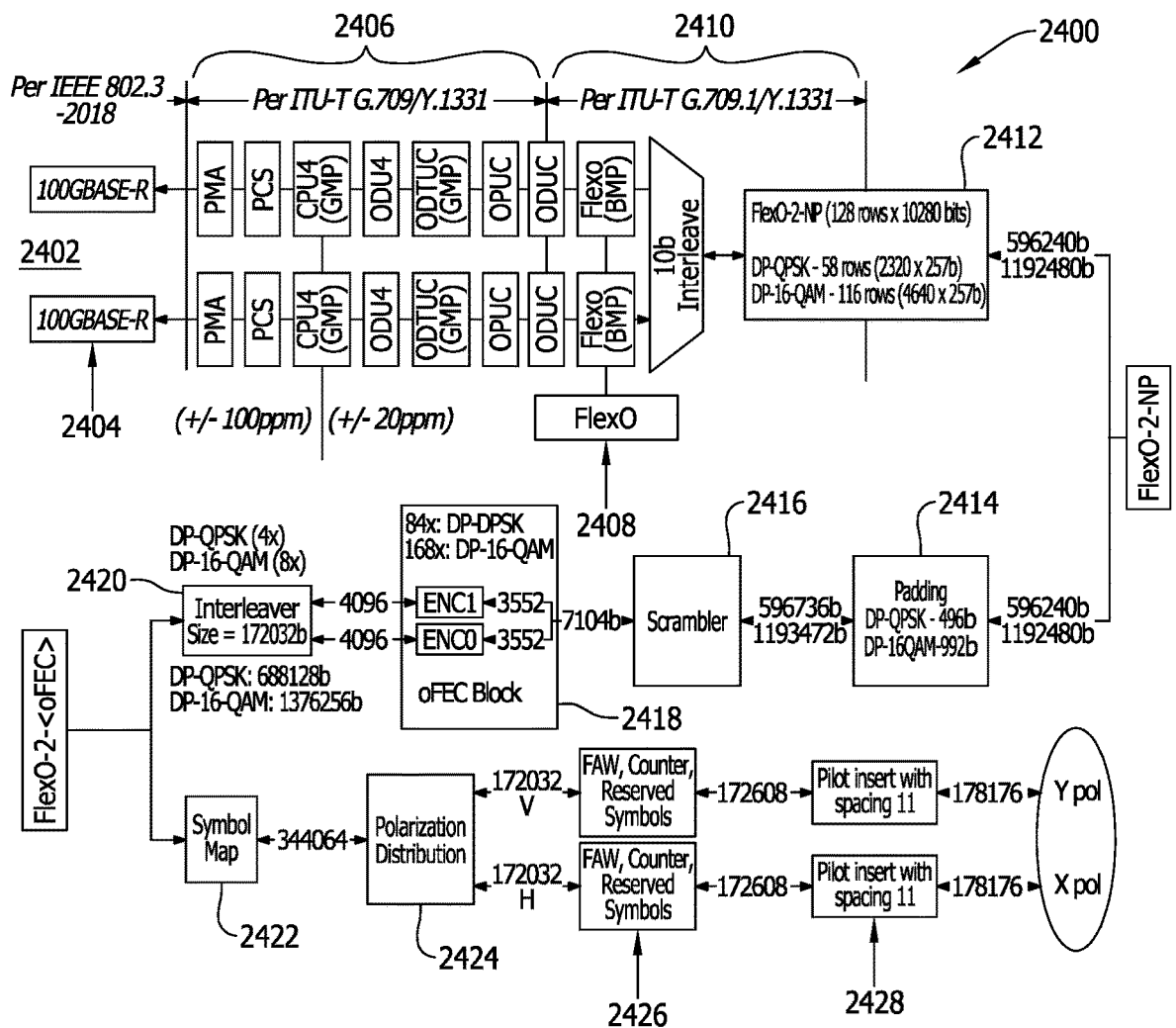

FIG. 24 is a schematic illustration depicting a client side adaptation process.

Figure 25:
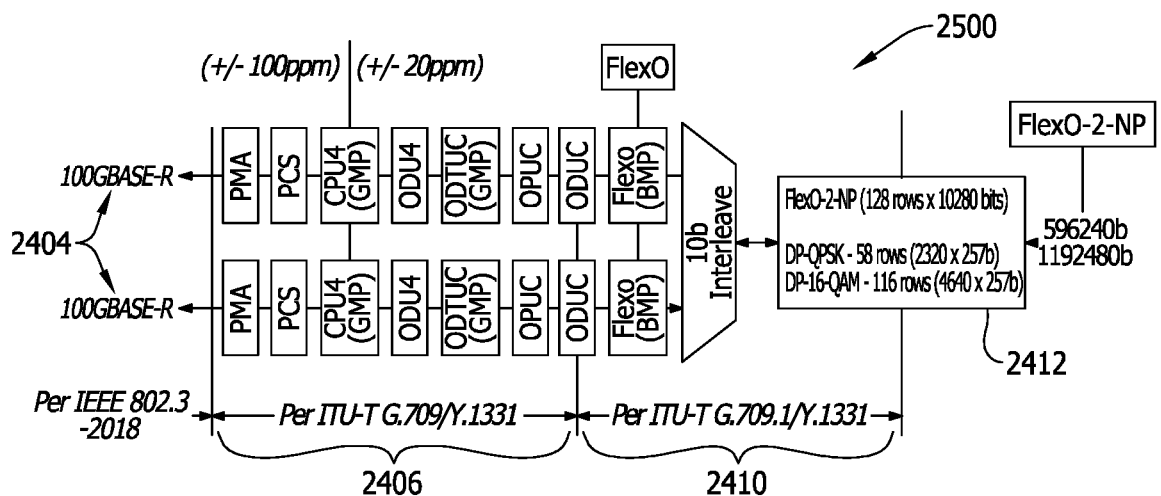

FIG. 25 is a schematic illustration depicting a framing and mapping subprocess of the process depicted in FIG. 24.

Figure 26:
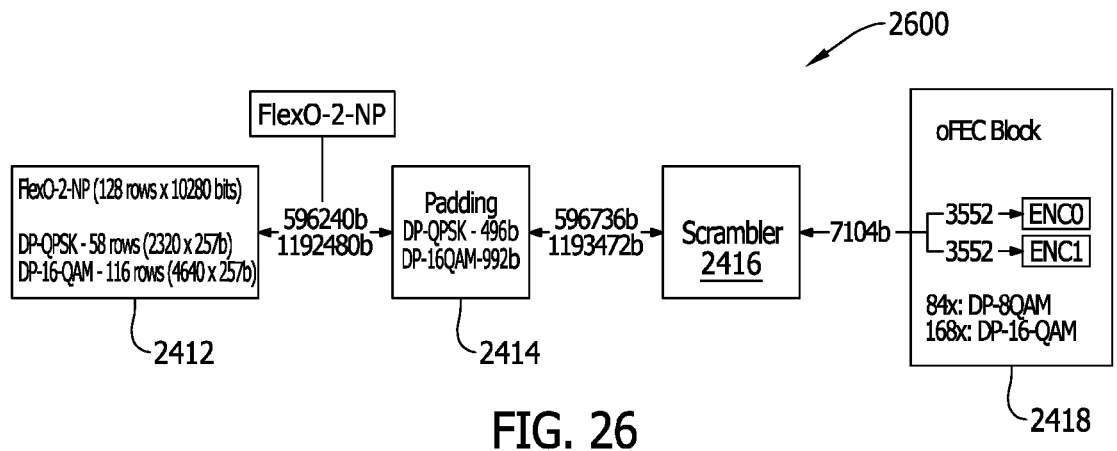

FIG. 26 is a schematic illustration of an encoding subprocess of the process depicted in FIG. 24.

Figure 27:
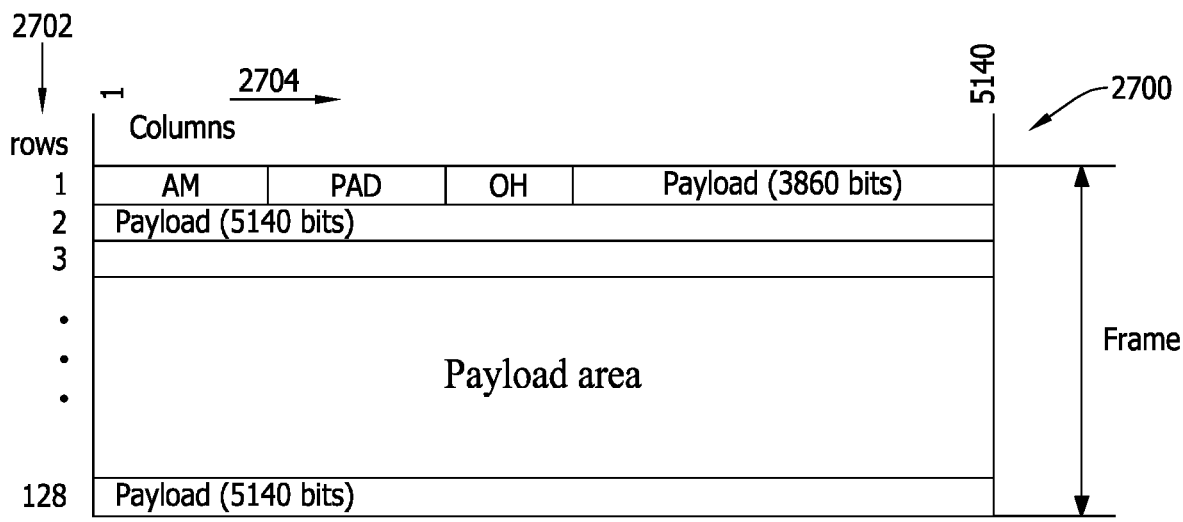

FIG. 27 is a schematic illustration of an exemplary frame structure.

Figure 28:
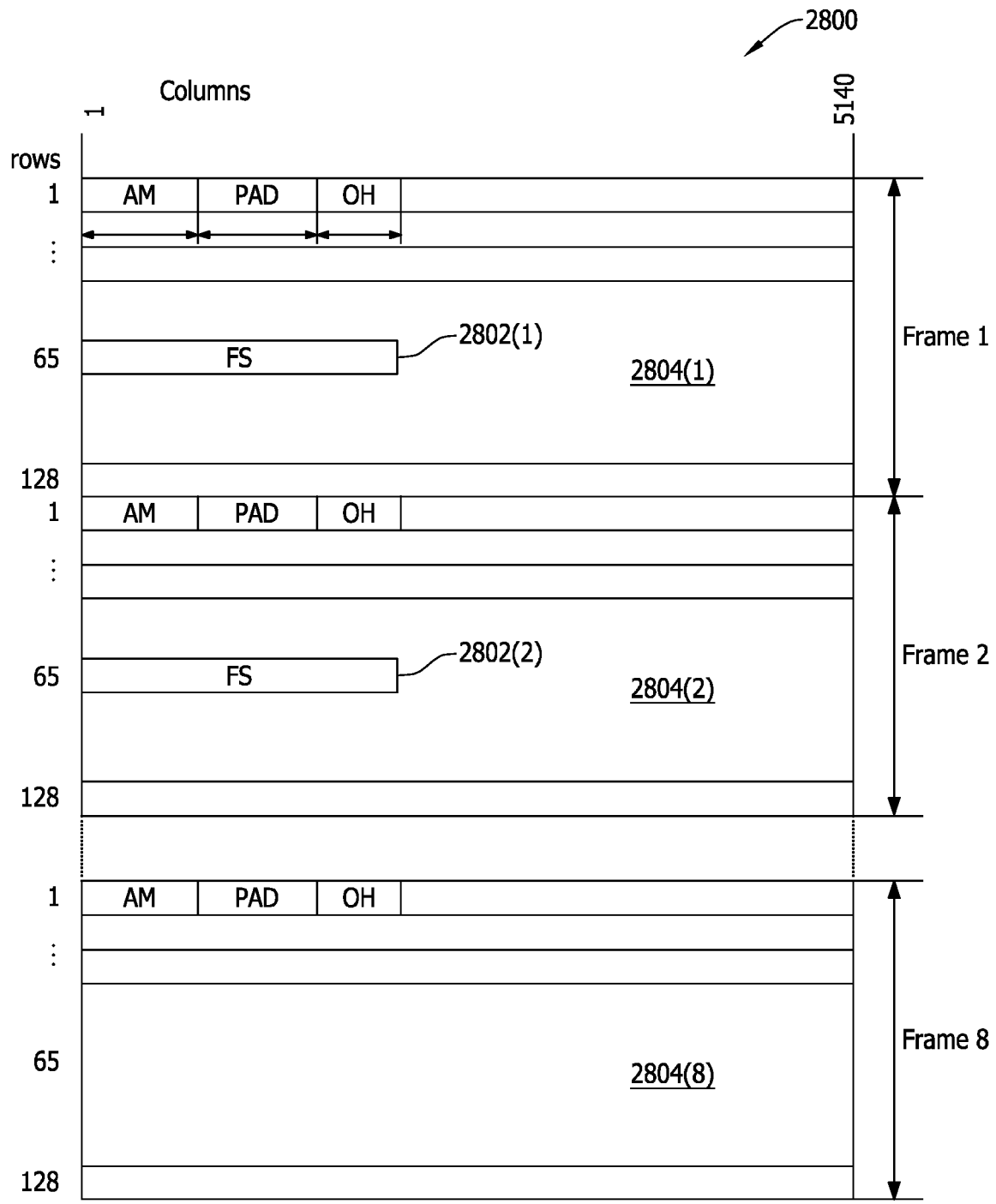

FIG. 28 is a schematic illustration of an exemplary multi-frame format structure.

Figure 29:
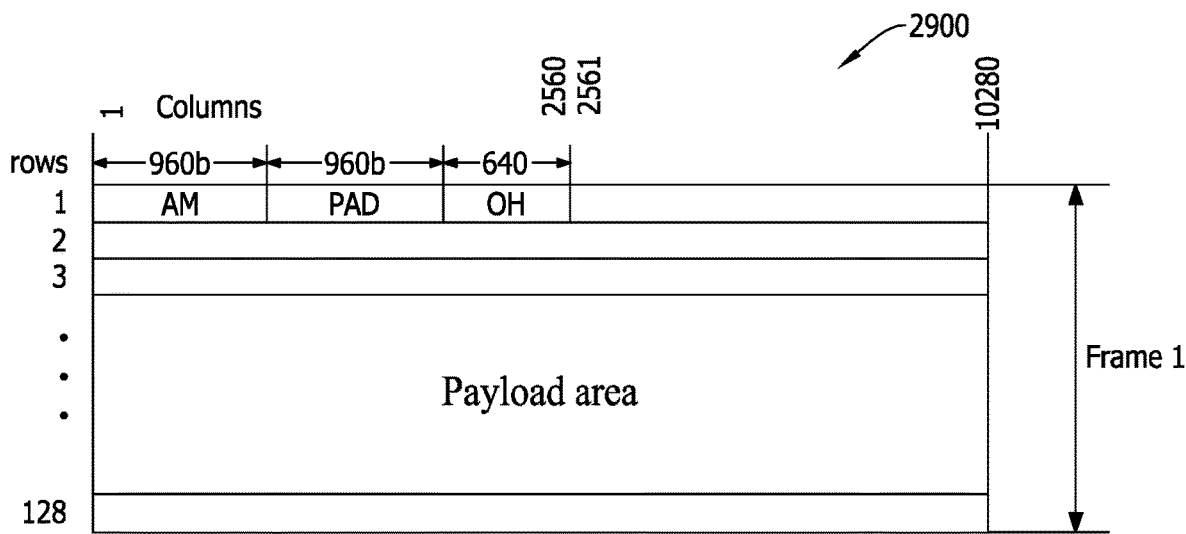

FIG. 29 is a schematic illustration of an exemplary frame structure.

Figure 30:
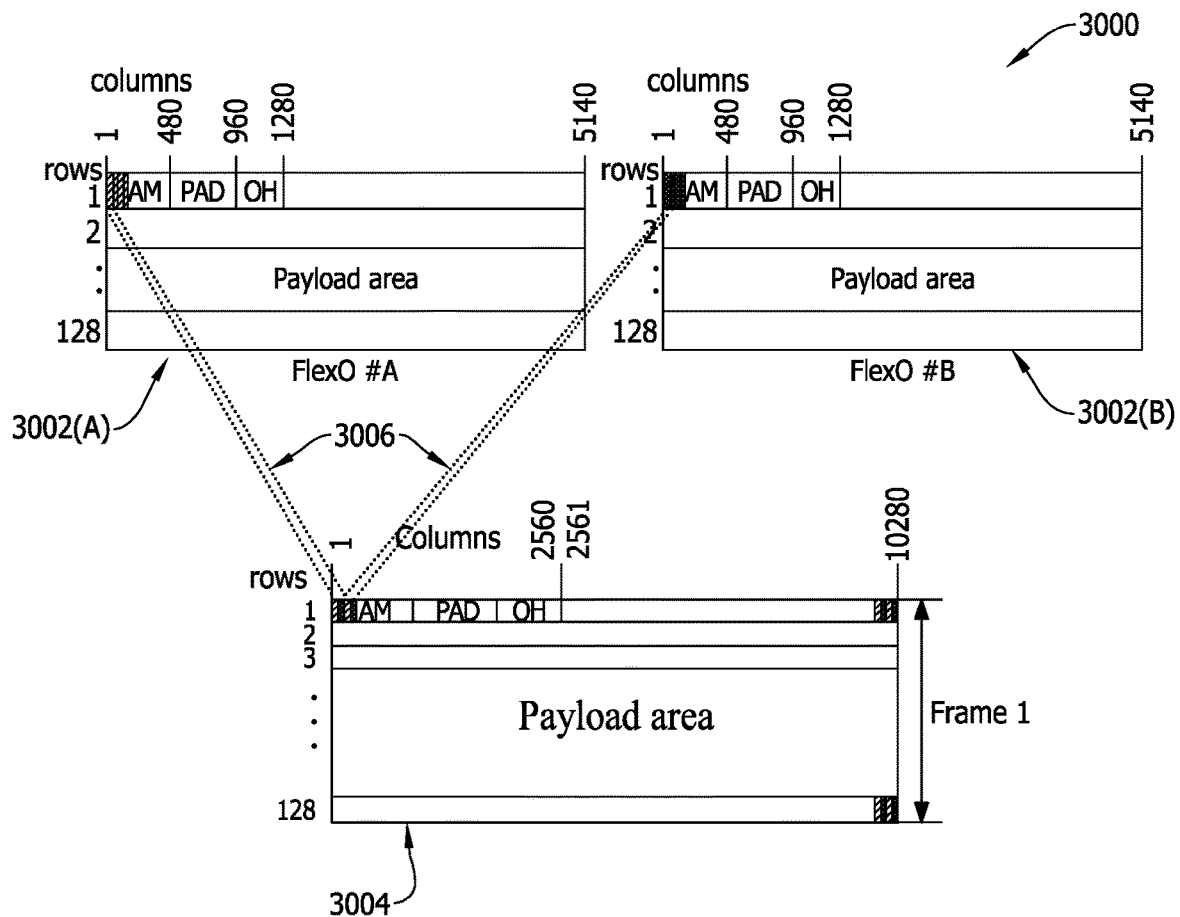

FIG. 30 is a schematic illustration of an exemplary interleaved frame structure.

Figure 31:
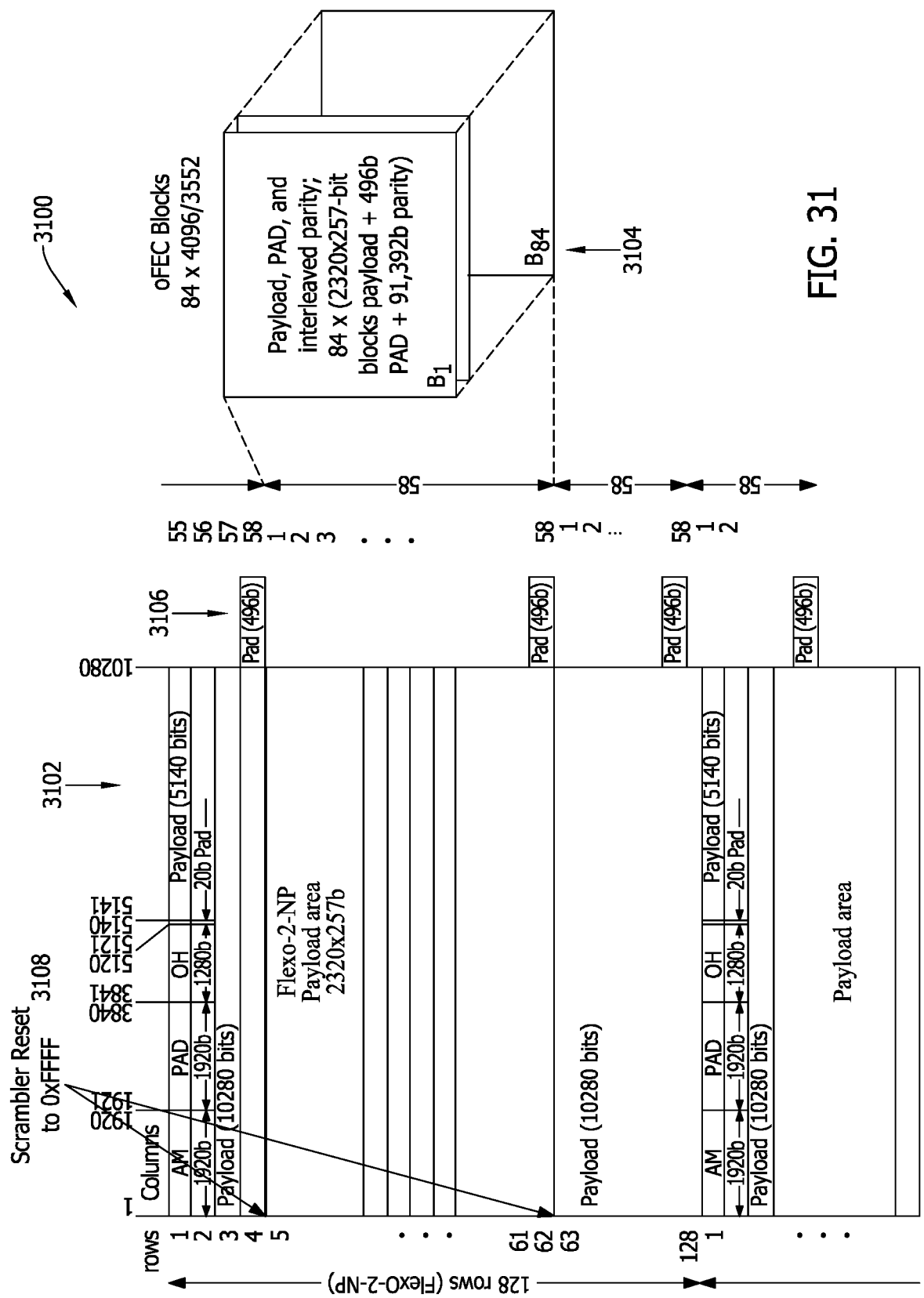

FIG. 31 is a schematic illustration of an exemplary block mapping scheme.

Figure 32:
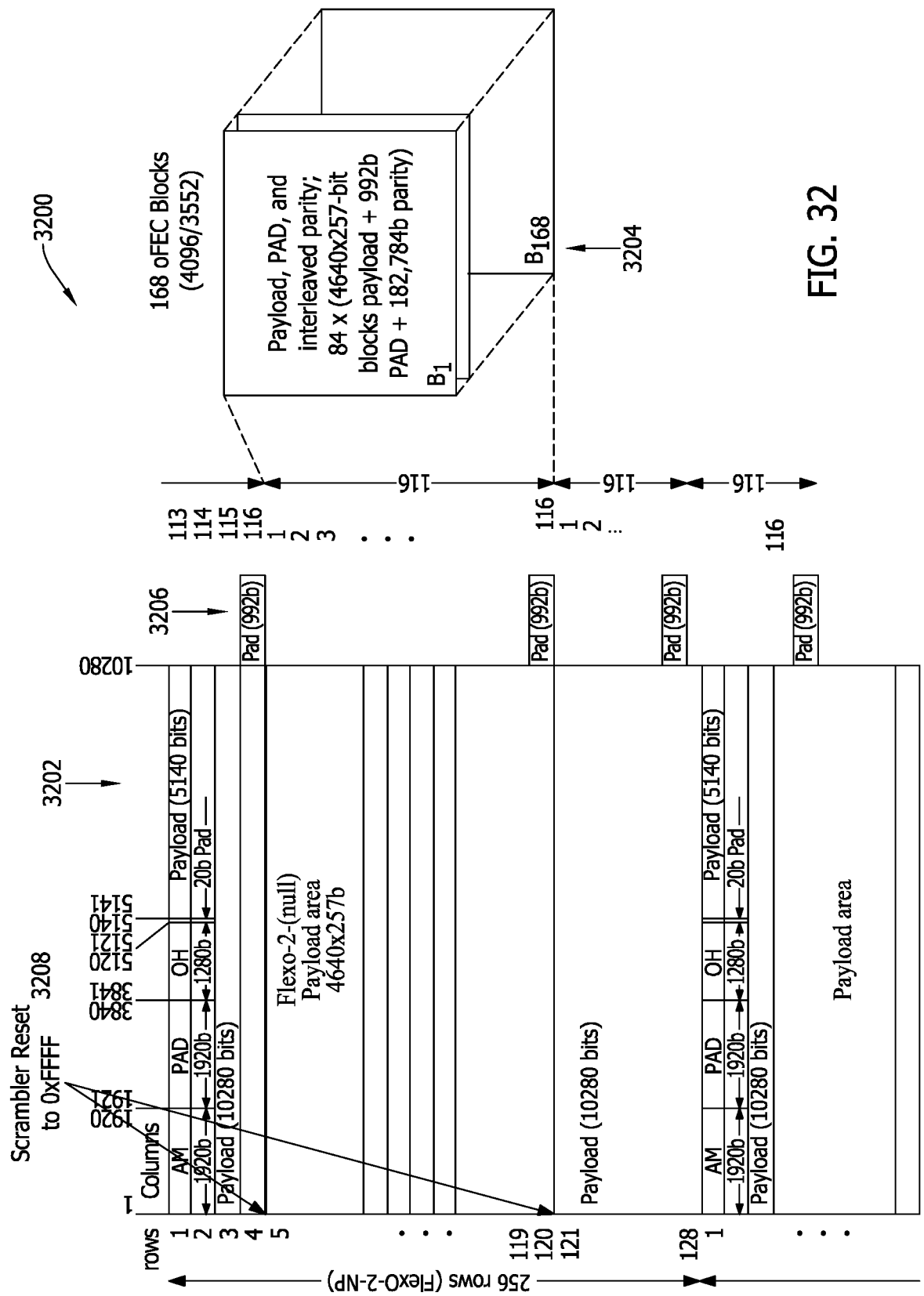

FIG. 32 is a schematic illustration of an exemplary block mapping scheme.

Figure 33:
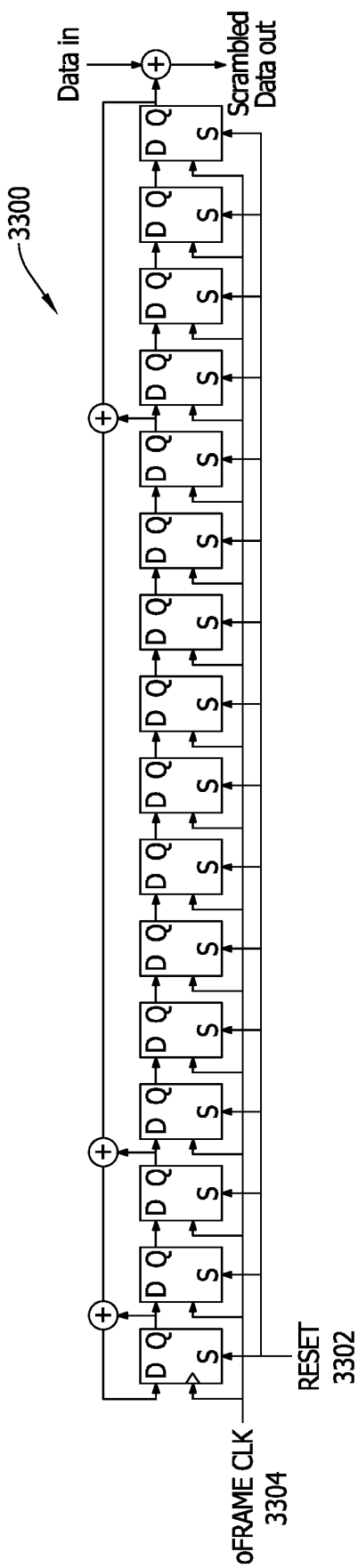

FIG. 33 is a schematic illustration of an exemplary frame synchronous scrambler.

Figure 34:
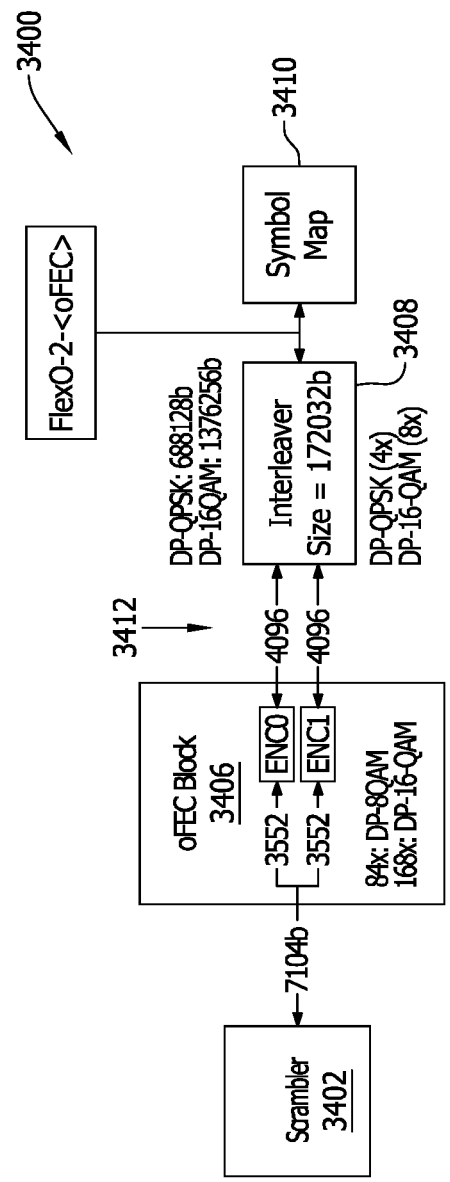

FIG. 34 is a schematic illustration of an exemplary encoding and interleaving unit.

Figure 35:
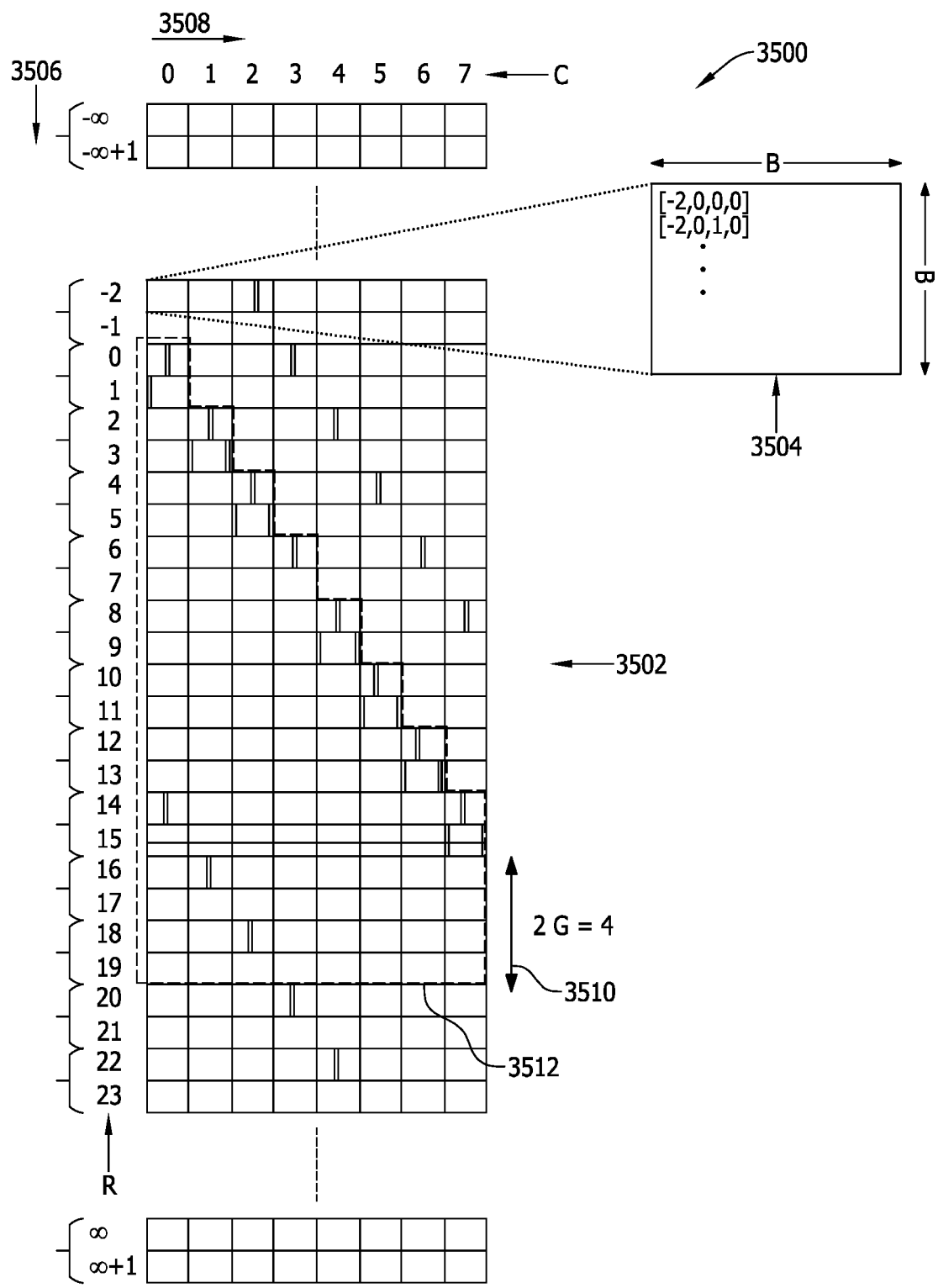

FIG. 35 depicts an exemplary open forward error correction structure.

FIG. 36 depicts an exemplary bit sequencing scheme.

FIG. 37 depicts an exemplary bit numbering scheme.

Figure 38:
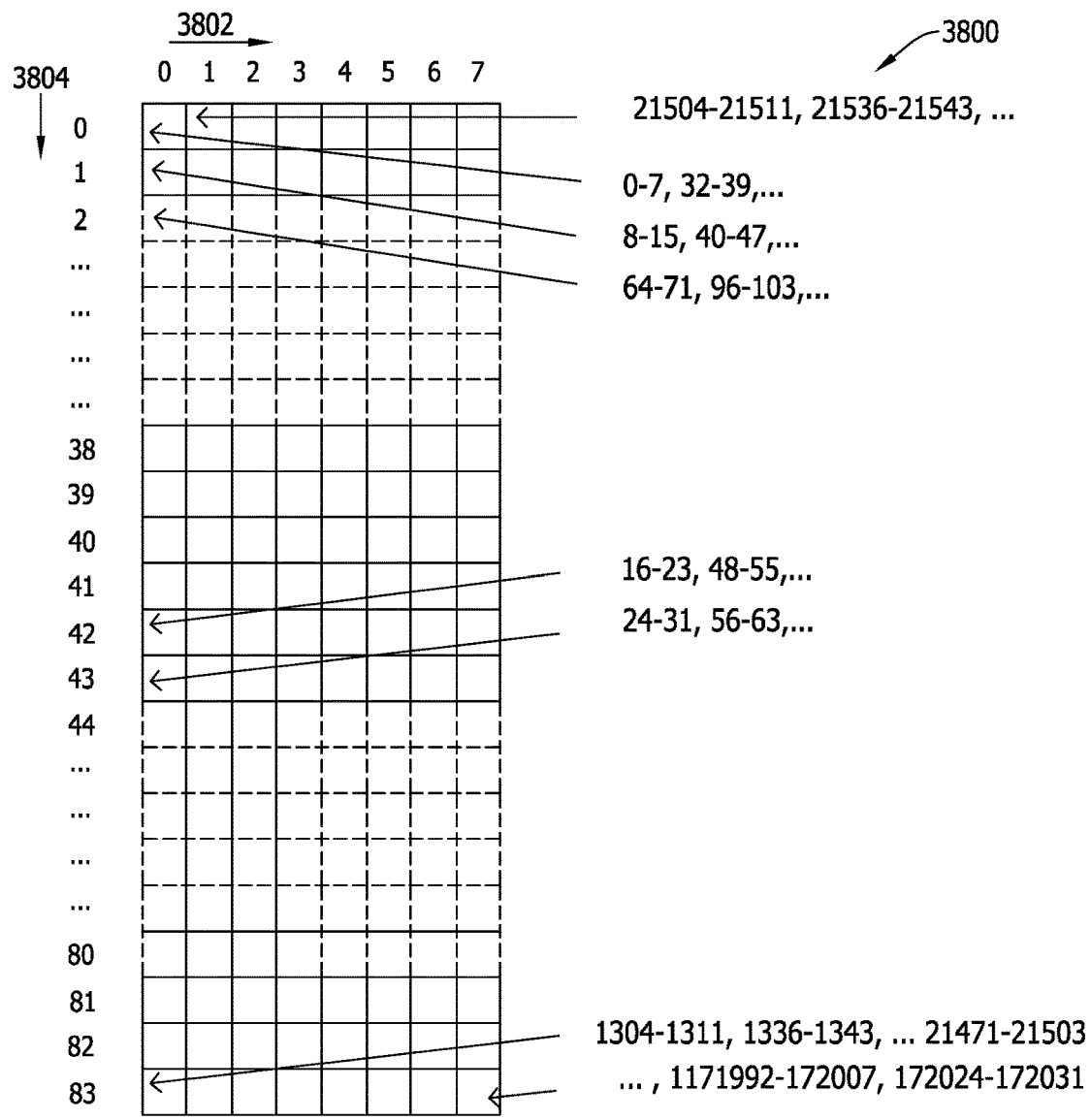

FIG. 38 depicts an exemplary inter-block interleaving structure.

Figure 39:
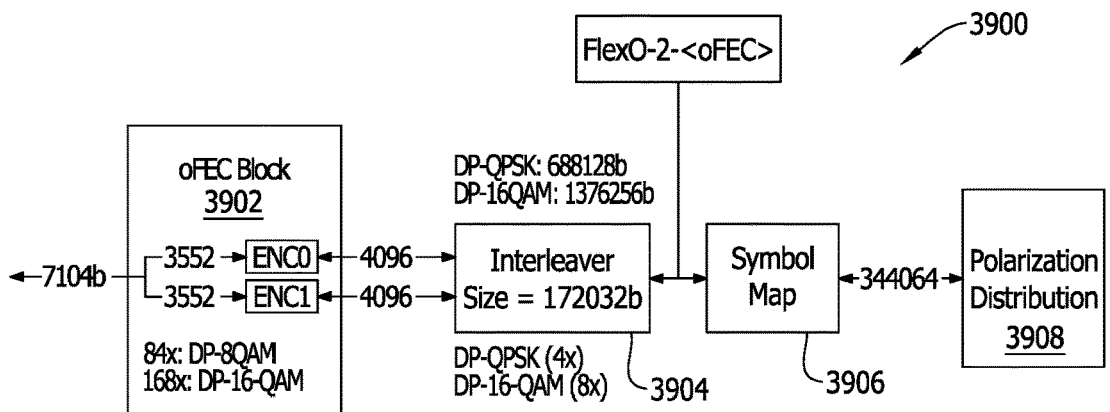

FIG. 39 is a schematic illustration of an exemplary symbol mapping and polarization distribution process.

FIG. 40 is a schematic illustration of an exemplary framing process.

FIG. 41 is a schematic illustration of an exemplary distribution table for a super-frame/sub-frame structure.

FIG. 42 depicts an exemplary super-frame structure.

Figure 43:
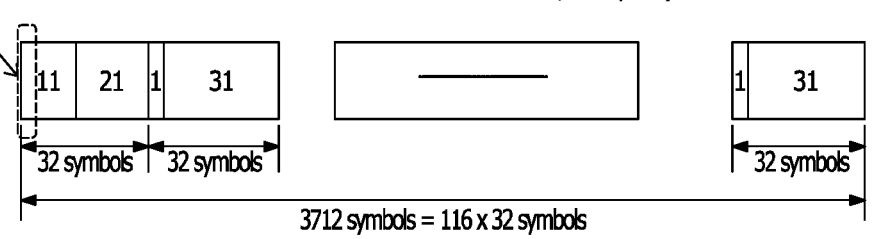

FIG. 43 depicts exemplary sub-frames of the super-frame structure depicted in FIG. 42.

Figure 44:
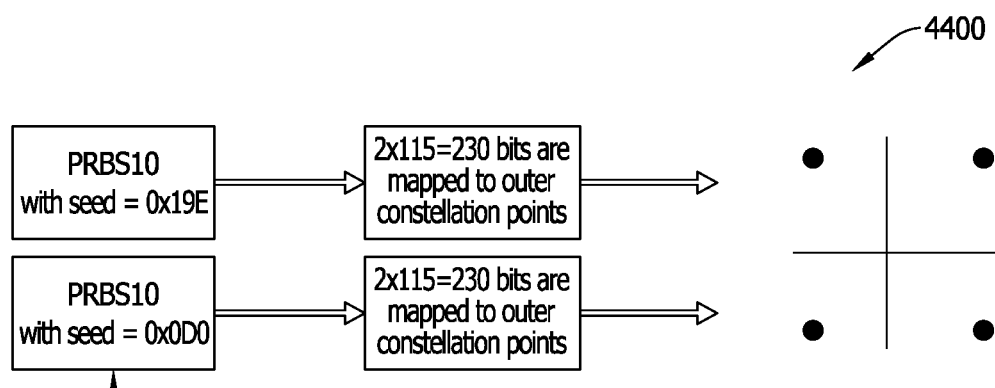

FIG. 44 depicts an exemplary pilot sequence mapping scheme.

Figure 45:
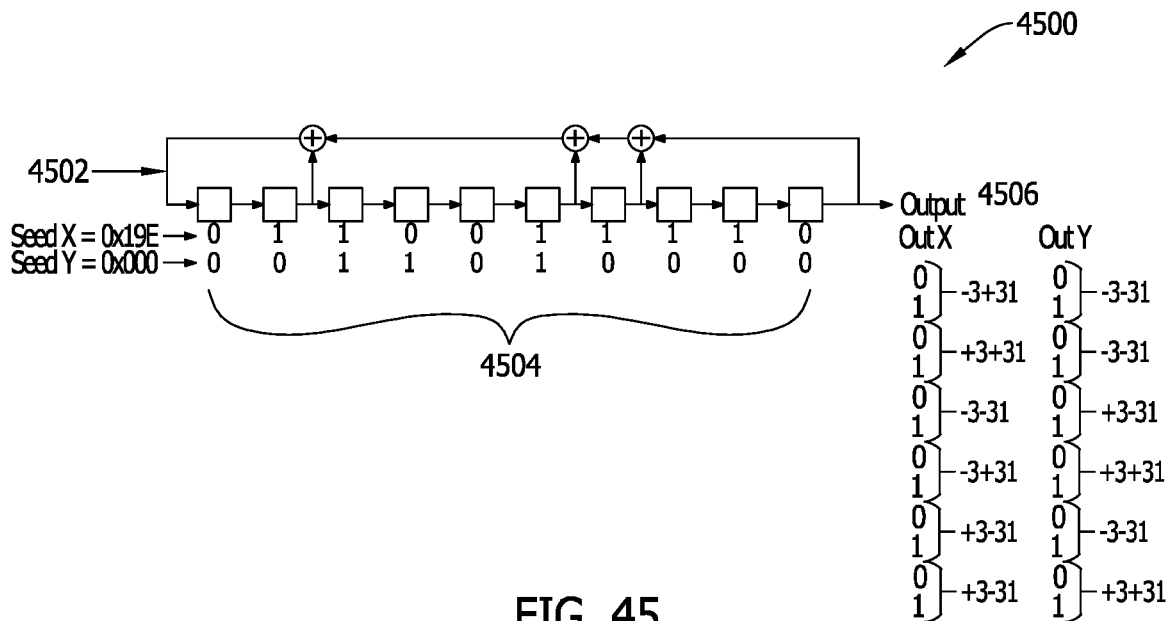

FIG. 45 is a schematic illustration of an exemplary pilot seed sequencing process.

Figure 46:
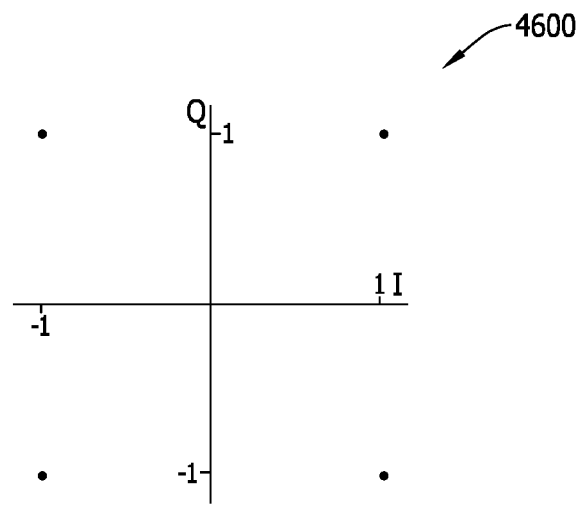

FIG. 46 is a graphical illustration of an exemplary constellation.

Figure 47:
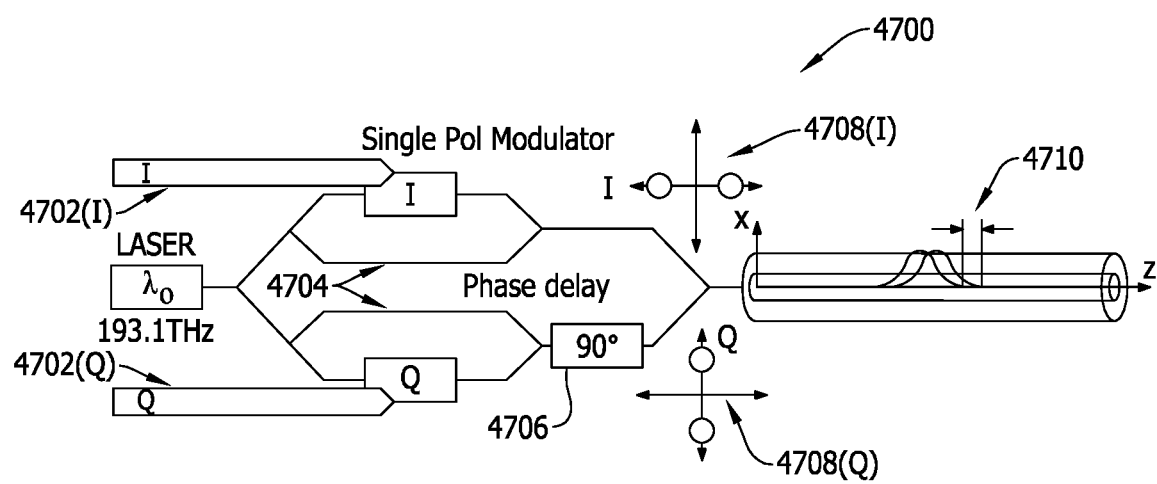

FIG. 47 is a schematic illustration of an exemplary single polarization modulator.

Figure 48:
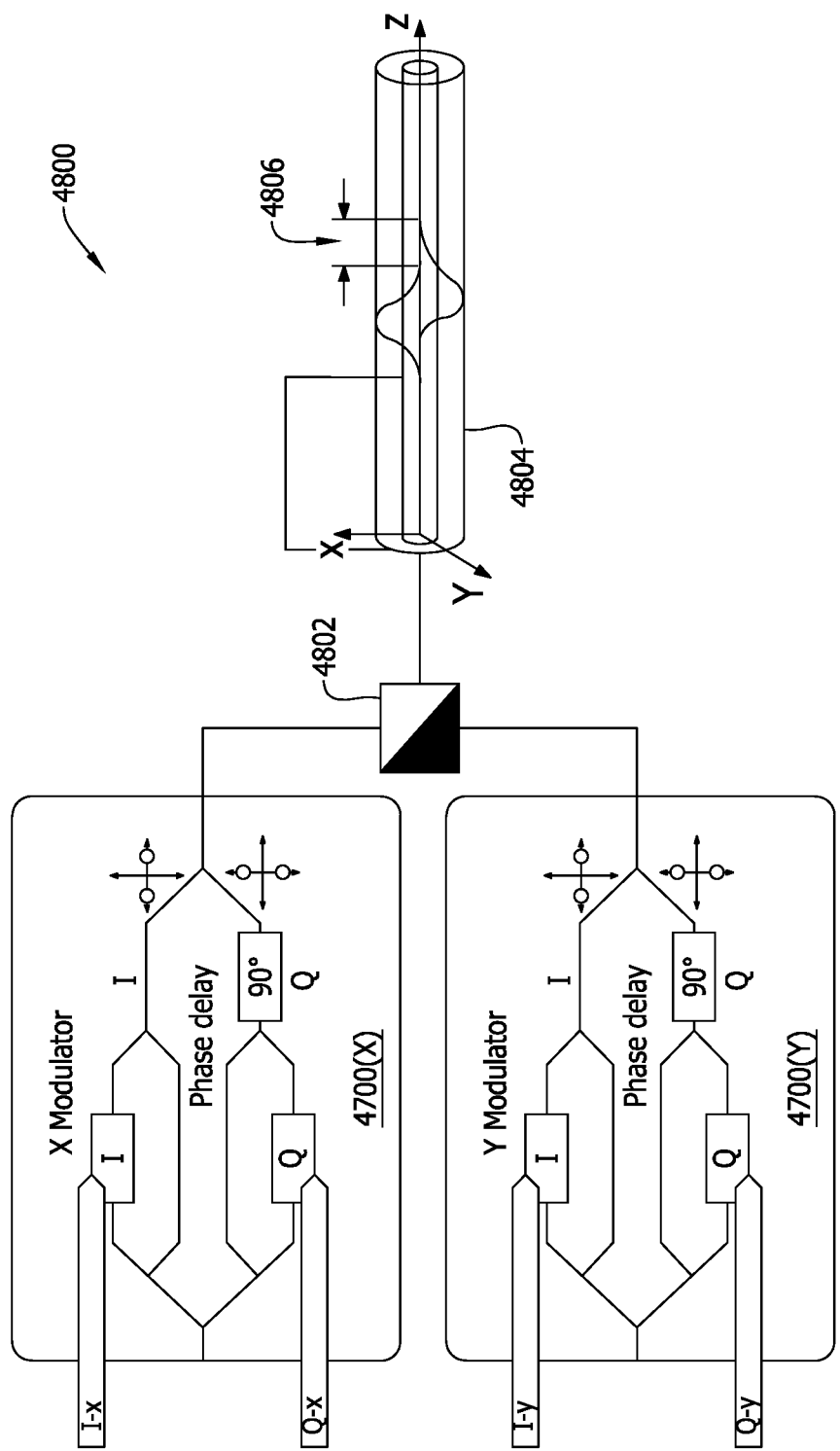

FIG. 48 is a schematic illustration of an exemplary dual polarization modulator.

Figure 49:
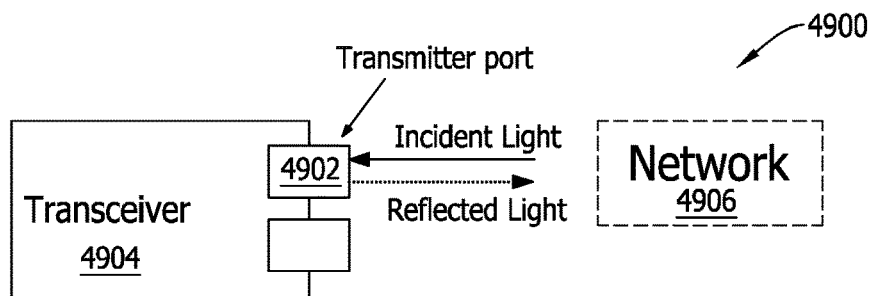

FIG. 49 is a schematic illustration depicting an exemplary transmitter reflectance effect.

Figure 50:
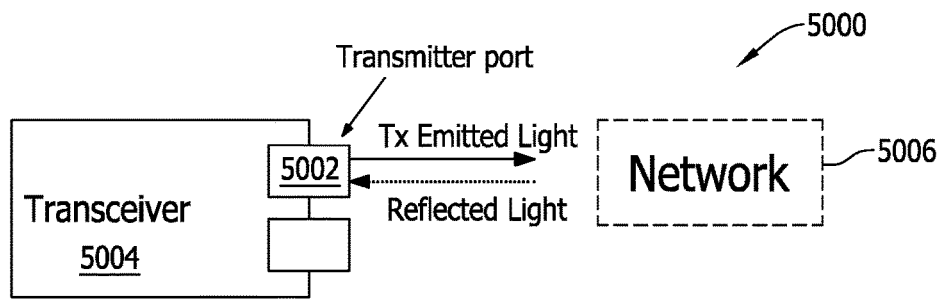

FIG. 50 is a schematic illustration depicting an exemplary optical return effect.

Figure 51:
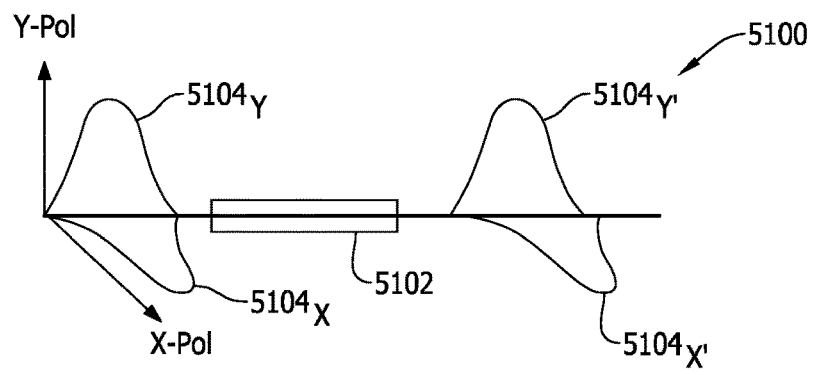

FIG. 51 is a graphical illustration depicting a differential group delay plot.

Figure 52:
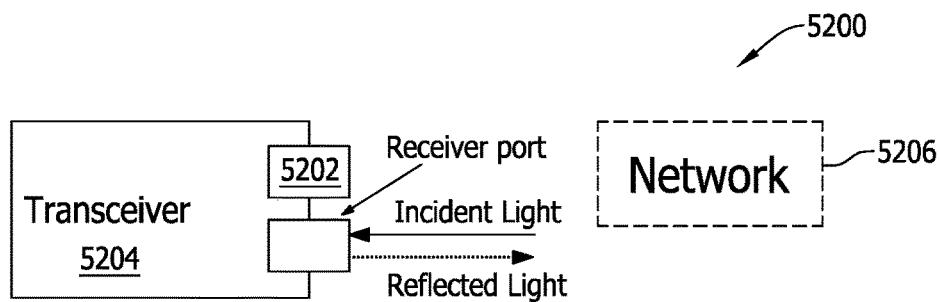

FIG. 52 is a schematic illustration depicting an exemplary receiver reflectance effect.

Figure 53:
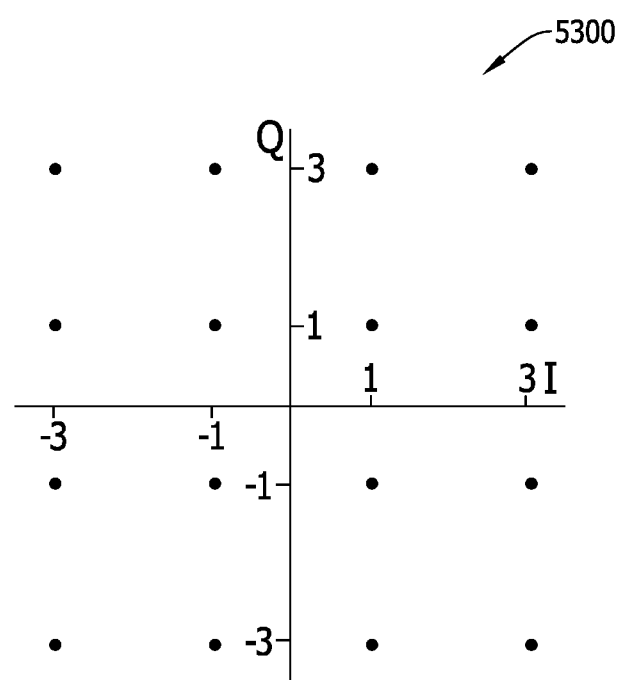

FIG. 53 is a graphical illustration of an exemplary constellation.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, the term "transceiver," unless specified otherwise, refers to a P2P coherent optics transceiver, having a coherent optics transmitting portion and a coherent optics receiving portion. In some instances, the transceiver may refer to a specific device under test (DUT) for several of the embodiments described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative access network architectures and processes that are particularly useful for the growing access network trends in the field. The present systems and methods leverage coherent optics, and particularly with respect to P2P systems, to significantly improve the cable access network and access networks in general. The embodiments herein enable the development and utilization of interoperable transceivers using coherent optical technology over P2P communication links. The present embodiments include new and improved specifications for the optical physical layer requirements for coherent optical transceivers.

The following embodiments are described with respect to transceivers operating at 100 and 200 gigabits per second (Gbps), however, the person of ordinary skill in the art will appreciate that these operating parameters are described by way of example, and not in a limiting sense. The principles herein are applicable to coherent optics systems operating at different transmission speeds, and particularly as the demand for increased speed and bandwidth continues to grow. The following examples are also described with respect to exemplary fiber links up to approximately 40, however, the person of ordinary skill in the art will further appreciate that the present techniques will support links of up to 80 km, 120 km, and greater in some circumstances.

The following embodiments include improvements to the P2P coherent optics specifications, and particularly with respect to the physical (PHY) layer. The present embodiments are described with respect to functional operation and interfaces among various network components, and with particular focus on transceiver operation related to the PHY layer, as well as transceiver operation that is not specific to the PHY layer. The present systems and methods further provide improved processes for framing, forward error correction (FEC), and symbol mapping for compliant hardware operating at various transmission speeds and modulations (e.g., 100G QPSK, 200G QPSK, 200G 16QAM).

The present systems and methods are applicable to several coherent optics system components, including the coherent transmitter and the coherent receiver. In an embodiment, the transceiver includes both a coherent transmitter and a coherent receiver, that is, hardware capabilities for both coherent transmission and coherent reception. In the exemplary embodiment, the coherent transmitter includes at least two key components: (i) one or more optical sources; and (ii) an external modulator.

In some embodiments, the optical source may include a laser diode implemented from a semiconductor junction operated in forward bias mode. Electrons in the junction transition from a higher to a lower energy state, and a photon is emitted having energy equal to the difference in electron energy states, which is also referred to as spontaneous light emission. In a laser diode, reflective facets or mirrors may be implemented such that the generated photons bounce back and forth, stimulating the emission of more photons, which is also referred to as stimulated emission, or lasing, and results in light emission at higher intensity levels and with a high degree of coherence. The mirrors or facets on opposite sides of the active region formed by the junction create an optical cavity. The geometry of the cavity, along with the range in energy levels generated by the change of state in the junction, will determine one or more dominant resonant wavelengths transmitted by the laser diode.

It is important, in optical systems, to be able to maintain operating characteristics. In the WDM environment, the optical system is configured to reliably maintain the transmitted wavelength at a desired value. Some optical systems incorporate thermo-electric-cooling capabilities to obtain better wavelength control, which adds cost to the optical end devices, but facilitates improved wavelength multiplexing, which further enables some avoidance of the cost of fiber retrenching to add additional capacity.

FIG. 1A depicts an emission spectrum 100 for a distributed feedback (DFB) laser diode. FIG. 1B depicts an emission spectrum 102 for an external cavity laser (ECL) diode. In an exemplary embodiment, emission spectra 100, 102 are representative of coherent laser structures that may be implemented in the access environment. That is, light emitted by lasers in the access environment may not be strictly monochromatic; different linewidths may be realized according to the individual structure and characteristics on the laser. The linewidth of the emitted light wavelength may have a significant impact on the speed, dynamic range, coherence, and coexistence among optical carriers communicated on the same fiber. Generally, optical sources that can be confined to narrow spectra are preferable when the optical source is sharing the fiber spectrum with other optical sources (e.g., WDM). A narrower linewidth limits the energy that will spill into other channels.

Coexistence in the cable access network is an important consideration. Most cable operators run a centralized network that includes headends (HEs), hubs, and fiber nodes. This type of centralized architecture was originally configured to transmit downstream video to cable subscribers, but and since evolved into a data-over-cable network as defined by the Data over Cable Service Interface Specification (DOCSIS) that introduced the cable modem termination system (CMTS) in the headend and the cable modem (CM) at customer premises. The centralized architecture also originally provided internet access and video delivery on the same coaxial cable. Video EdgeQAM (EQAM) was later introduced at the HE/Hub to enable digital video, video-on-demand (VOD), and switched-digital-video. EQAM evolved to support the modulation of both MPEG video and DOCSIS data onto the wire using a Modular Headend Architecture (MHA-TR). The CMTS and EQAM continued to evolve into the converged cable access platform (CCAP) that provided higher densities of EQAM and CMTS combined together into the same chassis; other technologies like Ethernet optics and Ethernet passive optical network (EPON) theoretically may share the same chassis as well. As a result, the CCAP enabled data, voice, and video to be handled over IP before being converted to RF or optical signals.

The external modulator component of the transceiver transmitter typically will use one of two types of external modulation approaches: (1) electro-absorption effect; and (2) interferometry. In the first approach, the electro-absorption effect controls the degree of attenuation through an optical transmission path. In the second approach, interferometry which changes the light amplitude by adjusting the relative phase on two split optical branches. An exemplary modulator structure for implementing the interferometric approach is described below with respect to FIG. 2.

FIG. 2 is a schematic illustration of an electro-optic modulator 200. In an embodiment, modulator 200 represents a Mach-Zehnder intensity modulator structure, also referred to as a Mach-Zehnder interferometer or a Mach-Zehnder Modulator (MZM). Modulator 200 includes a central electrode 202 and two outer electrodes 204. Light entering modulator 200 is split by optical waveguides 206 into two separate optical branches 208 before recombining at an output 210 modulator 200. In exemplary operation, the interferometric approach changes the light amplitude by adjusting the relative phase on the two split optical branches 208(1), 208(2), respectively, such that, after recombination, the separately adjusted optical portions may add destructively (i.e., 180 degrees out of phase) with no light leaving modulator 200, or may add constructively (i.e., in phase) with maximum optical intensity at output 210. In the exemplary embodiment depicted in FIG. 2, optical pathways are shown in bold, in contrast to electrical pathways.

FIG. 3 is a schematic illustration of an IQ modulator structure 300 utilizing two of electro-optic modulators 200, FIG. 2. Coherent optics enables the implementation of techniques for utilizing both the modulation and phase of light, as well as two different light polarizations, to transmit multiple bits per symbol over fiber transport media using, for example, modulation formats such as phase shift keying (e.g., QPSK) and/or quadrature-amplitude-modulation (QAM). The coherent modulation formats have an in-phase (I) amplitude component and a quadrature phase (Q) amplitude component.

In an embodiment, structure 300 represents an electro-optic IQ modulator including at least two MZMs, e.g., a first MZM for the I path (e.g., modulator 200(I)), and a second MZM for the Q path (e.g., modulator 200(Q)). More specifically, an input optical signal is first split, by outer optical waveguides 302, into two separate phase-shifted paths 304 prior to input into modulators 200(I), 200(Q). That is, phase-shifted paths 304(I), 304(Q) are phase-shifted to be at 90 degrees apart, which enables the first and second MZMs (200(I), 200(Q), respectively) to separately operate on orthogonal components of the optical signal. Accordingly, in the coherent system, instead of modulating only the amplitude of light, both amplitude and phase may be modulated by structure 300, which is sometimes also referred to as a nested IQ MZM. In some embodiments, structure 300 may further include a third offset modulator 200(0) for recombining the separate phase-shifted paths 304(I), 304(Q).

Figure 4:
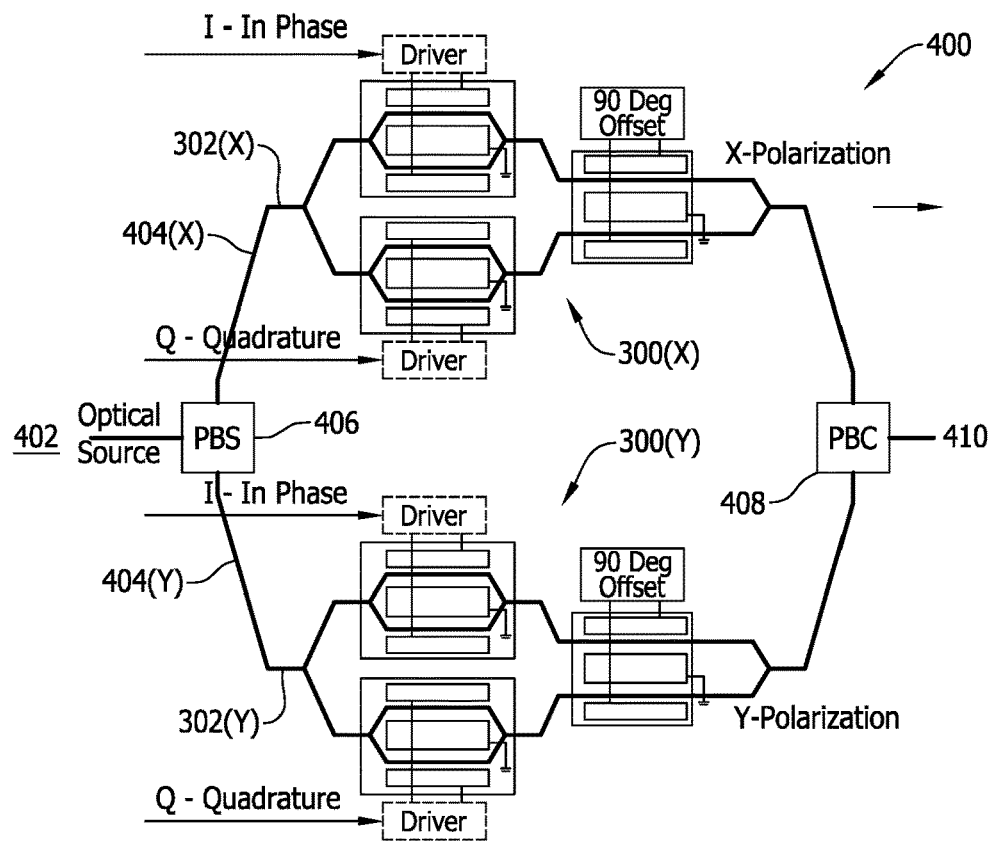
FIG. 4 is a schematic illustration of a dual polarization coherent IQ modulator.

FIG. 4 is a schematic illustration of a dual polarization coherent IQ modulator 400. In the exemplary embodiment illustrated in FIG. 4, modulator 400 utilizes two IQ modulator structures 300, FIG. 3, to separately process respective X- and Y-polarizations of a transmitted laser signal from an optical source 402. In this example, the laser signal from optical source 402 is separated into an X-polarization path 404(X) and a Y-polarization path 404(Y) by a polarization beam splitter (PBS) 406 for independent IQ modulation of each polarization by IQ modulator structures 300(X) and 300(Y), respectively. Each IQ modulator structure 300 then operates, from its respective optical waveguide 302, in a substantially similar fashion to that described above with respect to FIG. 3, until reaching a polarization beam combiner (PBC) 408, which from which a combined dual-polarized signal is generated. In this manner, the transport capacity is effectively double that of the single IQ modulator structure 300 shown in FIG. 3.

Nevertheless, performance of systems residing and coexisting within the fiber strand may be affected by the optical channel limitations of the fiber access environment. For example, several different fiber-related impairments are known to impact the performance. Some such impairments are dependent on the fiber length, whereas others are dependent on the geometry, material, wavelength, bandwidth, and/or optical power level of the fiber.

Dispersion is a known fiber length-dependent impairment. Dispersion occurs when different portions of the optical signal travel at different speeds within the optical fiber. As a consequence of this effect, an optical signal may experience spreading in time. Different types of dispersion include chromatic dispersion, waveguide dispersion, modal dispersion, and polarization mode dispersion. Chromatic dispersion, or material dispersion, is caused by the changing of the refractive index with the optical frequency. Waveguide dispersion relates to how well the index of refraction represents an ideal waveguide throughout the fiber length, with differences from the ideal waveguide causing dispersion. Modal dispersion occurs when different propagating modes are present in fiber. In the cable access environment, for example, because use of single mode fiber (SMF) is common, fiber modal dispersion is not a present factor, and waveguide dispersion is considered negligible in comparison with chromatic dispersion. Chromatic dispersion, or Dispersion($\lambda$), may be approximated according to:

$$\text{Dispersion}(\lambda) = \frac{S_0}{4} * \left[\lambda - \frac{\lambda_0^4}{\lambda^3}\right] \text{ ps}/(\text{nm} * \text{km}),$$

where $\lambda_0$ is the zero dispersion wavelength (typically 1313 nm for SMF, or within the range of 1302-1322 nm), and $S_0$ is the dispersion slope at $\lambda_0$, which typically is 0.086 ps/(nm$^2$*km), and considered always less than 0.092 ps/(nm$^2$*km) in this example. SMF dispersion variation with respect to wavelength is described further below with respect to FIG. 5.

Figure 5:
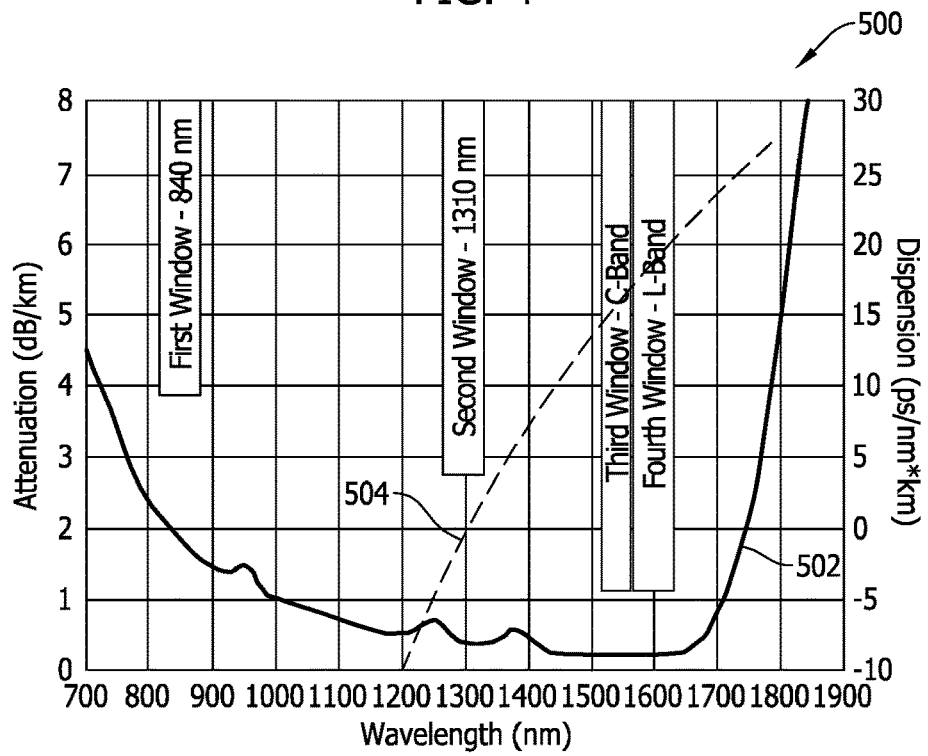
FIG. 5 is a graphical illustration of a comparative plot of attenuation with dispersion.

FIG. 5 is a graphical illustration of a comparative plot 500 of attenuation with dispersion. In the exemplary embodiment depicted in FIG. 5, an attenuation curve 502 represents the attenuation of the SMF over wavelength, and a dispersion curve 504 represents the dispersion over wavelength. Attenuation in fiber is dependent on the wavelength or frequency. As can be seen along attenuation curve 502, for this exemplary SMF, the attenuation is 0.22 dB/km at a 1550 nm wavelength transmission, and the attenuation is 0.3 dB/km at a 1310 nm wavelength transmission.

In this example, transmission window that is highly coveted is the C-Band (i.e., 1530 nm-1565 nm), due to its enabled option for amplification, as well as its low loss characteristics. However, in the access network, due to the shorter distances in many use case scenarios, there is no need for amplification. Accordingly, the present systems and methods are particularly suitable for use of the L-Band (i.e., 1565 nm-1625 nm), for which production of erbium-doped fiber amplifiers (EDFAs) in high volume has not yet occurred. Therefore, the advantageous implementations provided herein for the access network will greatly improve the overall transmission with respect to these characteristics. It may be noted, that in the cable environment, the impact of optical reflections it is often diminished by the use of angle-faceted connectors. That is, the small angle of an angle-faceted, or APC, connector causes a reflected signal to exit the fiber. Nevertheless, splice imperfections may also generate reflections which impact performance.

Polarization mode dispersion (PMD) occurs when two orthogonal polarizations travel at different speeds, which causes pulse spreading, resulting from random imperfections such as circular asymmetry. The PMD coefficient (in units of ps/√km) is the parameter that specifies PMD characteristics for a particular length of fiber, and the PMD of the fiber is the average value of the differential group delay (DGD). The PMD in single mode fiber ranges from 0.1 ps/√km to 1 ps/√km. SMF generally has a PMD<0.1 ps/√km, although in the case of cable, the specification calls for <0.5 ps/√km after cabling. In other use cases, a PMD requirement for non-coherent 10 Gbps Non-Return-to-Zero (NRZ) of <4 ps may be used. For example, a 40 km link would expect to see, at most, a value of 0.5*√40=3.16 ps, which would not require compensation. However, at a transmission speed of 40 Gbps, the PMD coefficient requirement is <1 ps/√km, and in this case, a 40 km link would require compensation. Coherent detection techniques provide a higher tolerance to PMD in comparison with non-coherent detection techniques, and therefore, the present systems and methods would expect higher symbol rates to be achieved with minimal, or no, PMD compensation for the present link distances of the access network. In analog optical links, PMD is not generally considered to be a significant issue, since the modulation bandwidth is about 1 GHz.

Nonlinear effects in fiber may be caused by intensity dependence of the refractive index fiber medium, and also by inelastic-scattering effects that are present at very high optical intensity levels. Other nonlinear effects are related to optical amplification systems, but are not addressed in detail with respect to the present access scenario techniques. For example, in relatively shorter fiber distances (e.g., <60 km), inline amplification systems are not a significant consideration. However, the refractive index dependence on optical power is described herein with respect to the present systems and methods. Refractive index effects include, for example, self-phase modulation (SPM), cross-phase modulation (XPM), and four-wave mixing (FWM).

For SPM, a time-varying signal intensity generates a varying refractive index in a medium with an intensity-dependent refractive index (e.g., fiber). The higher intensity portions of an optical signal traveling through a fiber thus encounter a higher refractive index in comparison with the relatively lower intensity portions of the signal. SPM therefore includes the chirping and dispersion generated by variation in the index of refraction. The optical power level and the length of interaction may also affect the amount of SPM.

XPM is, in principle, considered to be generally the same as SPM. However, in some cases, XPM represents the effect of the intensity-varying index of refraction on other optical carriers that are propagating at the same time as the original signal. As the number of channels increase, the amount of XPM also increases. In a WDM system, XPM converts power fluctuations in a particular channel to phase fluctuations in the other co-propagating channels. XPM is higher with relatively higher power levels and greater interaction lengths (i.e., longer fiber links).

FWM is a third order nonlinear effect of susceptibility. In FWM, if three fields propagate at frequencies $\omega_1$, $\omega_2$, and $\omega_3$, a fourth frequency $\omega_4$ is generated such that $\omega_4 = \omega_1 \pm \omega_2 \pm \omega_3$. FWM is independent of modulation bandwidth, but is dependent on frequency spacing and fiber dispersion. Since dispersion varies with wavelength, the signal waves and the generated waves will experience different group velocities, which destroys capabilities for phase matching of waves, while also lowering the efficiency of power transfer to newly-generated frequencies. Therefore, dispersion-shifted fibers will experience more severe FWM effects than standard SMF. As the group velocity mismatch increases and the channel spacing widens, the FWM effect decreases.

Figure 6:
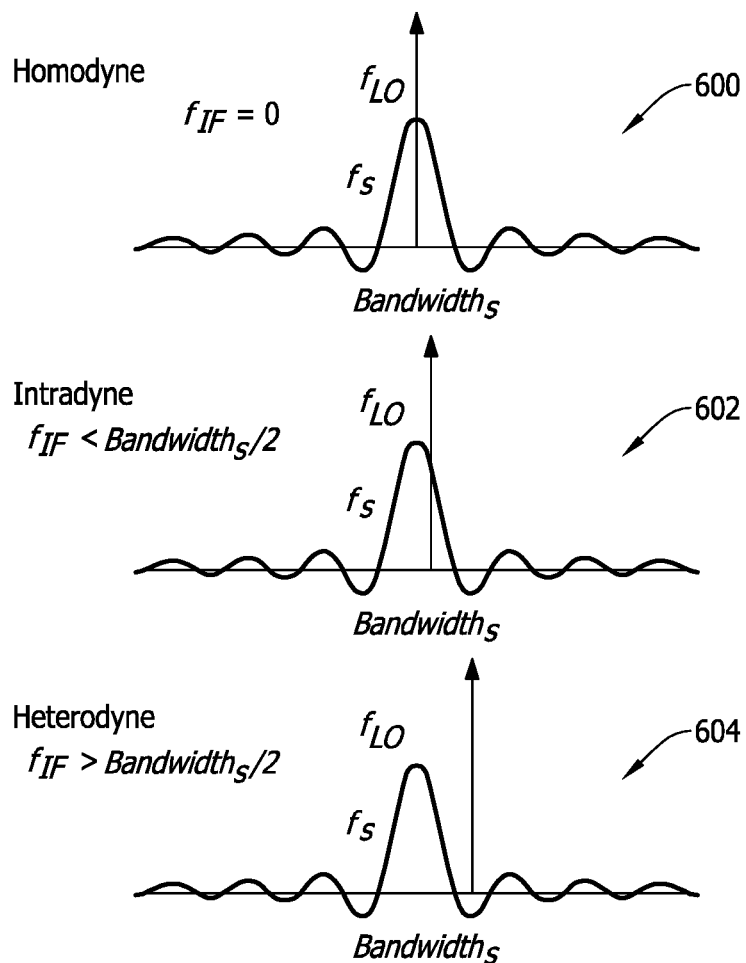
FIG. 6 is a graphical illustration of comparative plots of respective coherent detection schemes.

FIG. 6 is a graphical illustration of comparative plots 600, 602, 604 of respective coherent detection schemes. More particularly, plot 600 represents a homodyne coherent detection scheme for a signal at a frequency $f_S$ having a baseband intermediate frequency $f_{IF}$ equal to zero (i.e., $f_{IF}=0$), plot 602 represents an intradyne coherent detection scheme for the signal at a frequency $f_S$ having the baseband intermediate frequency $f_{IF}$ less than half of the optical signal bandwidth Bandwidths (i.e., $f_{IF}$<Bandwidths/2), and plot 604 represents a heterodyne coherent detection scheme the signal at a frequency $f_S$ having the baseband intermediate frequency $f_{IF}$ greater than half of the optical signal bandwidth Bandwidths (i.e., $f_{IF}$>Bandwidths/2).

In a coherent receiver, a local oscillator (LO, at frequency $f_{LO}$) is known to be used to down-convert the electrical field of the incoming optical signal to the baseband intermediate frequency $f_{IF}$. Coherent detection is thus able to map an entire optical field into the digital domain, thereby enabling the detection of the amplitude, phase, and state of polarization of the signal. Depending on the intermediate frequency, which is defined as $f_{IF}=f_S-f_{LO}$, coherent receivers thus fall into the fall into three classes described herein (i.e., homodyne, intradyne, and heterodyne).

In the following embodiments, intradyne receivers are described, for purposes of illustration but not in a limiting sense, as the exemplary option for 100G coherent systems.

In an intradyne receiver, the intermediate frequency $f_{IF}$ may be selected to fall within the signal band by approximately aligning the LO frequency $f_{LO}$ with the signal frequency $f_S$. Intradyne detection allows the detection of both the I and Q components of the received signal, and thus the intradyne receiver is also referred to as a "phase diversity" receiver. In some embodiments, digital phase locking algorithms are implemented to recover the modulation signal from the sampled I and Q components, typically using high-speed analog-to-digital conversion (ADC) and digital signal processing (DSP).

Figure 7:
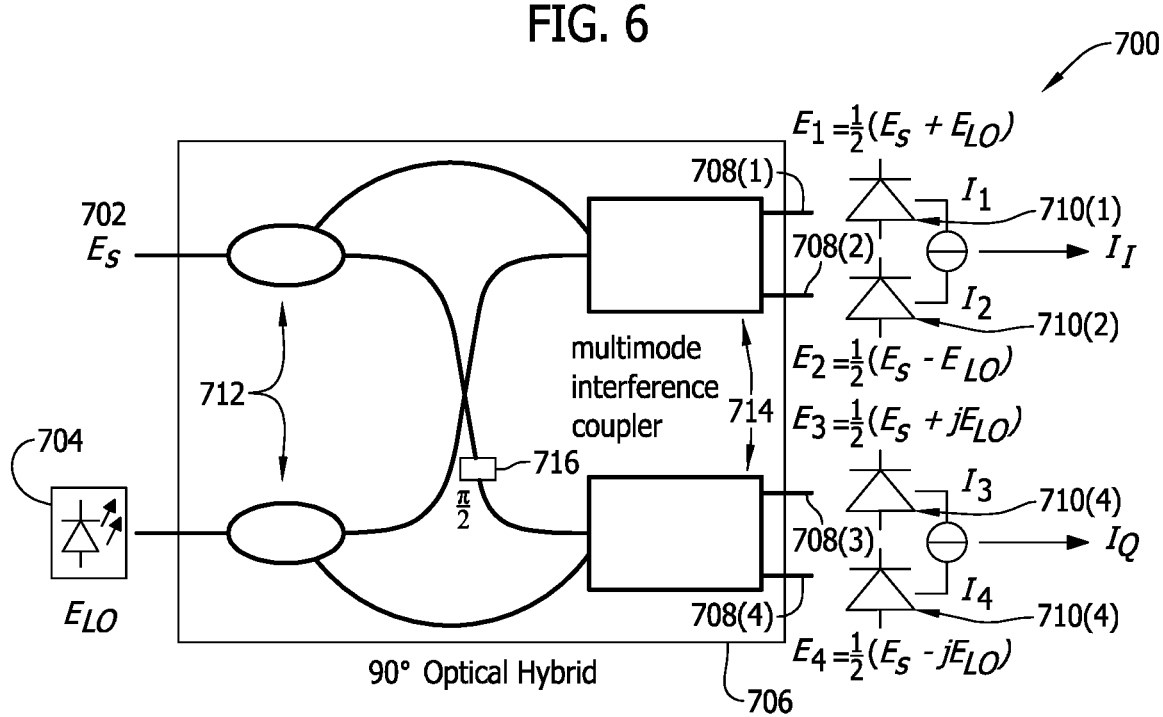
FIG. 7 is a schematic illustration of a phase diversity coherent receiver.

FIG. 7 is a schematic illustration of a phase diversity coherent receiver 700. In an exemplary embodiment of receiver 700, a light signal 702 ($E_S$) and a continuous-wave LO 704 ($E_{LO}$) are input to a 90° optical hybrid 706, which processes the two inputs 702, 704 into four separate outputs 708 that are received by a respective photodetector 710. In the coherent detection paradigm, the beating product of electric fields of the modulated signal light 702 and the continuous-wave LO 704 result in a lower frequency representation of the signal information which may then be processed electrically.

To detect both IQ components of input light signal 702, 90° optical hybrid 706 includes a 2×2 optical coupler 712 having a 900 phase shift property between the direct-pass and cross-coupling outputs by way of a multimode interference (MMI) coupler 714. By combining such optical couplers into the configuration illustrated in FIG. 7, together with an additional 90° phase shift 716 in one arm thereof, a detection of real and imaginary parts may be effectively achieved. In an embodiment, balanced detection is introduced into coherent receiver 700 to suppress the DC component and maximize the signal photocurrent. In this example, the respective output IQ photocurrents from balanced photodetectors 710 may be represented as:

$$I_I(t)=I_1(t)-I_2(t)=R\sqrt{P_S P_{LO}}\cos\{\varphi_S(t)-\theta_{LO}(t)\}; \text{ and}$$

$$I_Q(t)=I_3(t)-I_4(t)=R\underline{P_S P_{LO}}\sin\{\varphi_S(t)-\theta_{LO}(t)\},$$

where R is the responsivity of the photodiode, $P_S$ and $P_{LO}$ are the power of the optical fields for incoming and LO signals 702 and 704, respectively. Implementation of receiver 700 thereby enables the recovery of both the relevant sine and cosine components. In this example, the phase noise $\theta_{LO}(t)$ may be estimated as varying with time, and the phase information $\varphi_S(t)$ may be restored through subsequent DSP on the intradyne-detected signal (not shown in FIG. 7).

Figure 8:
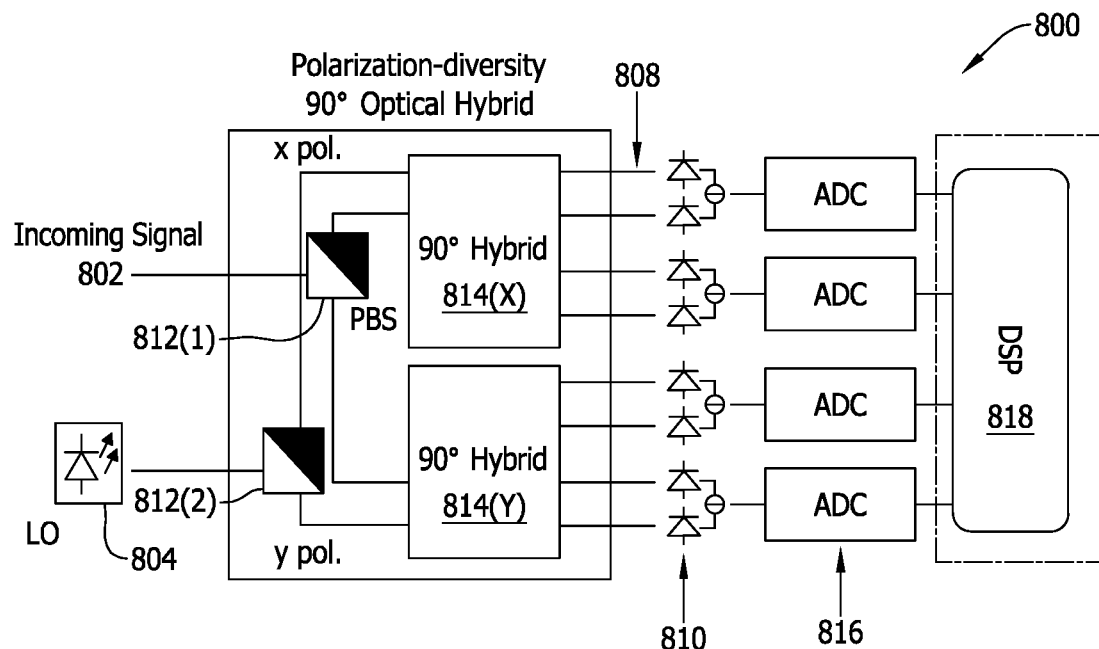
FIG. 8 is a schematic illustration of a phase and polarization diversity coherent receiver.

FIG. 8 is a schematic illustration of a phase and polarization diversity coherent receiver 800. Receiver 800 is similar to receiver 700, FIG. 7, in several structural and functional effects, and similar elements thereof are referred to by the same labels. For example, in an embodiment of receiver 800, an incoming signal 802 (e.g., polarization multiplexed) and an LO signal 804 are input to a polarization diversity 90° optical hybrid 806, which processes the two inputs 802, 804 into eight separate outputs 808 that are received by eight respective photodetectors 810. In operation of receiver 800, both of incoming signal 802 and LO signal 804 are split, within polarization diversity 90° optical hybrid 806, into two orthogonal polarizations using respective PBS units 812, after which the co-polarized components of incoming signal 802 and LO signal 804 are mixed within two separate 90° optical hybrids 814 (e.g., 814(X), 814(Y)) to produce I and Q components for each X and Y polarization. The resulting four IX, QX, IY, QY signals after balancing by photodetectors 810 may then be digitized by respective analog-to-digital converters (ADCs) 816 (or separate ADCs 816, in this example), after which a DSP 818 may further process the converted signals for signal demodulation.

Figure 9:
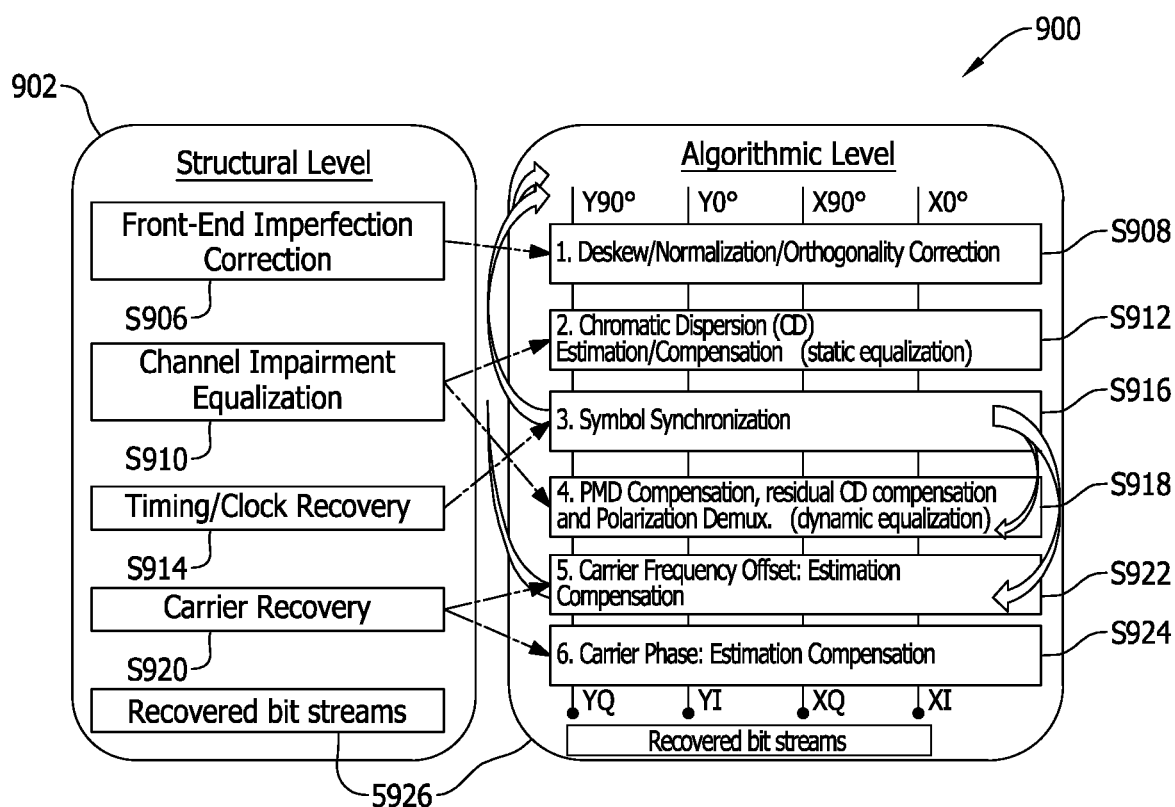
FIG. 9 depicts a digital signal process.

FIG. 9 depicts a DSP process 900. In an exemplary embodiment, DSP process 900 illustrates DSP functionality in a processor of a digital coherent optical receiver (e.g., DSP 818 of coherent receiver 800, FIG. 8) for a polarization multiplexed QAM signal with respect to a structural level 902 and an algorithmic level 904 of the relevant processor. Respective steps of process 900, unless otherwise described, may be performed in the following order, a different order, or some steps may be performed substantially simultaneously with other steps.

In the exemplary embodiment, process 900 begins at step S906, in which the four digitized signals input to DSP 818 (i.e., I and Q components for each X and Y polarization), after processing by ADCs 816, are passed through a relevant structural block of DSP 818 to compensate front-end imperfections. In an embodiment, the front-end imperfections are compensated, in step S908, by one or more correction algorithms of algorithmic level 904, which may include a deskew algorithm to correct the timing skew between the four channels resulting from the difference in both optical and electrical path lengths within coherent receiver 800. In some embodiments of step S906, other types of front-end imperfections may be corrected, including without limitation, differences between the respective output powers of the four channels (due to different responses of PINs and/or transimpedance amplifiers (TIAs) in receiver 800), and quadrature imbalance resulting from a particular optical hybrid not exactly introducing a 90-degree phase shift. Accordingly, in some embodiments of step S908, algorithmic level 904 may further include normalization and orthogonality correction algorithms.

In step S910, major channel transmission impairments may be compensated through use of appropriate digital filters of structural level 902, which may, at step S912, further utilize estimation and compensation algorithms to address impairments such as chromatic dispersion and PMD. An embodiment of step S912, and based on different time scales of the dynamics of the respective impairments, the static equalization for chromatic dispersion compensation may be performed first because of its independence of state of polarization (SoP) and modulation format, as well as the impact on subsequent blocks of structural level 902 before the chromatic dispersion estimation may be needed to achieve accurate compensation.

In step S914, the clock recovery for symbol synchronization may be processed within structural level 902 to track the timing information of incoming samples. In an embodiment of step S910, joint processing between clock recovery blocks and polarization demultiplexing blocks may be performed to achieve, at step S916, symbol synchronization within algorithmic level 904 after all channel impairments are equalized (e.g., as represented by respective arrows indicated in FIG. 9). In an embodiment of step S916, a fast-adaptive equalization may be jointly performed for two polarizations through a butterfly structure and stochastic gradient algorithms, such as a constant modulus algorithm (CMA) and variants thereof. In step S918, algorithmic level 904, additional algorithms may be performed with respect to PMD compensation, residual chromatic dispersion compensation, and polarization demultiplexing/dynamic equalization.

In step S920, and carrier recovery is processed at structural level 902, which may be performed in cooperation with step S922, carrier frequency offset estimation or compensation algorithms within algorithmic level 904. In an exemplary embodiment of step S922, the frequency offset between source laser 802 and LO 804 may be estimated and removed to prevent the constellation rotation at the intradyne frequency. In step S924, within algorithmic level 904, the carrier phase noise may be estimated and removed from the modulated signal, which may then be followed by algorithms for symbol estimation and hard or soft-decision forward error correction (FEC) for channel decoding. At step S926, the final bit streams may be recovered at both structural level 902 and algorithmic level 904.

Again, as described above, it may be noted that, for a particular digital coherent receiver, the ordering of DSP flow may according to the design choices at the receiver, differ from the order described immediately above. For example, instead of, or in addition to, a feed-forward process, joint processing and feedback among different process blocks may be performed, including without limitation, clock recovery and polarization demultiplexing. In some embodiments, similar functions may be performed through use of training sequences based on data-aided or blinded algorithms. In other embodiments, a coherent receiver may perform fewer steps than those described above, or may include additional steps beyond those specifically described, but nevertheless within the scope of this description.

Coherent detection and DSP technologies have thus been key factors enabling the development of 100G coherent optical transmission systems. DSP technology has played in even more ubiquitous role, at both the transmitter and receiver, and the development of 200G coherent optical systems, and this trend is expected to continue in the development of further next-generation coherent optical systems. Although specific algorithms may be different for each process block of the DSP (e.g., due to various realizations of the same process block in the implementation level), the general functionality at the structural level (e.g., structural level 902) or functional abstractions (e.g., algorithmic level 904) are expected to be similar for all relevant major commercial products implementing these technologies.

The typical optical access network includes a few components that are considered to be fundamental thereto. That is, "fundamental" components are those components that have been heretofore most widely used in the access network, and which are expected to play a significant role in the access networks of the future. Such fundamental components may be described as being grouped, into three categories: (1) the optical transmitter; (2) the optical channel; and (3) the optical receiver. Optical transceivers are considered to include both an optical transmitter and an optical receiver. These fundamental components are described further below with respect to the following embodiments.

Figure 10:
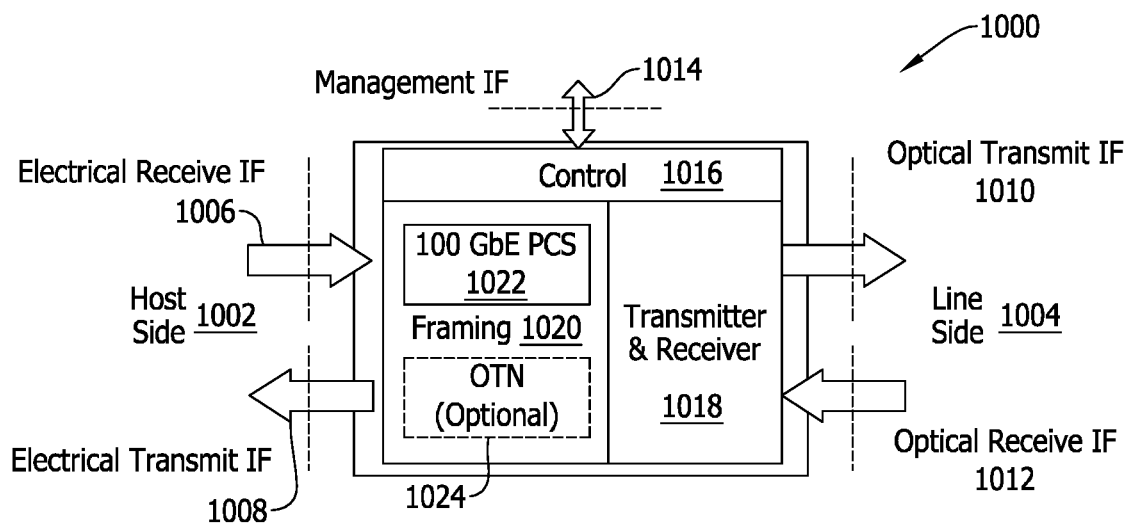
FIG. 10 is a schematic illustration of a transceiver having a dual optical interface structure.

FIG. 10 is a schematic illustration of a transceiver 1000 having a dual optical interface structure. In the embodiment depicted in FIG. 10, transceiver 1000 is disposed with respect to an electrical client side 1002 (or host side 1002) and an optical line side 1004. In this example, transceiver 1000 includes an electrical receive interface 1006 and an electrical transmit interface 1008 at client side 1002, and optical transmit interface 1010 and an optical receive interface 1012 at line side 1004. That is, client side/host side 1002 corresponds to electrical interfaces 1006, 1008, and line side 1004 corresponds to optical interfaces 1010, 1012. In an exemplary embodiment, transceiver 1000 further includes a management interface 1014 in communication with a control layer 1016 of transceiver 1000.

Dual optical interface transceiver 1000 thus utilizes separate optical interfaces 1010, 1012 capable of operable communication with respective transmit and receive functions of transmitter and receiver portions 1018 of transceiver 1000. In an embodiment, transceiver 1000 further includes a framing unit 1020 in communication with electrical interfaces 1006, 1008 at host side 1002 (e.g., a 100 Gb Ethernet PCS 1022 and/or an optional optical transport unit 1024).

Figure 11:
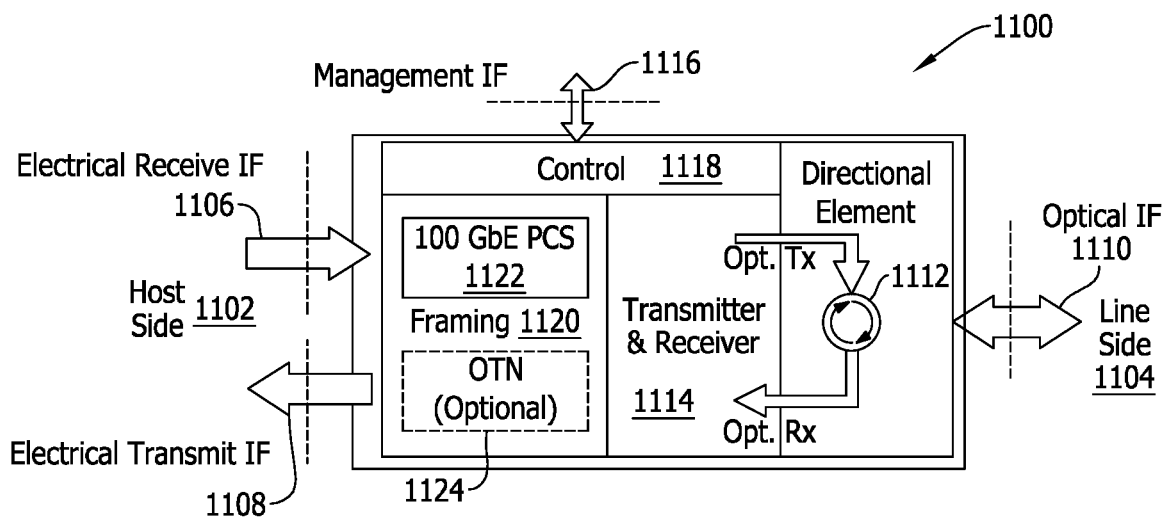
FIG. 11 is a schematic illustration of a transceiver having a single optical interface structure.

FIG. 11 is a schematic illustration of a transceiver 1100 having a single optical interface structure. In the embodiment depicted in FIG. 11, transceiver 1100 is similar to transceiver 1000, FIG. 10, is similarly disposed with respect to an electrical client/host side 1102 and an optical line side 1104, and includes an electrical receive interface 106 and an electrical transmit interface 1108 at client side 1102. Transceiver 1100 differs from transceiver 1000, however, in that transceiver 1100 includes a single optical interface 1110 at line side 1104. Optical interface 1110 is able to communicate with a directional element 1112 of transceiver 1100, capable of functionally directing transmitted and received optical signals between the respective transmitter and receiver portions 1114 of transceiver 1100.

In an exemplary embodiment, transceiver 1100 further includes a management interface 1116 in communication with a control layer 1118 of transceiver 1100. In some embodiments, transceiver 1100 also similarly includes a framing unit 1120 in communication with electrical interfaces 1106, 1108 at host side 1102 (e.g., a 100 Gb Ethernet PCS 1122 and/or an optional optical transport unit 1124).

Implementation of single optical interface structure of transceiver 1100 is particularly useful in the case where only a single fiber it is available from hub to node. In this embodiment, signal direction functionality is incorporated into transceiver 1100 (e.g., by directional element 1112) to enable the transmitter optical signal (i.e., Opt. Tx) to be directed to the single optical interface (i.e., optical interface 1110), while enabling the signal (i.e., Opt. Rx) incoming through the single optical interface to be directed to the respective receiver of portion 1114, with a performance impact that is expected to be negligible, and while also utilizing the same communication frequency in both the transmit and receive directions.

Architectural considerations with respect to implementations using the single interface transceiver are described functionally below with respect to FIGS. 12 and 13, which are provided for illustration purposes, but not in a limiting sense. Other transmitter and receiver implementations may follow different sequences and different feedback dependencies.

Figure 12:
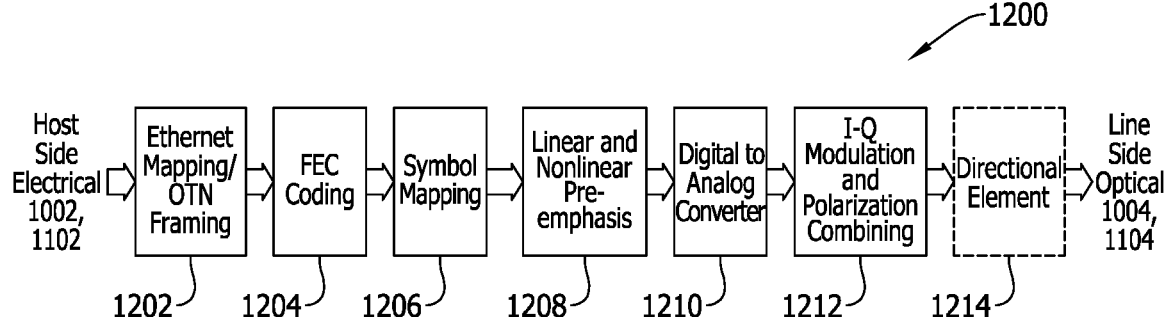
FIG. 12 is a functional schematic illustration of a transmitter.

FIG. 12 is a functional schematic illustration of a transmitter 1200. In an exemplary embodiment, transmitter 1200 is configured to perform relevant transmitter functions occurring, for example, in a coherent optical transceiver (e.g., transceiver 1000, FIG. 10, transceiver 1100, FIG. 11) from the electrical input on the host side (e.g., host side 1002, FIG. 10, host side 1102, FIG. 11) to the optical output on the line side (e.g., line side 1004, FIG. 10, line side 1104, FIG. 11).

In exemplary operation, transmitter 1200 includes one or more functional units, which may operate in the order listed, or in a different order, and may be individually implemented by hardware elements, software modules, or by combinations of hardware and software. In some embodiments, transmitter 1200 may include fewer functional units, or additional functional units described herein, without departing from the scope of this description. These transmitter functional units may include, without limitation, one or more of an Ethernet mapping and optional OTN framing unit 1202, an FEC coding unit 1204, a symbol mapping unit 1206, a linear and nonlinear pre-emphasis unit 1208, a DAC unit 1210, an IQ modulation and polarization combining unit 1210, and an optional directional element unit 1214. That is, directional element unit 1214 may be implemented in the case of a single optical interface transceiver (e.g., transceiver 1100, FIG. 11), but may not be needed in the case of a dual optical interface transceiver (e.g., transceiver 1000, FIG. 10).

In an exemplary embodiment, the optical signal transmitted through transmitter 1200 may be described using parameters including, without limitation, one or more of encoding scheme, line rate, polarization imbalance, quadrature and polarization skew, transmitter clock jitter, frequency tolerance, optical output power, laser wavelength, laser linewidth, and transmitter OSNR. The optical distribution medium of the access network (e.g., cable environment, telecommunication environment, etc.) may include various elements over the respective link, including one or more of optical fiber, optical splitters, optical circulators, wavelength multiplexers, wavelength demultiplexers, and other optical passive components. The various impairments that may impact the optical signals traversing the link they include one or more of optical loss or gain, chromatic dispersion, PMD, polarization dependent loss, polarization rotation, optical crosstalk, and optical SNR degradation.

An optical signal so generated by an "imperfect" embodiment of transmitter 1200, which may be further degraded by one or more impairments from the optical distribution medium, enters the line side of the transceiver (e.g., transceiver 1000, FIG. 10, transceiver 1100, FIG. 11) for detection, compensation and processing by a receiver portion thereof, as described further below with respect to FIG. 13.

Figure 13:
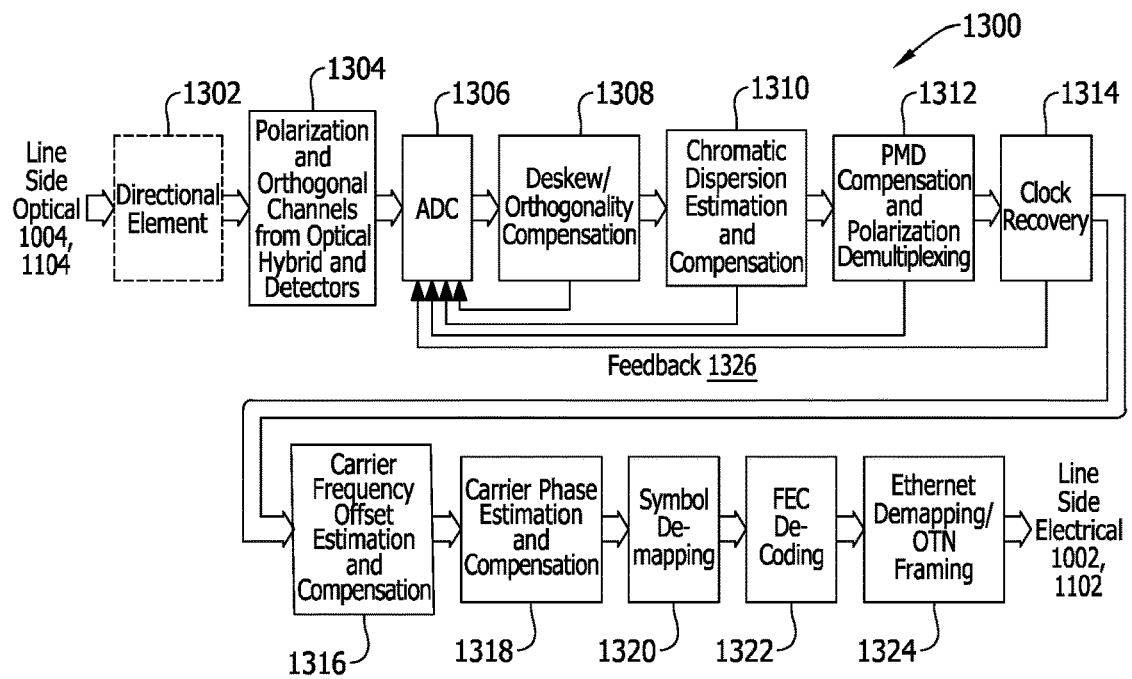
FIG. 13 is a functional schematic illustration of a receiver.

FIG. 13 is a functional schematic illustration of a receiver 1300. In an exemplary embodiment, receiver 1300 is configured to perform relevant receiver functions occurring, for example, in the coherent optical transceiver (e.g., transceiver 1000, FIG. 10, transceiver 1100, FIG. 11) from the optical input on the host side (e.g., host side 1002, FIG. 10, host side 1102, FIG. 11) to the electrical output on the line side (e.g., line side 1004, FIG. 10, line side 1104, FIG. 11). In exemplary operation, receiver 1300 includes one or more functional units which generally correspond to relevant functional units of transmitter 1200, FIG. 12, and which may similarly operate in the order listed, or in a different order, and may be individually implemented by hardware elements, software modules, or by combinations of hardware and software.

The receiver functional units may include, without limitation, one or more of an optional directional element unit 1302 (e.g., in the case of a single optical interface transceiver such as transceiver 1100, FIG. 11), a detection unit 1304 for detecting I and Q orthogonal channels for each X and Y polarizations, an ADC unit 1306, a deskew and orthogonality compensation unit 1308, a chromatic dispersion estimation and compensation unit 1310, a PMD compensation and polarization multiplexing unit 1312, a clock recovery unit 1314, a carrier frequency offset estimation and compensation unit 1316, a carrier phase estimation and compensation unit 1318, a symbol demapping unit 1320, an FEC decoding unit 1322, and an Ethernet demapping and optional OTN framing unit 1324. In an embodiment, receiver 1300 may include feedback channels 1326 to ADC unit 1306, from one or more of respective units 1308, 1310, 1312, 1314.

In an exemplary embodiment, the optical signal processed through receiver 1300 may be described using parameters including, without limitation, one or more of modulation, symbol rate, symbol mapping, FEC, line rate, encoding scheme, frequency tolerance, frame format and mapping, optical input power, laser wavelength, laser linewidth, receiver OSNR, polarization imbalance, quadrature and polarization skew, transmitter clock jitter, chromatic dispersion, polarization dispersion, and polarization rotation (SoP track).

With respect to both transmitter 1200 and receiver 1300, some general transceiver characteristics may also be considered, such as the end-to-end link latency, which includes both the transmitter and receiver latencies, as well as the transmission delay of the optical channel. Additionally, the operation of the transceiver may also be impacted by the ambient temperature, which may then require additional compensation therefor. With respect to receiver 1300 in particular, the present systems and methods may further utilize the data reacquisition time as a useful metric to indicate the time the receiver takes to turn back on after loss of signal.

FIGS. 14A-B are graphical illustrations depicting comparative encoding plots 1400, 1402. More particularly, encoding plot 1400 represents a constellation of a regular QPSK coding scheme, and encoding plot 1402 represents a constellation of a differential QPSK coding scheme (counterclockwise, in this example). A comparison of differential QPSK coding scheme of plot 1402 with the regular QPSK coding scheme of plot 1400 illustrates the advantages realized by implementation of differential coding with respect to the embodiments described further below. Specifically, implementation of differential coding functions to mitigate the transmission performance degradation caused by cycle slip. As depicted in FIG. 14B, in the case of counterclockwise differential coding, the IQ value "10" is a 90 degree shift, the IQ value "11" is a 180 degree shift, the IQ value "01" is a −90 degree shift, and the IQ value "00" represents no shift. In an exemplary embodiment, a transceiver implementing the differential coding scheme of plot 1402 of FIG. 14B is configured to support a Π/2 phase rotation with counterclockwise rotation.

FIG. 15 is a schematic illustration depicting an exemplary symbol stream architecture 1500. In an exemplary embodiment, architecture 1500 represents a stream of m×m arrays of symbols, and may be implemented with respect 100G implementations utilizing staircase FEC. For example, a transceiver in compliance with the 100G PHY requirements described herein may be configured to support FEC using 512×510 Staircase codes. For purposes of this discussion, "Staircase codes" are referred to as a class of error-correcting codes that combine ideas from recursive convolutional coding and block coding, resulting in a "continuous" product-like code that is characterized by the relationship between successive matrices of symbols. As illustrated in FIG. 15, architecture 1500 includes a sequence $B_0, B_1, B_2, \ldots$ (i.e., theoretically infinite) of m×m matrices $B_i$, i∈Z+, where the elements of B, are binary.

FIG. 16 is a schematic illustration depicting an exemplary codeword architecture 1600. In the exemplary embodiment depicted in FIG. 16, architecture 1600 is illustrated as a subdivision of a systematic component codeword 1602 having a length 2m, into a leftmost information position 1604 having a length 2m−r, and a rightmost parity position 1606 having a length r. In this example, component codeword 1602 may be a conventional FEC block code (e.g., Hamming, BCH, Reed-Solomon, etc.) in systematic form (also referred to as C), is selected to have block length 2m of symbols, a length r of which constitute parity symbols 1606. That is, leftmost 2m−r symbols 1604 constitute information positions of C, and rightmost r symbols constitute parity positions of C.

FIG. 17 is a schematic illustration depicting an exemplary block subdivision 1700. In the exemplary embodiment depicted in FIG. 17, each block $B_i$ is divided into its m−r leftmost column 1702 and its r rightmost column 1704. In an embodiment, prior to encoding, a first block $B_0$ is initialized to a reference state (e.g., block $B_0$ may be initialized to an all-zero state). Next, m(m−r) information bits are stored in $B_{(1,L)}$, and the values of $B_{(1,R)}$ are calculated by: (i) forming an m×(2m−r) matrix $\Lambda = [B_0^T B_{(1,L)}]$ (i.e., $B_0^T$ is the transposed matrix of $B_0$); and (ii) the elements of $B_{(1,R)}$ are then computed such that each of the rows of the matrix $[B_0^T B_{(1,L)} B_{(1,R)}]$ is a valid codeword of C. That is, the elements in the $j^{th}$ row of $B_{(1,R)}$ are exactly the r parity symbols that result from encoding the 2m−r 'information' symbols in the $j^{th}$ row of A.

Generally, the relationship between successive blocks in a staircase code satisfies the relation: for any i≥1, each of the rows of the matrix $[B_{i-1}^T B_{(i)}]$ is a valid codeword of the component code C (i.e., $B_{i-1}^T$ is the transposed matrix of $B_{i-1}$). An equivalent "visual" description of a staircase code, from which the name originates, is illustrated below with respect to FIG. 18.

FIG. 18 is a schematic illustration depicting an exemplary staircase coding scheme 1800. In the exemplary embodiment depicted in FIG. 18, every row 1802 and every column 1804 in the staircase visualization of scheme 1800 is a valid codeword of C. Most FEC codes are designed to perform under additive white Gaussian noise (AWGN), i.e., the decoder assumes that the noise samples are uncorrelated and Gaussian distributed. The performance of these codes may, however, substantially decrease if the added noise is correlated. Error decorrelators though, may be added to the FEC Encoder/Decoder to reduce the correlation of noise samples, thus approaching the performance under AWGN.

FIG. 19 is a schematic illustration of an exemplary error decorrelator 1900. In an exemplary embodiment, decorrelator 1900 includes a transmitter portion 1902, a receiver portion 1904, communicating over a channel 1906. Transmitter portion 1902 may include one or more software, hardware, or hardware/software hybrid elements such as a frame generator 1908, a bit interleaver 1910, an FEC encoder 1912, and a bit de-interleaver 1914. The receiver portion 1904 may similarly include one or more of a framer 1916, bit interleaver 1918, an FEC decoder 1920, and a bit de-interleaver 1922.

In in exemplary operation of error decorrelator 1900, the position of correlated error symbols may be randomized such that the performance of the staircase code is not impacted by correlated errors. For example, at both the transmitter portion 1902 and receiver portion 1904, the respective error decorrelator interleaver (EDI) and corresponding error decorrelator de-interleaver (EDD) (e.g., bit interleaver 1910/bit de-interleaver 1914, bit interleaver 1918/bit de-interleaver 1922) may operate directly on framed data, in a complementary fashion at the input (and output) of the core encoder (e.g., encoder 1912) and decoder blocks (e.g., decoder 1920). The purpose of performing bit interleaving at the input (EDI) and output (EDD) of the Staircase FEC encoder is to preserve the "systematic" nature of the encoding function (i.e., the position of data bits in the data frame are unaffected). At decoder 1920, the EDI is applied to the input of the Staircase FEC decoder, which effectively randomizes the position of the channel errors. At the decoder output, the EDD is applied to restore the bits to their transmitted ordering.

FIG. 20 is a schematic illustration depicting an exemplary staircase code architecture 2000. In the embodiment depicted in FIG. 20, architecture 2000 represents a 512×510 block staircase encoder encoding of a 512-bit×510-bit staircase code, which is accomplished by considering two-dimensional blocks $B_i$ of binary data, each with 512 rows 2002 and 510 columns 2004. In this example, the block size of 512×510=261120 bits carries exactly two optical transport unit (OTU4, in this example) client payloads. The component code is a 3 error correcting extended BCH(1022, 990) code in this example.

FIG. 21 is a schematic illustration depicting an exemplary component codeword 2100. Due to the staircase construction, it may be convenient to classify the symbols of each component BCH(1022,990) codeword as occupying a "leftside" 2102 or the "rightside" 2104 of codeword 2100. Accordingly, component codewords in the 512×510 staircase code may each include 512 "leftmost" symbols in relation to leftside 2102 (e.g., contributed from the previous staircase block), and 510 "rightmost" symbols in relation to rightside 2104. That is, the symbols ($C_0$, $C_1$, . . . , $C_{511}$) constitute leftside 2102, and the symbols ($C_{512}$, $C_{513}$, . . . , $C_{1021}$) constitute rightside 2104 of the component BCH(1022,990) codeword 2100. In this example, the first two rows of B correspond to shortened codewords (leftmost symbols are assumed to be zeros), which can be exploited in the decoder.

The binary value stored in position (row,column)=(j,k) of $B_i$ may be denoted $d_i\{j,k\}$. In each block, information bits are stored as $d_i\{j,k\}$, $0 \le j \le 511$, $0 \le k \le 477$, and parity bits are stored as $d_i\{j,k\}$, $0 \le j \le 511$, $478 \le k \le 509$. The parity bits are computed such that: for row j, $0 \le j \le 1$, and $[d_i\{j,478\}, d_i\{j,479\}, \ldots, d_i\{j,509\}]$ is calculated as $[d_i\{j,478\}, d_i\{j,479\}, \ldots, d_i\{j,509\}]=[0,0, \ldots, 0, d_i\{j,0\}, d_i\{j,1\} \ldots, d_i\{j,477\}]P$, where P is a 990×32 parity-generation matrix; and for row j, $2 \le j \le 511$, $[d_i\{j,478\}, d_i\{j,479\}, \ldots, d_i\{j,509\}]$ is calculated as $[d_i\{j,478\}, d_i\{j,479\}, \ldots, d_i\{j,509\}]=[d_i\{0,1\}, d_{i-1}\{1,1\}, \ldots, d_{i-1}\{511,1\}, d_i\{j,0\}, d\{j,1\} \ldots, d_i\{j,477\}]P$, where $l=\Pi_d(j-2)$, and $\Pi_d$ is a permutation function.

FIG. 22 is a schematic illustration depicting an exemplary staircase decoding window 2200 for a series of blocks 2202. In the embodiment depicted in FIG. 22, decoding window 2200 is illustrated as a five-block staircase decoding window for a 512×510 Staircase decoder. In exemplary operation of decoding window 2200, staircase codes are decoded by iteratively decoding the BCH component codewords within decoding window 2200, and decoding window 2200 includes an implementation-specific number of consecutive staircase blocks (five blocks, in this example). That is, the 512×510 Staircase decoder deploys, as a minimum, a 5-block decoding window (e.g., decoding window 2200) to perform iterative decoding of its BCH(1022,990) component codewords.

In this example, a total latency 2204 in this minimum configuration will be seven staircase blocks. Decoding window 2200 then moves forward in time (i.e., to the "right" from the perspective depicted in FIG. 22) once the parity bits corresponding to block $B_{i-1}$ are received. At every shift in decoding window 2200, iterative decoding may then be performed over the respective component codewords within decoding window 2200. Therefore, in this embodiment, implementation of the 512×510 Staircase code achieves a net coding gain of 9.38 dB at an output BER=$1.0e^{-15}$. The input BER threshold is $4.5e^{-3}$ Accordingly, latency 2204 of the minimum 512×510 Staircase decoder is 7×512×510=1,827,840 bits.

FIG. 23 is a schematic illustration depicting a non-correctable stall error pattern 2300 for a staircase coding scheme. In theory, burst error tolerance can be as high as 1538 bits (e.g., approximately three columns of B) if there are no additional random or correlated errors (and assuming error decorrelator function is turned off). In practice, it is often necessary to take into account additional random and/or correlated errors when specifying the burst error tolerance. Thus, it is expected that implementation of an error decorrelator function may be necessary to prevent non-correctable stall error patterns, as depicted in FIG. 23. At the transmitter, information bits of an 8×30592 bit input block $B_i$ (in a row-by-row, i.e., a left-to-right, top-to-bottom order) May be passed through an error decorrelator inter-leaver (EDI) process, after which the interleaved information bits $B_i^*$ may be written into a 512×478 bit array (in a column-by column, i.e., top-to-bottom, left-to-right order). In parallel, the parity bits in a 512×32 bit array holding the parity computed over the previous 8×30592 bit input block $B_{i-1}$ may be passed through (also in a column-by-column, i.e. top-to-bottom, left-to-right order) an error decorrelator de-interleaver (EDD) process, after which the de-interleaved parity bits $B_{i-1}$ may be written into a 8×2048 bit array. Staircase FEC parity may then be computed over the information bits of the block ($B_i^*$) within the 512×478 bit array, the information bits of the previous block ($B_{i-1}^*$) that are located in the other 512×478 bit array, and the parity bits in a 512×32 bit array containing the parity bits of the previous computation ($B_{i-1}$). The computed parity bits may be written in a row-by-row basis in the other 512×32 bit parity array ($B_i$). The client information bits of block i ($B_i$) and the computed parity bits of block i–1 ($B_{i-1}^*$) may then be combined and transmitted within the client frame format.

At the corresponding receiver, the received information bits of block i and parity bits of block i–1 may similarly be passed through an EDI process, after which the interleaved information and parity bits may be written into one of m 512×478 and 512×32 bit arrays (in a column-by column, i.e., top-to-bottom, left-to-right order). In parallel, the corrected information bits in a 512×478 bit array holding the interleaved bits of information of block i–m ($B_{i-m}$) may be passed through (in a column-by-column, i.e., top-to-bottom, left-to-right order) an error decorrelator de-interleaver (EDD) process after which the de-interleaved information bits B, may be mapped in a 8×30592 bit block structure (in a row-by-row, i.e., a left-to-right, top-to-bottom order). Staircase codes may then be decoded by iteratively decoding the component codewords within a decoding window (e.g., decoding window 2200, FIG. 22). The corrected information bits in block $B_{i-m}$ may then be written in a row-by-row basis.

In simulations including random errors at BER=$4.0e^{-3}$, correlated errors due to differential decoding, and burst errors of N bits occurring every 10 FEC blocks, bursts of up to N=400 bits have been shown to be tolerated with small penalty, i.e., backing off maximum input BER from $4.5e^{-3}$ to $4.0e^{-3}$ (e.g., approximately a 0.1 dB penalty). Such simulations have proven particularly informative with respect to the 100G PHY specification described herein.

Transceivers that are compliant with respect to the present systems and methods, whether for the 100G PHY embodiments, the 200G PHY embodiments, or embodiments not specific to the present, new optical PHY layers will conform to a number of general transceiver requirements. The present description though, is not intended to define specific environmental conditions that compliant transceivers are required to support. In most cases, environmental condition specifications are expected to be defined by the end customer when defining their purchasing requirements. Nevertheless, for transceivers operating in the field, the present embodiments assume that such transceivers are expected to be required to operate at startup temperatures as low as −40 C, and may need to operate in conditions with an internal temperature as high as +85 C. Accordingly, for the expected range of temperatures supported by the transceiver (as defined by the manufacturer), it is assumed that such transceivers are able to meet the requirements of the present systems and methods across the entire supported temperature range.

With respect to the client side interface, the embodiments herein are described with respect to solutions utilizing the present PHY will support Ethernet transport. That is, for illustrative purposes, the compliant transceivers of the present embodiments are described herein as being capable of supporting Ethernet input and output on the client side interfaces (e.g., element 1022, FIG. 10, element 1122, FIG. 11). Nevertheless, the person of ordinary skill in the art will appreciate that other layer 2 protocols, for example, may be supported within the scope of the present systems and methods.

The electrical interfaces described herein are assumed to be compliant with the 100G and 200G embodiments of the present description, but may be otherwise generally defined by the respective product definitions. Nevertheless, the compliant transceivers of the present embodiments are described as being capable of supporting 2×100 GbE on the client side, in thereby providing 200G at the optical interface on the line side. However, an electrical interface supporting 2×100 GbE is described by way of example, and not in a limiting sense. The person of ordinary skill in the art will appreciate that other electrical interface configurations, 200 GbE, for example, are within the scope of the present description, and such transceivers are similarly assumed to support the transport of Ethernet traffic and Ethernet frames.

Referring back to FIGS. 10 and 11, two different line side interface options are described herein, namely, a dual optical interface option (e.g., transceiver 1000), and a single optical interface option (e.g. transceiver 1100). According to the present systems and methods, either interface option is capable of supporting a single frequency for transmitting and receiving, on the one hand, or separate frequencies for transmitting and receiving come on the other hand. That is, the present embodiments are configured to support both line side interface options. In an exemplary embodiment, the complaint transceiver is configured to support use of the same frequency for transmitting and receiving, and may further be optionally configured to be capable of supporting transmitting and receiving using different frequencies.

Also in an exemplary embodiment, complaint transceivers supporting the 200G mode of operation may be optionally configured to further include backward capability to support the 100G mode of operation, in addition to the 200G functionality described herein. In at least one embodiment, a compliant device supporting the 100G mode of operation it is further configured to include a mechanism for switching between the 100G and 200G modes. That is, when the compliant device is operating in the 100G mode, the transceiver will meet relevant requirements for 100G operation; when the compliant device is operating in the 200G mode, the transceiver will meet all the relevant requirements for 200G operation.

FIG. 24 is a schematic illustration depicting a client side adaptation process 2400. In an exemplary embodiment, process 2400 is configured to adapt client side data into coherent line side data through a series of framing, FEC, and mapping operations. In the embodiment illustrated in FIG. 24, a client side interface 2402 provides two 100 GbE client signals 2404, which may then be adapted for transport over a 200G coherent DP-QPSK or DP-16QAM optical link.

In exemplary operation of process 2400, the two 100 GbE clients 2404 are initially mapped, by a mapping unit 2406, into two 100G FlexO frame structures 2408, which are then multiplexed, by a multiplexing unit 2410 (e.g., including a 10b multiplexer), from the two separate 100G FlexO frame/multi-frame aligned structures into a 200G FlexO-2-NP (e.g., 200G FlexO without parity field) frame structure 2412. 200G FlexO-2-NP frame structure 2412 may then be adapted, at a padding unit 2414, scrambled by a scrambler 2416, and open FEC (oFEC) encoded at an oFEC block 2418. After FEC encoding at block 2418, frame structure 2412 may be further interleaved by an interleaver 2420, thereby rendering frame structure 2412 into FlexO-2-<oFEC>. The bitstream of the resultant FlexO-2-<oFEC> frames may then be mapped, by a symbol map 2422 into constellation symbols of each polarization (described above) at a polarization distribution block 2424, after which training symbols may be added, Super-Frame Alignment Word (super-FAW) symbols added at FAW blocks 2426, and pilot symbols added at pilot blocks 2428.

FIG. 25 is a schematic illustration depicting a framing and mapping subprocess 2500 of process 2400, FIG. 24. In the embodiment depicted in FIG. 25, subprocess 2500 emphasizes the conversion of the two 100GBASE-R Ethernet clients 2404 into the FlexO-2-NP frames of frame structure 2412 that are subsequently adapted and scrambled before being FEC encoded (described further below with respect to FIG. 26). In exemplary operation of subprocess 2500, the two 100 GbE Ethernet Clients (e.g., 100GBASE-R) may be defined according to IEEE 802.3-2018, and the client FEC, if any, is presumed in this embodiment to have been terminated prior to mapping by mapping unit 2406. Mapping unit 2406 may, for example, be defined according to ITU-T G.709, and then multiplexing unit 2410 may be defined according to ITU-T G.709.1.

The individual configuration of the elements depicted within mapping unit 2406 are the provided for illustration purposes, and not in a limiting sense. In an exemplary embodiment, the compliant transceiver is configured such that mapping unit 2406 is capable of: (i) mapping 100GBASE-R signals 2404 into an optical transport unit/ optical data unit/optical payload unit (e.g., OTU4/ODU4/ OPU4) structure, such as that defined in ITU-T G.709; (ii) mapping the respective 100GBASE-R payloads into an OPU-4 using GMP, such as that defined in ITU-T G.709 subclause 17.7.5; (iii) supporting 100GBASE-R multi-lane processing, such as that defined in ITU-T G.709 subclause 17.7.5.1; (iv) mapping each ODU4 signal into an ODTUC signal, and the ODTUC into the OPUC tributary slots, such as that defined in ITU-T G.709 clause 20; (v) mapping each OTUC signal into a FlexO frame instance, such as that defined in ITU-T G.709.1 Clause 10; and (vi) aligning and deskewing the OTUC instances, such as according to the definition in ITU-T G.709.1 subclause 10.4.

FIG. 26 is a schematic illustration of an encoding subprocess 2600 of process 2400, FIG. 24. In the embodiment depicted in FIG. 25, subprocess 2600 emphasizes adaptation and encoding of FlexO-2-NP frame structure 2412 immediately prior to interleaving into the FlexO-2-<oFEC>. In exemplary operation of subprocess 2600, the complaint transceiver is configured to support adaptation (e.g., at padding unit 2414) according to ITU-T G.709 Annex E specifications for adaptation of 64/66B encoded 100GBASE-R interfaces. In an exemplary embodiment, the complaint receiver is further configured such that: (i) interleaver 2420 is capable of interleaving each FlexO frame instance into a FlexO-2-NP frame structure, such as that described further below with respect to FIGS. 29 and 30; (ii) padding unit 2414 is capable of adapting the FlexO-2-NP frame structure to the oFEC blocks, such as that described further below with respect to FIGS. 30 and 31, including padding insertion; and (iii) scrambler 2416 is capable of frame synchronous scrambling, such as that described further below with respect to FIG. 32.

For process 2400, including subprocesses 2500, 2600, the intermediate frame structure bit rates (i.e., client types and payload bit rates) are illustrated below in Table 1. The respective frame structures thereof, as well as the adaptation to the oFEC blocks, are described further below.

TABLE 1

| Interface | Interface Nominal Bit Rate | Tolerance |
| --- | --- | --- |
| 100GBASE-R | 103.125000000 Gbps | ±100 ppm |
| ODU4 | 104.794445815 Gbps | ±20 ppm |
| ODUC | 105.258138053 Gbps | ±20 ppm |
| FlexO | 105.643510782 Gbps | ±20 ppm |
| FlexO-2-NP | 211.287021564 Gbps | ±20 ppm |

FIG. 27 is a schematic illustration of an exemplary frame structure 2700. In the embodiment illustrated in FIG. 27, frame structure 2700 represents a FlexO (100G) frame structure, such as that defined in ITU-T G.709.1. According to this example, each 100G instance will realize block formats having 128 rows 2702 by 5,140 1-bit columns 2704.

FIG. 28 is a schematic illustration of an exemplary multi-frame format structure 2800. In the embodiment illustrated in FIG. 28, multi-frame format structure 2800 represents an 8-frame multi-frame structure having a FlexO multi-frame format, such as that defined in ITU-T G.709.1. In the exemplary embodiment, structure 2800 includes seven fixed stuff (FS) locations 2802 within the respective payload area 2804 of the FlexO frames, and each FS location therefore has, in this example, 1,280 bits. Also in this example, the FS locations occur at row 65, columns 1 to 1,280, of each of the first seven frames within multi-frame structure 2800. In this example, the last frame (i.e., frame eight) within multi-frame structure 2800 does not contain FS or an FS location. In an embodiment, the relevant FS bits may be filled with all zero values, not checked at a receiver sink function.

In the exemplary embodiment, the respective FlexO multi-frame payloads in payload areas 2804, excluding FS locations 2802, will include 5,244,160 bits (i.e., 655,520 bytes) of the total 5,263,360 bits (i.e., 657,920 bytes) available to FlexO multi-frame structure 2800. In an embodiment, structure 2800 further includes alignment markers (AM), padding (PAD), and overhead (OH) inserted in the first row of each FlexO frame, and may generally conform to ITU-T G.709.1 definitions. In the exemplary embodiment, the compliant transceiver is configured to support FlexO frame structures 2700, 2800, as depicted in FIGS. 27, 28, respectively.

FIG. 29 is a schematic illustration of an exemplary frame structure 2900. In the embodiment illustrated in FIG. 29, frame structure 2900 represents a FlexO-2-NP frame structure, similar to the FlexO-2-SC frame structure defined in ITU-G.709.3. That is, ITU-G.709.3 Clause 12 defines a FlexO-2-SC frame structure as having 10970b×128 rows, with FEC OH in row 1, columns 961 to 1920, and a parity area in columns 10281 to 10970 of all rows. The FlexO-2-NP frame structure may thus be similar to this FlexO-2-SC frame structure, but excludes the parity field thereof. In the exemplary embodiment, parity may then be added by the oFEC block (e.g., oFEC block 2418, FIG. 24) and interleaver stage (e.g., interleaver 2420, FIG. 24) downstream of FlexO-2-NP frame structure 2900. In the exemplary embodiment, the compliant transceiver is further configured to support FlexO-2-NP frame structure 2900.

FIG. 30 is a schematic illustration of an exemplary interleaved frame structure 3000. In the embodiment illustrated in FIG. 30, frame structure 3000 represents the interleaving of FlexO frames 3002 to a FlexO-2-NP frame structure 3004. In an exemplary embodiment, two frame/multi-frame aligned 100G FlexO instances 3002 are 10-bit interleaved (e.g., as defined in clause 12 of ITU-G.709.3) into FlexO-2-NP frame structure 3004 in a manner similar to that defined by ITU-G.709.3 clause 12 with respect to the FlexO-2-SC frame structure. In this example, the 120 byte FEC OH defined for FlexO-2-SC is not required for FlexO-2-NP, and May instead be defined as reserved (RES). The FlexO-2 and FlexO-2-NP AM, PAD, and OH fields thereby indicate the interleaved FlexO AM, PAD, and OH instances of an interleaving process 3006. In the exemplary embodiment, the compliant transceiver is configured to support the 10-bit interleaving process 3006 to create FlexO-2-NP frame structure 3004.

With respect to FlexO-2-NP Adaptation to FlexO-2-<oFEC>, in the case of 200G DP-QPSK modulation, 58 FlexO-2-NP rows, plus 496 bits of all-zero PAD, are added (e.g., by padding unit 2414, FIG. 24), and then scrambled (e.g., by scrambler 2416) to 84° F.EC blocks (e.g., oFEC blocks 2418). In the case of 200G DP-16QAM modulation, 116 FlexO-2-NP rows, plus 992 bits of all-zero PAD, are added, and then scrambled, to 168° F.EC blocks. The scrambled data may then be bit-demultiplexed to two oFEC encoders (e.g., within oFEC block 2418), each of which operates on input blocks of 3552 bits and produces output blocks of 4096 bits, as summarized below in Table 2, with respect to oFEC adaption rates.

TABLE 2

| Modulation Format | FlexO-2-NP Mapped Payload Rows | oFEC Blocks | PAD (bits) | Pre FEC Encode (bits) | Post FEC Encode (bits) |
| --- | --- | --- | --- | --- | --- |
| 200G DP-QPSK | 58 rows, (2,320 × 257 bits) | 84 | 496 | 596,736 | 688,128 |
| 200G DP-16-QAM | 116 rows, (4640 × 257 bits) | 168 | 992 | 1,193,472 | 1,376,256 |

FIG. 31 is a schematic illustration of an exemplary block mapping scheme 3100. In the embodiment illustrated in FIG. 31, a FlexO-2-NP frame structure 3102 is depicted to be mapped to an oFEC block structure 3104 for a mode and modulation format of 200G DP-QPSK. In the exemplary embodiment, mapping scheme 3100 includes additional PAD locations 3106 and scrambler reset locations 3108. In an embodiment, the compliant transceiver is configured to support block mapping scheme 3100.

FIG. 32 is a schematic illustration of an exemplary block mapping scheme 3200. In the embodiment illustrated in FIG. 32, a FlexO-2-NP frame structure 3202 is depicted to be mapped to an oFEC block structure 3204 for a mode and modulation format of 200G DP-16QAM. In the exemplary embodiment, mapping scheme 3200 includes additional PAD locations 3206 and scrambler reset locations 3208. In an embodiment, the compliant transceiver is configured to support block mapping scheme 3200.

With respect to both mapping schemes 3100, 3200, padding insertion and removal may be performed, for the purpose of oFEC alignment and synchronization. The padding insertion and removal may be accomplished by prepending and removing pad bits, respectively, from the FlexO payload area. In these cases, The PAD may be an all-zero field that is scrambled prior to encoding, and then removed after decoding and descrambling. According to this example, the compliant transceiver is configured to support an all-zero field PAD where indicated by various frame structures.

FIG. 33 is a schematic illustration of an exemplary frame synchronous scrambler 3300. In an embodiment, frame synchronous scrambler 3300 is configured to perform scrambling and descrambling (e.g., a scrambler/descrambler), and is located before the oFEC encoder block on transmit (e.g., scrambling), and after the oFEC decoder block on receive (e.g., descrambling). In exemplary operation, scrambler 3300 scrambler may be functionally equivalent to that of a frame-synchronous scrambler of sequence 65535, and the generating polynomial will be $x^{16}+x^{12}+x^3+x+1$.

Scrambler 3300 further includes a reset 3302 such that the scrambler/descrambler may reset to 0xFFFF on row 1, column 1, of each new oFEC block (i.e., on the first bit of a FlexO-2-NP payload mapped to the oFEC block structure, or after the last bit of PAD from the previous oFEC block structure). In the exemplary embodiment, scrambler 3300 is configured to run continuously over the entire FlexO-2-NP frame, and includes a clock 3304.

FIG. 34 is a schematic illustration of an exemplary encoding and interleaving unit 3400. In an exemplary embodiment, unit 3400 includes elements similar in form and function to similarly-labeled elements of process 2400, FIG. 24. For example, unit 3400 includes one or more of a scrambler 3402, an oFEC encoder engine 3406, an interleaver 3408, and a symbol mapping unit 3410. In this example, a base 0 as described for purposes of mathematical formula convenience. In the exemplary embodiment, oFEC encoder engine 3406 may represent a block-code-based encoder and iterative soft-decision (SD) decoder with 11.1 dB @ $10e^{-15}$ (QPSK) net coding gain (NCG) and 11.6 dB @ $10e^{-15}$ (16QAM) NCG after three SD iterations (e.g., correction to $\leq 10e^{-15}$ with pre-FEC BER $2.0e^{-2}$). The combined latency of the encoder and decoder is, in this example, less than 3 ps.

A datapath 3412 is formed between oFEC encoder engine 3406 and interleaver 3408. Accordingly, in exemplary operation, the 7104 bits from scrambler 3402 may be bit demultiplexed into two parallel 3552/4096 encoders ENC0, ENC1. Accordingly, even-numbered bits (e.g., 0 based) go to encoder 0 (i.e., ENC0) and odd-numbered bits Wilco to encoder 1 (i.e., ENC1) of oFEC encoder engine 3406. In the exemplary embodiment, each encoder instance of oFEC encoder engine 3406 produces an oFEC codeword, which is an infinite set of bits organized in a matrix with an infinite number of rows and N columns (N=128, in this example).

The oFEC codeword has the property that each bit thereof is part of two "constituent codewords," and each such constituent codeword represents a binary vector x of length 2N satisfying the constraint xH=0, where H is a (2N, 2N−k) binary matrix, with 2N>k>N. In this example, k=239, and each constituent code therefore has (2N−k)=17 parity bits. Accordingly, the fraction of bits that are parity bits is 17/128, the rate of the code is 111/128=0.867, and the overhead is 17/111=15.3%.

More particularly, in this example, H is the parity check matrix of an extended BCH(256, 239) code with minimum Hamming distance 6, using a textbook encoding; i.e., if x is a codeword satisfying xH=0, then x has an even parity, and, if the first 255 bits of x are seen as the coefficients of a polynomial of degree 254 (with bit 0 of x being the coefficient of power 254), then this polynomial is divisible by the binary polynomial $y^{16}+y^{14}+y^{13}+y^{11}+y^{10}+y^9+y^8+y^6+y^5+y+1$.

FIG. 35 depicts an exemplary open forward error correction structure 3500. Structure 3500 enables construction of constituent codewords such that high-speed parallel encoding and decoding it is enabled. Bit portions of a particular constituent code of structure 3500 are defined according to the following considerations.

First, and infinite matrix 3502 of bits is partitioned in blocks 3504 of B×B bits (B=16 in this example), arranged in rows 3506 and columns 3508. Each row 3506 includes N/B blocks (N/B=8, in this example), and each block is identified by a block row number, R, and a block column number, C, where C=0, 1, . . . , N/B−1. Each bit inside a block may then be identified by its respective row number, r, where r=0, 1, . . . , B−1, and by its respective column number, c, where c=0, 1, . . . , B−1. Thus, as illustrated in FIG. 35, bit 0, 0 is depicted as residing at the upper left corner of a block, and each bit within infinite matrix 3502 may be identified by a quadruple {R, C, r, c}. In an embodiment, structure 3500 further includes a number of even guard-block rows 3510 needs having a value 2G, (G=2, or 4 rows, in this example).

A constituent codeword (R, r) may then be labeled by its respective block row number R and its bit row number r, where r=0, 1, . . . , B−1. The kth bit (e.g., k=0, 1, . . . , 2N−1) of the constituent code (R, r) will then be the bit identified according to the following quadruples:

$$\{(R\hat{}1)-2G-2N/B+2[k/B],[k/B],(k \% B)\hat{}r,r\} \text{ (for } k\leq N)$$

$$\{R,[(k-N)/B],r,(k\%B)\hat{}r\}\text{(for } k\geq N)$$

where [ ] denotes the floor operator, (a % b) denotes the value of a modulo b, and (a ^b) represents the number with a binary representation equal to the bit-wise "exclusive or" of the binary representations of the numbers a and b. In the embodiment depicted in FIG. 35, the union vertical or horizontal line segments indicates bits forming a constituent codeword.

In the case of a constituent codeword (20, 0), bits 0 to 15 may be seen to be located in column 0 of block (1, 0), bits 16 to 31 are located in column 0 of block (3, 1), . . . , and bits 112 to 127 are located in column 0 of block (15, 7). That is bit indices will increase when descending in the respective columns. In a related manner, bits 128 to 255 are located in row 0 of blocks (20, 0) to (20, 7), and the indices may be seen to contrastingly increase when moving "rightward" in a row.

Bits 0 to 127 are thus referred to as the "front" of a constituent codeword, and bits 128 to 255 are referred to as the "back" of the constituent codeword. Each bit in the oFEC encoder therefore belongs to the front of one constituent codeword, but to the back of another constituent codeword. It may be noted that, if the back of a constituent codeword is in an odd-numbered row of blocks, then the front of that constituent codeword will be in even-numbered rows of blocks. The blocks located below the front blocks and above the back blocks are guard blocks, relative to the constituent codeword of interest.

In the case of constituent codeword (20, 15), the bits thereof are located in the same blocks as the segments of constituent codeword (20, 0). However, because "r" is 15 in this example (as opposed to 0, in the previous example), the expressions "ˆr" in of the respective formulas become more significant, and the bits will be taken in reverse order in each block. For example, bits 0 to 15 in the front of codeword (20, 15) become bits 15 to 0 in column 15 of block (1, 0).

In an embodiment, the oFEC encoder implements a convolutional code, having performances characterized by its "error events." Accordingly, without the "ˆr" permutation, there are approximately 625,000 possible error events of weight 36 that may start at every decoding of a constituent codeword. For comparison, a Product Code based on the same constituent code may have more than $3.3e^{13}$ codewords of weight 36. Therefore, the presence of the "ˆr" permutation may be observed to eliminate error events of weight 36. Consequently, the minimum Hamming distance of the oFEC encoder should be at least 42, in this example. The compliant transceiver accordingly is configured to support: (i) the oFEC encoder definition described further below with respect to FIGS. 26 and 27; (ii) the oFEC interleaver described further below with respect to FIG. 28; (iii) an oFEC overhead rate of $15.\overline{315}\%$; (iv) an oFEC decoder with a net coding gain of at least 11.1 dB, when operating with QPSK modulation; and (v) an oFEC decoder with a net coding gain of at least 11.6 dB, when operating with 16QAM modulation.

In an embodiment, encoding is performed sequentially, in order of increasing rows. In the exemplary embodiment, all constituent codes (R', r'), e.g., with R'<R−2G, will have been already encoded at the time when a constituent codeword (R, r) is being encoded. A constituent codeword (R, r) may be encoded, for example, by forming a vector x of length 2N, where the front N bits of the constituent codeword are read from previously encoded bits within infinite matrix 3502. In the back of the constituent codeword, the first k−N (i.e., 111) bits represent new, i.e., "fresh," information bits, and the remaining 2N−k (i.e., 17, in this example) back bits serve as parity bits that may be calculated to satisfy xH=0. After encoding, the N back bits may then be placed at their respective positions within infinite matrix 3502, as described above, and the positioned bits may then be output to the interleaver.

In an embodiment of structure 3500, the value for G is selected to be sufficiently large enough to allow the parallel encoding of 2B(G+1)=96 constituent codes. In this embodiment, an assumption is made that the pipeline delay is relatively small. The number of constituent codes may be significantly reduced as the pipeline delay increases, which is more likely to be a factor in the decoder then in the encoder. In at least one embodiment, a minimum number N/B (N/B+2G+1)=104 of blocks are kept in the encoder memory (not shown in FIG. 35, and may exclude the current input). In this example, a block group 3512 (represented within the dashed line boundary depicted in FIG. 35) represents the blocks that are needed to be kept in the memory in order to encode block rows 20 and 21. In this embodiment, a large value for G will enable the transceiver to allow for longer pipeline delays in the encoding and decoding operations, as well as additional more parallel execution in the encoder and decoder. However, increases to the value for G may typically be realized at the expense of increased memory. This potential trade-off may, in some cases, be resolved as an initial design consideration of the system. In other cases, this trade-off may be dynamically changed over time in response to real-time operational characteristics and/or modifications/upgrades to various system components.

FIG. 36 depicts an exemplary bit sequencing scheme 3600. In the embodiment illustrated in FIG. 36, bit sequencing scheme 3600 represents a bit sequencing arrangement within an input rectangle 3602 at the encoder interface or encoder input. In this example, the encoder input includes a plurality of rectangular blocks having a block size of (2B)×(2N−k)=32×111 bits, and numbered 0, 1, 2, . . . . Utilizing bit sequencing scheme 3600, the individual bits may being input into the encoder and sequenced accordingly. According to bit sequencing scheme 3600, the $i^{th}$ input bit may be placed in rectangle [i/(32×111)] at the position indicated by the value i % (32×111). In this example, input rectangle 3602 is divided into a plurality 16×16 bit blocks 3604, except along the rightmost edge of input rectangle 3602 where bit blocks 3606 our 16×15. Accordingly, bit k=0, 1, 2, . . . of row p in rectangle P (e.g., input rectangle 3602) may be placed in position N+k of constituent codeword represented as (2P+[p/B], p % B).

FIG. 37 depicts an exemplary bit numbering scheme 3700. In the embodiment illustrated in FIG. 37, bit numbering scheme 3700 represents a bit numbering arrangement within an output rectangle 3702 at the encoder output. In this example, the encoder output includes a plurality of rectangular blocks having a block size of (2B)×N=32×128 bits, and where the rectangles are similarly numbered 0, 1, 2, . . . . Accordingly, bit k=0, 1, 2, . . . of row p in rectangle P (e.g., output rectangle 3702) represents the bit {2P+[p/B], [p/B], k/B, p % B} of the infinite array (e.g., infinite array 3502, FIG. 35). The respective bits within may then be sequenced accordingly.

For purposes of the illustrative embodiments described herein, the encoder output bits are described as a function of the respective input bits. Accordingly, the present systems and methods introduce a significant innovation that integrates these otherwise conventionally diverse elements. This advantageous relationship between the encoder input and output enables a former encoder definition for several of the embodiments described herein, which is particularly useful with respect to the 200G mode of operation.

Therefore, for ease of explanation, the present oFEC encoder described as being an entity (hardware or software) that produces a binary output y(i) from a binary input u(i), where i=0, 1, 2, . . . . This relationship between y and u may be thus expressed through several intermediate variables including, without limitation, a multidimensional vector V(R, C, r, c), where: R is an integer; C=0, 1, . . . , 7; r=0, 1, . . . , 15; and c=0, 1, . . . , 15.

There are several constituent codeword vectors Associated with a vector V, there are constituent code vectors $W_{R,r}(i)$ that may be associated with the vector V, and for values of: R≥0; r=0, 1, 2 . . . 15; and i=0, 1, . . . , 255.

Therefore, for values of R≥0, their associated constituent code vectors $W_{R,r}(i)$ a be represented according to $$W_{R,r}(k)=V((R\char`\^1)-20+2[k/16],[k/16],(k\%16)\char`\^r,r) \text{ (for } k<128),$$

and $$W_{R,r}(k)=V(R,[(k-128)/16],r,(k\%16)\char`\^r) \text{ (for } 128\leq k\leq 256),$$

where [ ] denotes the floor function, (a % b) denotes the value of a modulo b, and (a^b) represents the number with a binary representation equal to the bit-wise "exclusive or" of the binary representations of the numbers a and b.

In an embodiment, the complaint receiver is configured such that bits in the constituent codeword vectors $W_{R,r}$ will satisfy the equalities, for values of R≥0, r=0, 1, . . . , 15, and k=0, 1, . . . , 110:

$$W_{R,r}(128+k)=u([R/2]\times32\times111+((R\%2)\times16+r)\times(16-[k/96])+[k/16]\times512+k\%16).$$

In the case of R≥20, the value of constituent code $W_{R,r}H=0$, where H represents the parity check matrix of an extended BCH(256, 239) code. Utilizing textbook encoding techniques, if x is a vector satisfying xH=0, then x may be determined to have an even parity. And, if the first 255 bits of x are considered to be the coefficients of a polynomial of degree 254 (with bit 0 of x being the coefficient of power 254), then the polynomial will be divisible by the binary polynomial $y^{16}+y^{14}+y^{13}+y^{11}+y^{10}+y^9+y^8+y^6+y^5+y+1$.

Therefore, the output y may be configured to satisfy the relationship (e.g., for values of R≥0; C=0, 1, . . . , 7; r=0, 1, . . . , 15; and c=0, 1, . . . , 15):

$$V(R,C,r,c)=y([R/2]\times32\times128+(R\%2)\times256+C\times16\times32+r\times16+c)$$

in this example, it may be observed that 20×16×17 values are left undefined in constituent codeword vectors $W_{R,r}$, within the main vector V(R, C, r, c) for 0≤R≤20, and thus also in the output y. In an exemplary embodiment, the undefined values may be deliberate, such that the system designer is free to any convenient values for the specific implementation.

In contrast, in the case of test vectors, the output values would be completely specified. Accordingly, with respect to a test vector embodiment, additional constraints are included in the design such that, for 0<R<20, $W_{R,r}H'=0$, where H' represents a 256×17 binary matrix having the first 128 rows all having zero values, and the last 128 rows are equal to the last 128 rows of H.

In at least one embodiment, the present systems and methods further enable the adaptation of iterative algorithms, designed for turbo decoding of Product Codes, decode oFEC codewords. Accordingly, for the iterative decoding use case, the bits in block row R will all have been decoded as front bits in later constituent codewords after 2 (N/B+G+1) rows of blocks have been decoded. More particularly, referring back to FIG. 35, the bits in row R=0 will all have been decoded as front bits by the time block row 21 has been decoded. In such cases, it may be desirable, according to the present systems and methods to again decode the constituent codewords in block row 0.

Referring back to FIG. 34, FEC datapath 3412 illustrates how, after oFEC encoding by oFEC block 3406, block interleaving of 172,032-bit blocks performed by interleaver 3408, followed by symbol mapping by symbol mapping unit 3410. In this embodiment, interleaving of the bit stream enables de-correlation of the noise between consecutively received symbols, as well as uniform distribution of the symbols. As illustrated in FIG. 34, block interleaver 3408 uses 4-block interleaving for DP-QPSK, and 8-block interleaving for DP-16QAM signaling. The architecture of oFEC interleaver 3408 includes an oFEC interleaver buffer size of 172,032 bits, which may be organized as an (84, 8) array of 16×16 bit blocks as illustrated further below with respect to Table 3. In an exemplary embodiment, the interleaver format may be similar to the format(s) implemented for the encoder and decoder, described above.

In the exemplary embodiment, interleaver 3408 further includes two mechanisms, which may be applied as hardware, software, or combination thereof: (i) an intra-block interleaver mechanism; and (ii) an inter-block interleaver mechanism. The intra-block interleaver mechanism is configured to reorder the bits in each 16×16 block to ensure that the bits in each row and column of a block at the encoder output are remapped substantially uniformly in the block for transmission on the line. In an embodiment, this operation occurs at the input to interleaver 3408. The inter-block interleaver mechanism is configured such that bits are widely separated in the encoder output are contained within nearby symbols on the line.

In the exemplary embodiment, interleaver 3408 is considered to operate at full rate, but is fed by two half-rate encoders, ENC0 and ENC1. Successive rows of blocks from encoder ENC0 will thus be written in even block rows of the interleaver buffer (e.g., as illustrated further below with respect to FIG. 38), whereas successive rows of blocks from encoder ENC1 will be written in odd block rows. Consequently, in this example, the content of an interleaver buffer will be the row-by-row interleaving of vertical segments of the infinite matrices of encoders ENC0 and ENC1.

For the purpose of intra-block interleaving, interleaver 3408 may be considered to receive 16×16 blocks of bits from the respective encoders, and each such block may thus be considered separately. An exemplary distribution of intra-block interleaving may be specified according to the values shown in Table 3, below, which indicates the row and column positions of the source bit for each destination bit in the block. For example, bit (14, 15) [base 0] in an interleaver input block (i.e., encoder output block) it is, in this example, placed in row 1 of column 0 of the corresponding interleaver buffer block.

TABLE 3

| 0, 0 | 1, 1 | 2, 2 | 3, 3 | 4, 4 | 5, 5 | 6, 6 | 7, 7 | 8, 8 | 9, 9 | 10, 10 | 11, 11 | 12, 12 | 13, 13 | 14, 14 | 15, 15 |
|---|---|---|---|---|---|---|---|---|---|---|---|---|---|---|---|
| 14, 15 | 15, 0 | 0, 1 | 1, 2 | 2, 3 | 3, 4 | 4, 5 | 5, 6 | 6, 7 | 7, 8 | 8, 9 | 9, 10 | 10, 11 | 11, 12 | 12, 13 | 13, 14 |
| 12, 14 | 13, 15 | 14, 0 | 15, 1 | 0, 2 | 1, 3 | 2, 4 | 3, 5 | 4, 6 | 5, 7 | 6, 8 | 7, 9 | 8, 10 | 9, 11 | 10, 12 | 11, 13 |
| 10, 13 | 11, 14 | 12, 15 | 13, 0 | 14, 1 | 15, 2 | 0, 3 | 1, 4 | 2, 5 | 3, 6 | 4, 7 | 5, 8 | 6, 9 | 7, 10 | 8, 11 | 9, 12 |
| 8, 12 | 9, 13 | 10, 14 | 11, 15 | 12, 0 | 13, 1 | 14, 2 | 15, 3 | 0, 4 | 1, 5 | 2, 6 | 3, 7 | 4, 8 | 5, 9 | 6, 10 | 7, 11 |
| 6, 11 | 7, 12 | 8, 13 | 9, 14 | 10, 15 | 11, 0 | 12, 1 | 13, 2 | 14, 3 | 15, 4 | 0, 5 | 1, 6 | 2, 7 | 3, 8 | 4, 9 | 5, 10 |
| 4, 10 | 5, 11 | 6, 12 | 7, 13 | 8, 14 | 9, 15 | 10, 0 | 11, 1 | 12, 2 | 13, 3 | 14, 4 | 15, 5 | 0, 6 | 1, 7 | 2, 8 | 3, 9 |
| 2, 9 | 3, 10 | 4, 11 | 5, 12 | 6, 13 | 7, 14 | 8, 15 | 9, 0 | 10, 1 | 11, 2 | 12, 3 | 13, 4 | 14, 5 | 15, 6 | 0, 7 | 1, 8 |
| 15, 7 | 0, 8 | 1, 9 | 2, 10 | 3, 11 | 4, 12 | 5, 13 | 6, 14 | 7, 15 | 8, 0 | 9, 1 | 10, 2 | 11, 3 | 12, 4 | 13, 5 | 14, 6 |

TABLE 3-continued

| | | | | | | | | | | | | | | | |
|---|---|---|---|---|---|---|---|---|---|---|---|---|---|---|---|
| 13, 6 | 14, 7 | 15, 8 | 0, 9 | 1, 10 | 2, 11 | 3, 12 | 4, 13 | 5, 14 | 6, 15 | 7, 0 | 8, 1 | 9, 2 | 10, 3 | 11, 4 | 12, 5 |
| 11, 5 | 12, 6 | 13, 7 | 14, 8 | 15, 9 | 0, 10 | 1, 11 | 2, 12 | 3, 13 | 4, 14 | 5, 15 | 6, 0 | 7, 1 | 8, 2 | 9, 3 | 10, 4 |
| 9, 4 | 10, 5 | 11, 6 | 12, 7 | 13, 8 | 14, 9 | 15, 10 | 0, 11 | 1, 12 | 2, 13 | 3, 14 | 4, 15 | 5, 0 | 6, 1 | 7, 2 | 8, 3 |
| 7, 3 | 8, 4 | 9, 5 | 10, 6 | 11, 7 | 12, 8 | 13, 9 | 14, 10 | 15, 11 | 0, 12 | 1, 13 | 2, 14 | 3, 15 | 4, 0 | 5, 1 | 6, 2 |
| 5, 2 | 6, 3 | 7, 4 | 8, 5 | 9, 6 | 10, 7 | 11, 8 | 12, 9 | 13, 10 | 14, 11 | 15, 12 | 0, 13 | 1, 14 | 2, 15 | 3, 0 | 4, 1 |
| 3, 1 | 4, 2 | 5, 3 | 6, 4 | 7, 5 | 8, 6 | 9, 7 | 10, 8 | 11, 9 | 12, 10 | 13, 11 | 14, 12 | 15, 13 | 0, 14 | 1, 15 | 2, 0 |
| 1, 0 | 2, 1 | 3, 2 | 4, 3 | 5, 4 | 6, 5 | 7, 6 | 8, 7 | 9, 8 | 10, 9 | 11, 10 | 12, 11 | 13, 12 | 14, 13 | 15, 14 | 0, 15 |

As may be seen with respect to Table 3, the leftmost entries form a Latin Square. The rightmost entries nearly form a Latin square, except for the duplicate entries in the first and last rows thereof FIG. 38 depicts an exemplary inter-block interleaving structure 3800. In an exemplary embodiment of structure 3800, bits may be read by columns 3802, rather than by rows 3804, since interleaver columns 3802 are significantly longer than interleaver rows 3804. In this manner, bits in a column are spread over more constituent codewords than would be the bits in a row, thereby increasing the tolerance to long bursts according to structure 3800. The maximum correctable burst length, for example, when used with a hard decoder, is considered to be a traditional measure of interleaver quality. In this example, the maximum correctable burst length is shown to be 2,681 bits.

In exemplary operation using structure 3800, the bits read out of the interleaver are passed to the modulator, where the bits may be used in groups of S=4, respectively, in both the H and V polarizations. Output bits having even indexes may then be used to form symbols for the H polarization, whereas output bits in the odd positions would instead be formed to symbols in the V polarization. According to this structural configuration, the line BER estimation in each polarization may be greatly simplified. Additionally, the respective H and V bits will appear at fixed positions in each block in the decoder, independently of the modulation.

Accordingly, for the inter-block interleaving mechanism, the respective intra-block permutations from the intra-block interleaving mechanism may be applied to each block in the buffer as the block is received from the encoder. Under this advantageous structural innovation, the interleaver buffer may then be partitioned not only as a function of the respective encoder, ENC0 or ENC1, but also partitioned as an "upper" half of block rows 3804 (42 block rows 0 to 41, in this example), and a "lower" half of block rows 3804 (similarly, 42 block rows 42-83). According to this additional embodiment of structure 3800, the buffer is effectively apportioned into 4 subsets, and each such subset contains 21×8 blocks, or 336×128 bits. Exemplary interleaver subsets are shown below with respect to Table 4.

TABLE 4

| Subset Number | Row Blocks |
|---|---|
| 0 | 0, 2, . . . , 40 |
| 1 | 1, 3, . . . , 41 |
| 2 | 42, 44, . . . , 82 |
| 3 | 43, 45, . . . , 83 |

According to the subset arrangement illustrated in Table 4, at the output, groups of 8 bits may be taken in turn from each such subset, reading the groups of bits out of one column of bits before proceeding to the next columns. More specifically, as illustrated in example depicted in FIG. 38, the first 8 bits are read from the top of first column of subset 0, then the first 8 bits from the first column of subsets 1, 2, and 3. The resulting 32 bits may then be followed by taking the next 8 bits in the first column of each of the subsets 0, 1, 2, and 3. After 42 such cycles of 4×8 bits each, the first bit column of the interleaver buffer will be completely read out, and the output process may then continue by reading bit columns 1 to 127.

FIG. 39 is a schematic illustration of an exemplary symbol mapping and polarization distribution process 3900. In the exemplary embodiment, process 3900 is performed with respect to elements similar in form and function to similarly-labeled elements of process 2400, FIG. 24. For example, process 3900 may operate with respect to an oFEC encoder engine 3902 having two encoders, ENC0 and ENC1, an interleaver 3904, a symbol mapping unit 3906, and a polarization distribution block 3908. In exemplary operation, process 3900 functions to map encoded and interleaved oFEC blocks onto DP-QPSK and DP-16QAM constellation symbols of each polarization. Process 3900 is further configured to then distribute the mapped constellation symbols across two different polarizations, insert training symbols and super FAW symbols, and add pilot symbols. In an embodiment, symbol mapping by symbol mapping unit 3906, and polarization distribution by polarization distribution block 3908, are modulation dependent. The symbol mapping and polarization distribution for each available modulation (e.g., DP-QPSK and DP-16QAM) are described further below.

In the case of DP-QPSK modulation, the FEC encoded and interleaved bit stream is mapped to DP-QPSK symbols, $S=[s_0, s_1, \ldots, s_n]$, where: $(c_{4i})$ maps to the I component of the X-polarization of $s_i$; $(c_{4i+2})$ maps to the Q component of the X-polarization of $s_i$; $(c_{4i+1})$ maps to the I component of the Y-polarization of $s_i$; and $(c_{4i+3})$ maps to the Q component of the Y-polarization of $s_i$. The map from the respective binary label to the symbol amplitude, in each signaling dimension, may then be defined according to Table 5, below, which indicates the symbol pattern(s) for the respective FAWs, training sequences, and pilot symbols.

TABLE 5

| $(c_{4i}, c_{4i+2})$ or $(c_{4i+1}, c_{4i+3})$ | I | Q |
|---|---|---|
| (0,0) | −1 | −1 |
| (0,1) | −1 | 1 |
| (1,0) | 1 | −1 |
| (1,1) | 1 | 1 |

Accordingly, when operating with DP-QPSK modulation, the compliant transceiver is configured to support symbol mapping and polarization distribution values defined according to Table 5.

In the case of DP-16QAM modulation, the FEC encoded and interleaved bit stream is mapped to DP-16QAM symbols, $S=[s_0, s_1, \ldots, s_n]$, where: $(c_{8i}, c_{8i+2})$ maps to the I component of the X-polarization of $s_i$; $(c_{8i+4}, c_{8i+6})$ maps to the Q component of the X-polarization of $s_i$; $(c_{8i+1}, c_{8i+3})$ maps to the I component of the Y-polarization of $s_i$; and ($c_{8i+5}$, $c_{8i+7}$) maps to the Q component of the Y-polarization of $s_i$. The map from the respective binary label to the symbol amplitude, in each signaling dimension, may then be defined according to Table 6, below, which indicates the symbol pattern(s) for the respective FAWs, training sequences, and pilot symbols.

TABLE 6

| ($c_{8i}$, $c_{8i+4}$, $c_{8i+1}$, $c_{8i+5}$) or ($c_{8i+2}$, $c_{8i+6}$, $c_{8i+3}$, $c_{8i+7}$) | I | Q |
|---|---|---|
| (0,0,0,0) | −3 | −3 |
| (0,0,0,1) | −3 | −1 |
| (0,0,1,0) | −3 | 3 |
| (0,0,1,1) | −3 | 1 |
| (0,1,0,0) | −1 | −3 |
| (0,1,0,1) | −1 | −1 |
| (0,1,1,0) | −1 | 3 |
| (0,1,1,1) | −1 | 1 |
| (1,0,0,0) | 3 | −3 |
| (1,0,0,1) | 3 | −1 |
| (1,0,1,0) | 3 | 3 |
| (1,0,1,1) | 3 | 1 |
| (1,1,0,0) | 1 | −3 |
| (1,1,0,1) | 1 | −1 |
| (1,1,1,0) | 1 | 3 |
| (1,1,1,1) | 1 | 1 |

Accordingly, when operating with DP-16QAM modulation, the compliant transceiver is configured to support symbol mapping and polarization distribution values defined according to Table 6.

FIG. 40 is a schematic illustration of an exemplary framing process 4000. In the exemplary embodiment, process 4000 functions as a DSP framing process for implementing a super-frame framing format (described further below with respect to FIGS. 41-43). In this example, a DSP super-frame is defined as including a set of 178176 symbols in each X/Y polarization. DSP sub-frames of the DSP super-frame are defined in this example to include 3712 symbols each. Thus, in an exemplary embodiment of process 4000, the DSP super-frame may include 48 individual DSP sub-frames.

In exemplary operation, process 4000 may be performed with respect to elements similar in form and function to similarly-labeled elements of process 2400, FIG. 24. For example, process 4000 may operate with respect a symbol mapping unit 4002, a polarization distribution block 4004, FAW blocks 4006, and pilot blocks 4008. Accordingly, pilot symbols (PS) may be inserted every 32 symbols, beginning with the first symbol of the first DSP sub-frame. Each DSP sub-frame may begin with an 11-symbol training sequence, with the first symbol of the training sequence being a pilot symbol. In this example, the first DSP sub-frame of the DSP super-frame is configured to further include the DSP super-frame FAW. According to process 4000, once the datastream has been mapped into symbols (e.g., by symbol mapping unit 4002) and distributed onto each polarization (e.g., by polarization distribution block 4004), pilot symbols, training symbols, FAWs, and other overhead may be added (e.g., by the respective functional blocks dedicated thereto) to create the DSP super-frame/sub-frame structure.

FIG. 41 is a schematic illustration of an exemplary distribution table 4100 for a super-frame/sub-frame structure. As indicated in distribution table 4100, a mapping parameter 4102 maps to the "outer four points" of both of the respective DP-16QAM and DP-QPSK constellations 4104. However, in the case of the DP-QPSK constellation 4104, the "outer four" points include all points of the constellation. Accordingly, for both modulation formats, an FAW parameter 4106 includes 22 symbols, a training sequence parameter includes 11 symbols for each DSP sub-frame, and a pilot symbol parameter occurs every 32 symbols. Nevertheless, in the DP-16QAM case, each of the respective parameters limited to fraction of the constellation 4104 constituting only the outermost four points. For either modulation format though, in the exemplary embodiment, the compliant transceiver is configured to support a DSP super-frame having at least 178,176 symbols.

FIG. 42 depicts an exemplary super-frame structure 4200. In the example illustrated in FIG. 42, super-frame structure 4200 represents a DSP Super-Frame divided into a plurality of DSP sub-frames 4202 (48 DSP sub-frames, in this example), where each of the DSP sub-frames includes 3,712 symbols. In the exemplary embodiment, the first DSP sub-frame (e.g., DSP sub-frame 4202(0)) includes: (i) 22 symbol super-frame FAWs configured to provide super-frame delineation and alignment to the oFEC block, and the FAW sequence may be different between the X and Y polarizations; (ii) 74 additional symbols are reserved (RES) for future use, proofing, and/or innovation, and which may be randomized to avoid strong tones; (iii) 11 symbols available for link training, and the first such training symbol (TS) may be shared as a pilot symbol (PS) in each DSP sub-frame 4202; and (iv) 116 pilot symbols, which may occur every 32 symbols (e.g., 5568 symbols per DSP super-frame 4000). Accordingly, in an exemplary embodiment, the compliant transceiver is configured to support DSP super-frames having a first DSP sub-frame substantially similar to DSP sub-frame 4202(0).

FIG. 43 depicts exemplary sub-frames 4300 of super-frame structure 4200, FIG. 42. In an exemplary embodiment, sub-frames 4300 may be substantially similar, in form and function, to DSP sub-frames 4202, FIG. 42. In the example illustrated in FIG. 4300, sub-frames 4300 represent DSP sub-frames 2 to 48 of DSP super-frame 4200 (i.e., DSP sub-frames 4202(1) to 4202(47)). In this example, every sub-frame 4300 that occurs subsequent to the first sub-frame (e.g., DSP sub-frame 4202(0)) are configured to include: (i) 11 symbols available for link training, with the first training symbol (TS) being capable of being shared as a pilot symbol in each sub-frame 4300; and (ii) 116 pilot symbols. In the example depicted in FIG. 43, the first training symbol of the illustrated QPSK signal is a known QPSK symbol, and therefore may be processed as a pilot symbol. In an embodiment, the seeds for a pilot pseudorandom binary sequence (PRBS) may be selected such that the seed is also a portion of the pilot PRBS sequence. In an exemplary embodiment, the compliant transceiver is configured to support DSP sub-frames 2 through 48 of DSP super-frame 4200.

In some embodiments, the added FAWs may include required sequences as listed below with respect to Table 7.

TABLE 7

| Index | FAW X | FAW Y |
|---|---|---|
| 1 | 3 − 3j | 3 + 3j |
| 2 | 3 + 3j | −3 + 3j |
| 3 | 3 + 3j | −3 − 3j |
| 4 | 3 + 3j | −3 + 3j |
| 5 | 3 − 3j | 3 − 3j |
| 6 | 3 − 3j | 3 + 3j |
| 7 | −3 − 3j | 3 − 3j |
| 8 | 3 + 3j | 3 − 3j |
| 9 | −3 − 3j | −3 − 3j |
| 10 | −3 + 3j | 3 − 3j |
| 11 | −3 + 3j | 3 + 3j |
| 12 | 3 − 3j | −3 + 3j |

TABLE 7-continued

| Index | FAW X | FAW Y |
|---|---|---|
| 13 | −3 − 3j | −3 + 3j |
| 14 | −3 − 3j | 3 + 3j |
| 15 | −3 + 3j | −3 − 3j |
| 16 | 3 + 3j | 3 + 3j |
| 17 | −3 − 3j | −3 − 3j |
| 18 | 3 − 3j | −3 + 3j |
| 19 | −3 + 3j | 3 − 3j |
| 20 | 3 + 3j | −3 − 3j |
| 21 | −3 − 3j | 3 − 3j |
| 22 | −3 + 3j | −3 + 3j |

Accordingly, in an exemplary embodiment, the compliant transceiver is configured to support the FAW sequencing scheme listed in Table 7.

In some embodiments, the added training sequences may be defined according to the scheme illustrated below with respect to Table 8.

TABLE 8

| Index | Training X | Training Y |
|---|---|---|
| 1* | −3 + 3j | −3 − 3j |
| 2 | 3 + 3j | −3 − 3j |
| 3 | −3 + 3j | 3 − 3j |
| 4 | 3 + 3j | −3 + 3j |
| 5 | −3 − 3j | −3 + 3j |
| 6 | 3 + 3j | 3 + 3j |
| 7 | −3 − 3j | −3 − 3j |
| 8 | −3 − 3j | −3 + 3j |
| 9 | 3 + 3j | 3 − 3j |
| 10 | 3 − 3j | 3 + 3j |
| 11 | 3 − 3j | 3 − 3j |

*The first symbol of the training sequence is processed as a pilot symbol, and, in an exemplary embodiment, the compliant transceiver is configured to support the training symbol sequencing scheme illustrated in Table 9.

FIG. 44 depicts an exemplary pilot sequence mapping scheme 4400. In an exemplary embodiment illustrated in FIG. 44, scheme 4400 represents a mapped pilot sequence for either of a QPSK modulation and a DP-16QAM modulation. That is, as described above, training and pilot symbols are set at all four points of the QPSK constellation, or only the outer four points of the DP-16QAM constellation. Accordingly, an exemplary implementation of scheme 4400 establishes a fixed PRBS10 as the pilot sequence 4402, and the respective PRBS pilot sequences 4402 may then be mapped to the respective modulation (e.g., QPSK or 16QAM) sequence, but with different seed values for each of the two polarizations.

FIG. 45 is a schematic illustration of an exemplary pilot seed sequencing process 4500. In an exemplary embodiment, pilot seed sequencing process is configured to select seeds (e.g., such as for a PRBS pilot sequence 4402, FIG. 44) such that the pilot sequences/symbols are configured to generate approximately equal quantities of the binary 0's and 1's in the sequence. In at least one embodiment, the seeds are selected such that the first symbol in the training sequence is also the first symbol in the pilot sequence. In the exemplary embodiment, sequencing process 4500 is implemented with respect to a sequencing register 4502 configured to operate for each polarization seed binary input 4504 and produce a polarization output 4506. That is, in the embodiment illustrated in FIG. 45, only one sequencing register 4502 is shown, but the compliant transceiver system may include a separate register 4502 for each polarization. In the exemplary embodiment, the seed is reset at the head of every DSP sub-frame.

Pilot seed sequencing process 4500 is described further below with respect to Table 9, which illustrates the pilot sequencing polynomial used for the respective polarization seeds, Seed X and Seed Y.

TABLE 9

| Generator Polynomial | Seed X | Seed Y |
|---|---|---|
| $x^{10} + x^8 + x^4 + x^3 + 1$ | 0 × 19E | 0 × 0D0 |

Comprehensive results of pilot seed to sequencing process 4500 are provided in greater detail with respect to the results listed in Table 10, below.

TABLE 10

| Index | Pilot X | Pilot Y |
|---|---|---|
| 1 | −3 + 3i | −3 − 3i |
| 2 | 3 + 3i | −3 − 3i |
| 3 | 3 − 3i | 3 − 3i |
| 4 | −3 + 3i | 3 + 3i |
| 5 | 3 − 3i | −3 − 3i |
| 6 | 3 − 3i | 3 + 3i |
| 7 | −3 − 3i | −3 − 3i |
| 8 | 3 + 3i | −3 + 3i |
| 9 | −3 + 3i | −3 − 3i |
| 10 | 3 + 3i | 3 + 3i |
| 11 | 3 + 3i | 3 + 3i |
| 12 | −3 − 3i | −3 − 3i |
| 13 | 3 + 3i | 3 + 3i |
| 14 | 3 + 3i | 3 + 3i |
| 15 | 3 + 3i | 3 − 3i |
| 16 | 3 − 3i | 3 + 3i |
| 17 | 3 + 3i | 3 + 3i |
| 18 | 3 − 3i | −3 + 3i |
| 19 | −3 + 3i | −3 − 3i |
| 20 | −3 − 3i | 3 − 3i |
| 21 | 3 + 3i | 3 − 3i |
| 22 | −3 + 3i | 3 + 3i |
| 23 | −3 + 3i | −3 + 3i |
| 24 | 3 − 3i | 3 − 3i |
| 25 | −3 + 3i | 3 − 3i |
| 26 | −3 + 3i | 3 + 3i |
| 27 | −3 + 3i | −3 + 3i |
| 28 | −3 + 3i | 3 + 3i |
| 29 | −3 − 3i | 3 + 3i |
| 30 | 3 − 3i | 3 − 3i |
| 31 | −3 − 3i | −3 + 3i |
| 32 | 3 + 3i | −3 − 3i |
| 33 | −3 + 3i | 3 − 3i |
| 34 | −3 + 3i | −3 − 3i |
| 35 | −3 + 3i | −3 − 3i |
| 36 | 3 − 3i | 3 − 3i |
| 37 | 3 − 3i | 3 − 3i |
| 38 | −3 − 3i | −3 − 3i |
| 39 | −3 − 3i | 3 + 3i |
| 40 | 3 − 3i | −3 − 3i |
| 41 | −3 − 3i | 3 − 3i |
| 42 | 3 − 3i | 3 − 3 |
| 43 | −3 + 3i | −3 − 3i |
| 44 | −3 + 3i | −3 − 3i |
| 45 | −3 − 3i | 3 + 3i |
| 46 | −3 + 3i | −3 + 3i |
| 47 | −3 − 3i | 3 + 3i |
| 48 | 3 + 3i | −3 + 3i |
| 49 | 3 + 3i | 3 − 3i |
| 50 | −3 + 3i | −3 + 3i |
| 51 | 3 − 3i | 3 + 3i |
| 52 | 3 − 3i | −3 + 3i |
| 53 | 3 − 3i | −3 − 3i |
| 54 | −3 − 3i | 3 + 3i |
| 55 | 3 − 3i | −3 + 3i |
| 56 | 3 + 3i | −3 + 3i |
| 57 | −3 + 3i | −3 − 3i |
| 58 | −3 − 3i | 3 − 3i |
| 59 | 3 − 3i | 3 − 3i |
| 60 | 3 + 3i | −3 + 3i |

TABLE 10-continued

| Index | Pilot X | Pilot Y |
|---|---|---|
| 61 | 3 − 3i | 3 + 3i |
| 62 | −3 − 3i | −3 − 3i |
| 63 | 3 − 3i | 3 + 3i |
| 64 | −3 + 3i | −3 + 3i |
| 65 | 3 − 3i | 3 − 3i |
| 66 | 3 + 3i | 3 + 3i |
| 67 | 3 − 3i | −3 − 3i |
| 68 | −3 + 3i | 3 − 3i |
| 69 | 3 − 3i | −3 + 3i |
| 70 | −3 + 3i | −3 + 3i |
| 71 | 3 + 3i | −3 + 3i |
| 72 | −3 − 3i | −3 − 3i |
| 73 | −3 − 3i | −3 + 3i |
| 74 | 3 − 3i | 3 + 3i |
| 75 | −3 + 3i | −3 − 3i |
| 76 | 3 − 3i | −3 − 3i |
| 77 | −3 + 3i | −3 − 3i |
| 78 | −3 − 3i | 3 + 3i |
| 79 | 3 + 3i | −3 − 3i |
| 80 | 3 + 3i | −3 − 3i |
| 81 | 3 + 3i | 3 − 3i |
| 82 | −3 − 3i | −3 − 3i |
| 83 | −3 − 3i | 3 + 3i |
| 84 | 3 + 3i | −3 − 3i |
| 85 | 3 − 3i | −3 − 3i |
| 86 | −3 + 3i | −3 − 3i |
| 87 | 3 + 3i | 3 − 3i |
| 88 | 3 − 3i | −3 + 3i |
| 89 | −3 − 3i | −3 + 3i |
| 90 | 3 − 3i | 3 − 3i |
| 91 | 3 − 3i | 3 + 3i |
| 92 | −3 + 3i | 3 − 3i |
| 93 | −3 − 3i | 3 − 3i |
| 94 | 3 + 3i | −3 + 3i |
| 95 | −3 − 3i | 3 − 3i |
| 96 | −3 − 3i | 3 − 3i |
| 97 | 3 + 3i | −3 + 3i |
| 98 | −3 + 3i | −3 + 3i |
| 99 | 3 − 3i | −3 − 3i |
| 100 | −3 − 3i | 3 + 3i |
| 101 | 3 + 3i | −3 + 3i |
| 102 | −3 + 3i | −3 − 3i |
| 103 | −3 − 3i | −3 + 3i |
| 104 | −3 − 3i | 3 + 3i |
| 105 | 3 + 3i | −3 + 3i |
| 106 | 3 − 3i | 3 − 3i |
| 107 | 3 + 3i | 3 + 3i |
| 108 | −3 + 3i | −3 + 3i |
| 109 | −3 − 3i | 3 + 3i |
| 110 | −3 + 3i | −3 − 3i |
| 111 | −3 − 3i | −3 + 3i |
| 112 | −3 + 3i | 3 − 3i |
| 113 | −3 + 3i | −3 + 3i |
| 114 | 3 + 3i | 3 + 3i |
| 115 | 3 + 3i | 3 − 3i |
| 116 | −3 − 3i | 3 − 3i |

The frame expansion rate it is also an important consideration with respect to both FlexO and oFEC. For example, given an oFEC optical signal of approximately 63.139467923 GBaud (i.e., for QPSK), a detailed list of the relevant expansion rates is illustrated below with respect to Table 11.

TABLE 11

| Parameter | Value |
|---|---|
| FEC Payload | 2 × 100GbE |
| FEC algorithm | oFEC |
| FEC payload size (k) | 3,552 |
| FEC block size (N) | 4,096 |
| Number of FEC blocks in super-frame | 84 |
| Total payload size | 596,736 bits |
| PAD before FEC | 496 bits |
| Total payload size based on 257 bits | 2,320 × 257 bits 596,240 bits total |
| PAD after FEC | 0 |
| Total bits | 688,128 |
| Total information, parity and padding symbols per super-frame | 172,032 |
| Number of FAW/RES/training symbols | 576 |
| Total length before pilot insertion | 172,608 |
| Number of pilots | 5,568 |
| DSP sub-frame size | 3,712 |
| Number of DSP sub-frames per super-frame | 48 |
| Total symbols of super-frame | 178,176 |
| Modulation format | QPSK/16QAM |
| Baud rate | 63.139467923 Gbaud (QPSK) 31.5697339615 Gbaud (16QAM) |

Accordingly, the respective baud rates may be calculated as follows.

For QPSK:

$$63.139467923(\text{GBaud}) = 223{,}618{,}948{,}892.8875 \times (514/544) \times (37{,}296/37{,}265) \times (4{,}096/3{,}552) \times (899/896) \times (32/31)/4.$$

For 16-QAM:

$$31.5697339615(\text{GBaud}) = 223{,}618{,}948{,}892.8875 \times (514/544) \times (37{,}296/37{,}265) \times (4{,}096/3{,}552) \times (899/896) \times (32/31)/8.$$

The line rate May therefore be calculated according to:

$$252{,}557{,}871.7(\text{kbit/s}) = 223{,}618{,}948{,}892.8875 \times (514/544) \times (37{,}296/37{,}265) \times (4{,}096/3{,}552) \times (899/896) \times (32/31) \times 1{,}000{,}000.$$

As described above, 200G operation may subject the complaint transceiver two different, or additional, requirements than a transceiver operating in the 100G mode. For ease of explanation, the following of embodiments describe some of the optical PHY layer requirements arising within the exemplary scenario of a P2P coherent optics transceiver operating at 200 Gbps (i.e., 200G mode) utilizing QPSK modulation. As described herein, 200G operation is defined based on recent feedback from operators in the field of art expressing the desire that 200G operation will address expected capacity needs to an individual aggregation node over the anticipated lifetime of this particular device. The following description focuses on 200G operation with QPSK because this particular innovative implementation will enable field operators to operate at 200G in almost the same plant conditions as 100G operation.

Accordingly, for ease of explanation, the following 200G requirements our grouped into three main categories: (i) Common Requirements, which apply to both the transmit and receive operation of the transceiver; (ii) Transmitter Requirements, which are unique to the transmit operation of the transceiver; and (iii) Receiver Requirements, which are unique to the receive operation of the transceiver.

Common Requirements for 200G QPSK operation may include one or more of the symbol rate, modulation, line rate, and DWDM characteristics, such as wavelengths, frequencies, and channel numbers. With respect to symbol rate, in digital transmission systems, given enough time, strings of ones or zeroes may be used to represent essentially any signal. The number of bits that are transmitted over time is referred to as the bit rate, and is typically measured in bits per second (bps). The most basic principle for increasing the bit rate is to simply transmit their respective ones and zeroes faster over the transmission medium. However, a more efficient technique for transmitting data more quickly as involved the processing and transmission of multiple bits simultaneously using a collection of relative states, known as symbols. The number of symbols transmitted over a unit of time is defined as the baud rate.

Accordingly, the value of 63.139467923 Gbaud, as used in the description of the several embodiments herein, was selected to be the symbol rate, because this value enables all of the 200 Gbps data transmission featured in the several embodiments described throughout this disclosure. In addition to the speed of the symbol rate, the symbol rate accuracy is also an important consideration for enabling the successful reception of the transmitted signal. Therefore, in an exemplary embodiment, the compliant transceiver should be configured to not only support a symbol rate of 63.139467923 Gbaud (according to the relevant modulation format, e.g., QPSK, DP-QPSK), the compliant transceiver should be further configured to maintain a symbol rate accuracy of at least +/−20 ppm.

As described throughout this disclosure, modulation format as a primary consideration for all transceivers operating in the 200G mode (as well as those operating in the 100G mode). Therefore, a mandatory modulation format for 200G-compliant transceivers is DP-QPSK, at a minimum. Nevertheless, with respect to the exemplary embodiments described herein, compliant transceivers may be additionally configured to optionally support the 16QAM modulation format (discussed further below).

The 100G-compliant transceivers, described above, are configured to implement dual polarization multiplexing and NRZ differential QPSK (DQPSK) modulation. DQPSK modulation removes the need for precise measurement of absolute phase at the receiver, and the respective symbols may be encoded by the phase differences between successive symbols. When combined with dual polarization multiplexing, this modulation format is sometimes referred to as DP-DQPSK. By employing DQPSK on each of two polarizations of the carrier, the aggregate transmission of four data bits for each symbol period is enabled.

The 200G transceivers of the present systems and methods are also described herein to utilize dual polarization multiplexing. However, the QPSK modulation used in the 200G embodiments may be non-differential. Non-differential QPSK realizes improved OSNR sensitivity in comparison with DQPSK. Additionally, the non-differential modulation scheme is able to encode two bits per symbol, and may further include a requirement for reference phase awareness between successive symbols, which may be accomplished through the effective use of pilot symbols, as described above, which may be inserted into the DSP FEC frames to aid the phase recovery of the receiver. By employing non-differential QPSK (i.e., DP-QPSK) on each of two polarizations of the carrier, the aggregate transmission of four data bits for each symbol period is enabled, similar to the DQPSK modulation embodiment described above, but with an improved OSNR sensitivity.

FIG. 46 is a graphical illustration of an exemplary constellation 4600. In the exemplary embodiment, constellation 4600 represents a 200G QPSK symbol constellation, and the 200G-compliant transceivers are configured to support polarization multiplexing and QPS as a Common Requirement. For QPSK symbol constellation 4600, on each of the two polarizations, QPSK may be used to encode two bits per symbol, and pilot symbols serve to aid the phase recovery of the receiver, in accordance with bit mapping to the four QPSK symbols of constellation 4600.

The line rate is also an important consideration that falls within the scope of the Common Requirements. In general, the line rate is defined as the bit rate of the signal transmitted on the optical channel. In the 200G QPSK scenario described herein, the line signal includes overhead added by the transmitter (e.g., FEC), and the dual-polarization QPSK transmits four bits per symbol. Accordingly, in this exemplary transceiver scenario, the line rate is four times the symbol rate, and therefore the compliant transceiver should be configured to support a nominal signal line rate of 252,557,871.7 kbit/s.

In order to enable interoperability between transceivers operating in DWDM environments, and also to enable interoperation with existing DWDM communication systems and equipment, in an exemplary embodiment, a compliant transceiver should be further configured to adopt a subset of the identified channels (e.g., from ITU-T G.694.1, in this example) implemented with respect to 100 GHz channel spacing. Table 12, below, lists the specific DWDM wavelengths, frequencies, and associated channel numbers on which compliant transceivers may operate according to this Common Requirement.

With respect to a DWDM frequency grid in the 200G QPSK operation scenario, in order to transmit a line rate of 200 Gb/s using the DP-QPSK modulation format, an effective symbol rate is established, in the exemplary embodiment, in the range of approximately 63 Gbaud, as described above. When the light is modulated at this symbol rate, the optical signal bandwidth will be at least 63 GHz.

Therefore, in this example, the wavelength filters in the relevant DWDM multiplexers and demultiplexers should be configured to have a bandwidth wide enough to pass the optical signal. In this case, the wavelength filters used in the common 100 GHz channel spacing plan are considered to provide sufficient bandwidth to pass the optical signal of this exemplary embodiment for 200G DP-QPSK. Wavelength filters used in a 50 GHz channel spacing plan, and plans with narrower spacing, are not considered to have sufficient bandwidth to pass the optical signal of the present systems and methods.

To enable lower-cost implementations, the compliant transceivers may only be required to support one channel from the following list provided in the DWDM frequency grid of Table 12 for 200G DP-QPSK operation. However, to support greater flexibility, exemplary devices may be further configured to optionally support multiple channels from the list below. In some instances, it may be desirable for the transceiver to capable of supporting the entire channel list, or at least significant portions thereof.

TABLE 12

| Channel Number | Central Frequency (GHz) | Central Wavelength (nm) |
| --- | --- | --- |
| 13 | 191300 | 1567.13 |
| 14 | 191400 | 1566.31 |
| 15 | 191500 | 1565.50 |
| 16 | 191600 | 1564.68 |
| 17 | 191700 | 1563.86 |
| 18 | 191800 | 1563.05 |
| 19 | 191900 | 1562.23 |
| 20 | 192000 | 1561.42 |
| 21 | 192100 | 1560.61 |
| 22 | 192200 | 1559.79 |
| 23 | 192300 | 1558.98 |

TABLE 12-continued

| Channel Number | Central Frequency (GHz) | Central Wavelength (nm) |
|---|---|---|
| 24 | 192400 | 1558.17 |
| 25 | 192500 | 1557.36 |
| 26 | 192600 | 1556.56 |
| 27 | 192700 | 1555.75 |
| 28 | 192800 | 1554.94 |
| 29 | 192900 | 1554.13 |
| 30 | 193000 | 1553.33 |
| 31 | 193100 | 1552.52 |
| 32 | 193200 | 1551.72 |
| 33 | 193300 | 1550.92 |
| 34 | 193400 | 1550.12 |
| 35 | 193500 | 1549.32 |
| 36 | 193600 | 1548.52 |
| 37 | 193700 | 1547.72 |
| 38 | 193800 | 1546.92 |
| 39 | 193900 | 1546.12 |
| 40 | 194000 | 1545.32 |
| 41 | 194100 | 1544.53 |
| 42 | 194200 | 1543.73 |
| 43 | 194300 | 1542.94 |
| 44 | 194400 | 1542.14 |
| 45 | 194500 | 1541.35 |
| 46 | 194600 | 1540.56 |
| 47 | 194700 | 1539.77 |
| 48 | 194800 | 1538.98 |
| 49 | 194900 | 1538.19 |
| 50 | 195000 | 1537.40 |
| 51 | 195100 | 1536.61 |
| 52 | 195200 | 1535.82 |
| 53 | 195300 | 1535.04 |
| 54 | 195400 | 1534.25 |
| 55 | 195500 | 1533.47 |
| 56 | 195600 | 1532.68 |
| 57 | 195700 | 1531.90 |
| 58 | 195800 | 1531.12 |
| 59 | 195900 | 1530.33 |
| 60 | 196000 | 1529.55 |
| 61 | 196100 | 1528.77 |
| 62 | 196200 | 1527.99 |

In the exemplary embodiment, the compliant transceiver is further configured to report the channels from the DWDM frequency grid, above, which the transceiver supports.

In the case where the transceiver supports multiple channels, the transceiver may be further configured to provide a mechanism for assigning a specific channel of operation using the relevant management interface definition for the form factor of the transceiver module. In a similar manner, the transceiver may be still further configured to report the specific channel on which it is currently transmitting, similarly using the relevant management interface definition for the form factor of the transceiver module.

Transmitter Requirements for the 200G QPSK implementation scenario may include considerations for parameters and characteristics such as transmitter optical output power, transmitter optical frequency parameters (e.g., transmitter laser center frequency accuracy, transmitter laser linewidth, etc.), transmitter OSNR, polarization imbalance, IQ imbalance, transmitter skew (e.g., transmitter quadrature skew or transmitter polarization skew), transmitter reflectance, and transmitter system optical return tolerance.

Transmitter optical output power is defined as the total optical launch power, measured in dBm, from the output port of a transceiver in operation, and this parameter may be measured with a calibrated optical power meter (OPM) capable of power measurement, for example, in the 1550 nm wavelength range. In the exemplary embodiment, a transmitter minimum optical power requirement may be defined to allow for low cost options, but while still ensuring that the solutions meet minimum access network requirements. In some cases a maximum optical power requirement may be defined for safety purposes.

It may be noted that, for the Transmitter Requirements, essentially all of the relevant requirements are typically considered "beginning of life" requirements, since the typical device would be expected to be tested for compliance at the beginning of its operational life. Over the operational lifetime of a transceiver, it is further expected that the ability of the device to satisfy the relevant requirements May degrade by as much as 0.5 dB. Accordingly, in the exemplary embodiment, this potential degradation is considered as and expected performance factor of the compliant transceiver in the access network.

Furthermore, it is also expected that, during a transmitter power up, power down, or a change of wavelength sequence, the transmitter may generate "fast transients," or sudden spikes in power across a range of frequencies, which might potentially, albeit briefly, impact any operating channels that are on the same optical plant as that transceiver. Accordingly, at least one embodiment, a compliant transceiver may be further configured with blanking capability, which enables the transceiver to suppress optical output until such time as the transceiver's output has stabilized.

In the case of a transceiver supporting dual optical interfaces, the compliant transceiver will also be configured to support a transmitter optical output power of −7.5 dBm or higher. In the case of a transceiver supporting a single optical interface, then the transceiver should have a configuration expected to support a transmitter optical output power of −8.25 dBm or higher. Consistent with the operation of the several embodiments described herein, the compliant transceiver is further configured to prevent a transmitter optical output power of +7 dBm or higher.

In a further exemplary embodiment, the compliant transceiver includes capability to report its transmitter optical output power with an accuracy of ±1.5 dB, and the transceiver may be configured to optionally support adjustment of its transmitter optical output power (e.g., adjustments in steps of 0.1 dB).

Among the transmitter optical frequency parameters for 200G QPSK operation, the transmitter laser center frequency accuracy is defined as the maximum allowable offset of the actual laser frequency from the selected frequency center (e.g., Table 12, above). In operation, the transmitter optical signal will be mixed with the LO at the coherent receiver and, if the difference between these laser frequencies is too large, the DSP will experience greater difficulty in compensating the carrier frequency offset (CFO) between the transmitter and LO lasers. These exemplary embodiments, the laser carrier frequency accuracy of the LO on the receiver need not be specified for compliance with the present embodiments, since different DSPs may be capable of handling more or less CFO, and each individual vendor should be able to determine their own requirements on the LO to meet overall performance requirements. Nevertheless, with respect to these parameters, the compliant transceiver should be configured to maintain a transmitter laser center frequency accuracy of less than or equal to 1.8 GHz.

The transmitter laser linewidth is defined as the Full-Width Half-Maximum (−3 dB from the peak power) of the optical field spectrum of the laser. Accordingly, the greater the laser linewidth, the greater the phase noise from the receiver, thus increasing the difficulty for the DSP to determine the phase of a received symbol. Accordingly, with respect to this parameter, the compliant transceiver is expected to be configured to operate with a transmitter laser linewidth less than or equal to 1000 kHz.

The transmitter OSNR enables comparison of the level of the optical signal to the level of the optical noise floor measured at the transmitter output. Transmitter OSNR includes the noise of an optical amplifier, if such an amplifier is integrated in the transceiver. The transmitter OSNR does not though, include the noise of optical amplifier(s) that is external to the transceiver disposed in the network link. In the case of transmitters that do not include integrated optical amplification, the transmitter OSNR will typically B dominated by the relative intensity noise (RIN) of the laser. In contrast, in the case of transmitters having integrated optical amplification, noise added by the gain element will typically be the significant contributor to the transmitter OSNR value.

In the exemplary embodiment, the link OSNR, which may be measured at the receiver input, is expected to directly impact the ability of the receiver to decode the optical signal, and transmitter OSNR contributes to the link OSNR. If there are no external optical amplifiers in the link, the link OSNR will usually be the same as the transmitter OSNR. The OSNR will degrade through optical amplifiers, if present in the network link, due to amplified spontaneous emission (ASE).

OSNR may be measured on an optical spectrum analyzer (OSA) having a resolution bandwidth sufficiently large enough to capture the entire signal spectral power. The optical noise floor is measured at a fixed frequency offset from the center wavelength of the signal and averaged across both positive and negative frequency offset, where a flat noise floor can be observed on the OSA. The exact frequency offset is dependent on signal baud rate and spectral characteristic. To measure OSNR for 200 Gbps DP-QPSK, which operates at approximately 63 Gbaud, the resolution bandwidth of the OSA is set to 1.0 nm (approximately 125 GHz) and the optical noise floor is measured at ±200 GHz offset or larger from the center wavelength. In this case, the noise bandwidth for OSNR measurements is referenced to an optical frequency of 193.6 THz, resulting in a 12.5 GHz measurement bandwidth corresponding to 0.1 nm. OSNR may then be calculated as the ratio of the total signal power to the ASE noise level in 0.1 nm resolution bandwidth. Most modern OSAs will report OSNR automatically and determine the appropriate noise floor. Accordingly, a compliant transceiver is expected to be configured to provide transmitter OSNR of 35 dB or higher.

Polarization imbalance is defined as the absolute difference in optical power between the X polarization and the Y polarization at the transmitter output. The transceiver uses polarization division multiplexing (PDM), in which a PBS separates the transmit signal of the laser into two orthogonal polarizations, each of which is independently modulated by in-phase and quadrature MZMs. After modulation, the two polarizations are recombined by a polarization beam combiner (PBC), and in the transmitter, the two polarizations experience different insertion loss, which generates polarization imbalance at the transmitter output.

In order to balance the power for each polarization, variable optical attenuators or semiconductor amplifiers may be used on each path such that:

$$\Delta P_{pol} = \text{abs}(10 * \log_{10}(Px/Py)),$$

where Px and Py are the powers of the two nominally orthogonal polarizations carrying the two data streams. Accordingly, the compliant transceiver is expected to be configured to have a transmitter polarization imbalance of 1.5 dB or less.

IQ imbalance is defined as the amplitude imbalance between the in-phase and quadrature-phase (I-Q) channels on QPSK signals. Ideally, the I and Q channels are orthogonal to each other with the same amplitude. However, a variety of issues, such as imperfection of drivers, bias points setting, or in any of the optical hybrids, balanced photodiodes, and TIAs in the front end, may introduce IQ imbalance arising from the mismatch of the gain and/or the phase between the IQ ports. These mismatches may serve to degrade the performance of the DP-QPSK system. More specifically, the IQ imbalance compares the amplitude of the I signal with the amplitude of the Q signal provides the difference (in dB) according to:

$$\text{IQ Imbalance} = 10 \log 10(AQ/AI),$$

where AI and AQ are the amplitudes of I and Q components, respectively. In an exemplary embodiment, for the purposes of minimizing the impact on the entire system, a maximum permitted IQ imbalance may be defined for all compliant transceivers. In the exemplary embodiment, the compliant transceiver is configured to have an IQ imbalance of 1 dB or less.

Transmitter skew in the 200G QPSK operating scenario may be related to quadrature, and phase, and/or polarization. Since the transmitter modulation format of the present embodiments uses DP-QPSK, the transmission will be modulated for each of two orthogonal polarization modes and then combined before being launched onto the transmission path. After combining, the symbols in the different phases and the different polarization modes may start at different times (i.e., have a relative delay with respect to each other) due to variations in electrical trace lengths to the modulators, delays in tributaries, optical combining, etc. Quadrature skew is therefore defined as the inter-channel delay between the I and Q channels, while polarization skew is defined as the inter-channel delay between X- and Y-polarization (X-Y) channels. In the exemplary embodiment, skew requirements may be defined for all compliant transceivers, in order to minimize the skew effect and maintain alignment in time of the data propagated in each of the respective modes.

As described above, a QPSK signal is generated by modulating two phase orthogonal IQ signals independently, and then summing the signals. Each of the signals are differentially-encoded binary phase shift keyed (i.e., phase reversal or shift by 180 degrees and back to reference) and then combined to form a four-symbol format (i.e., quaternary phase shift keying). Misalignment in time of the I and Q signals leads to eye closure (i.e., decreased length of time when a symbol is clean) or inter-symbol interference (ISI) into a sequential time slot for the next symbol. Accordingly, in an embodiment, the Transmitter Requirements may establish a reasonable requirement to minimize the skew effect for all compliant transceivers.

FIG. 47 is a schematic illustration of an exemplary single polarization modulator 4700. In an exemplary embodiment, modulator 4700 represents a QPSK modulator with in-phase and quadrature skew from respective input IQ signals 4702. Modulator 4700 is thus substantially similar, in form and function, to single polarization modulator 300, FIG. 3, and may be an MZM. For example, in modulator 4700 each of two MZM paths 4704 is driven by a binary dataset to modulate a binary phase shift keyed signal. The two IQ signals 4702 are then combined with a 90° phase shift 4706, thereby resulting in a combined signal 4708 having four phases at 0°, 90°, 180°, or 270° relative to reference representing two bits per symbol. A resulting quadrature skew 4710 is thus defined as the mismatch in time (represented as Δτ) of the symbol slot placement between the I and Q portions of the combined signal 4708. In this example, the I and Q signals 4702 are each modulated at an approximate symbol rate of 63 Gbaud, which equates to an approximate symbol duration time of 16 ps. In the exemplary embodiment, the compliant transceiver for which modulator 4700 is implemented is configured to have a quadrature skew of ≤1 ps.

FIG. 48 is a schematic illustration of an exemplary dual polarization modulator 4800. In an exemplary embodiment, polarization modulator 4800 represents a DP-QPSK modulator with polarization skew in the 200G operational mode, and is otherwise similar in form and function to dual polarization modulator 400, FIG. 4. Modulator 4800 includes two separate units of modulator 4700, FIG. 47, for each of the two orthogonal X- and Y-polarizations. In exemplary operation, a DP-QPSK signal is generated by modulating the two IQ QPSK signals in each of two orthogonal XY polarizations and combining the IQ signals, by a PBC 4802, prior to launching the combined signal into a fiber transport medium 4804. As illustrated in FIG. 48, the X-axis and the Y-axis are perpendicular to the signal propagation in optical fiber 4804 along the Z-axis, and a transmitter polarization skew 4806 is thus the time difference Δτ between the start/end of symbols in the X and Y polarizations out of the transmitter implementing modulator 4800.

In this example, the X and Y polarizations are each modulated at an approximate symbol rate of 63 Gbaud, which equates to an approximate symbol duration time of 16 ps. Accordingly, in the exemplary embodiment, the compliant transceiver is configured such that the transmitter polarization skew is significantly less than the symbol duration time of 16 ps. In this example, the transceiver is configured to have a transmitter polarization skew ≤5 ps.

FIG. 49 is a schematic illustration depicting an exemplary transmitter reflectance effect 4900. In the exemplary embodiment, transmitter reflectance effect 4900 is described with respect to the 200G QPSK operational mode. In exemplary operation, when optical light is inserted into the transmitter/transmitter port 4902 of transceiver 4904 from the direction of a network 4906, the transmitter reflectance is defined as the amount of light reflected back into network 4906, and may be represented, in dB, as the ratio of reflected light power to the incident light power according to $R = 10 \log_{10}(P_R/P_I)$. Reflections in optical systems, for example, may degrade link performance because reflected light causes noise with respect to the desirable optical signal, and reduces the system link OSNR. Accordingly, in an exemplary embodiment, the compliant transceiver is configured to impose a limit on reflectance from transmitter/transmitter port 4902, so as to limit any degradation therefrom. In the exemplary embodiment, the compliant transceiver is therefore configured to have an optical reflectance of ≤−20 dB on the transmitter port.

FIG. 50 is a schematic illustration depicting an exemplary optical return effect 5000. In the exemplary embodiment, optical return effect 5000 is also described with respect to the 200G QPSK operational mode, and represents the optical return tolerance of a transmitter system 5002 of a transceiver 5004. The system optical return is defined as the amount of the transmitter optical signal that is reflected back to the transmitter/transmitter port 5002 from system elements such as optical connectors, filters, etc. The transmitter performance does not degrade due to optical return effect 5000. The system optical return is defined, in dB, as the ratio of light power reflected from a network 5006 to the light power emitted from transmitter 5002, which may be expressed as $OR = 10 \log_{10}(P_R/P_E)$. Accordingly, in an exemplary embodiment, the compliant transceiver is configured to meet the transmitter OSNR requirements, described further below, in the presence of a system optical return of ≤−25 dB.

Receiver Requirements for the 200G QPSK implementation scenario may include considerations for parameters and characteristics such as received optical power and OSNR, chromatic dispersion, PMD, SoP, polarization imbalance, IQ imbalance, received frequency accuracy, skew, and receiver reflectance.

In the exemplary embodiment, requirements may be established for receiver sensitivity, related to received optical power and received OSNR, by defining baseline numbers that are intended to be verified under "back-to-back" test conditions, which is defined as a condition with no optical transmission fibers (except short jumper cables), and no optical impairments. These requirements may then be relaxed in the presence of certain optical impairments, such that the baseline requirement may be adjusted by up to a certain amount of received power and OSNR to achieve the required BER.

Similar to the Transmitter Requirements, described above, the Receiver Requirements described herein may also be considered as "beginning of life" requirements, since, over the operational lifetime of the transceiver, it is expected that these requirements might degrade by as much as 1 dB. Therefore, in the exemplary embodiments, this potential degradation is considered as a factor of the plant design.

In some scenarios, the received OSNR may be high, while the received optical power may be low. When no optical amplification is added between the transmitter and the receiver, the OSNR at the receiver will be the same as at that from the transmitter, which in this example is configured to be at least 35 dB. Under such conditions, the transceiver will be limited by its sensitivity to the received optical power, which is also known as a "received optical power-limited case," and represents a baseline requirement for received optical power.

Under other conditions, such as in the case of an optical amplifier being close to the receiving transceiver, the optical received power may be high, but the OSNR may be low. This discrepancy may occur due to the noise added by optical amplification, and because optical amplifiers boost both signal and noise power levels. In this case, the transceiver will be limited by its sensitivity to OSNR, rather than power, which is also known as an "OSNR-limited case," and represents a baseline requirement for received OSNR.

In addition to the baseline received OSNR requirement that applies to the dual optical interface transceiver option, an adjustment in the receive power requirement of the single optical interface option may also be introduced within the scope of the 200G operational mode. This adjustment may thus account for the loss incurred by directional elements within the transceiver to enable the single optical interface option.

Operators should also be aware that in a single optical interface transceiver option, a performance degradation in OSNR is expected due to discrete optical reflections and from back scattering caused by fiber imperfections. High-quality fiber splicing, cleanliness of fiber-optic connector mating surfaces, and the use of angle-polished connectors, contribute to a lower back-reflection power. In an optical link using single optical interface transceivers, with an aggregate back-reflection power of −33 dBm and a receive optical power of ≥−9.25 dBm, a 0.5 dB penalty in link OSNR may be observed. In this scenario, a link OSNR≥15 dB may be implemented to overcome this back-reflection power level.

If the transceiver supports dual optical interfaces, the compliant transceiver should be further configured to achieve a post-FEC bit-error-ratio (BER) of ≤$10^{-11}$ when the link OSNR is ≥35 dB and the received optical power is ≥−31 dBm, which is referred to as the baseline received optical power requirement. If the transceiver supports a single optical interface, the transceiver should be configured to achieve a post-FEC BER of ≤$10^{-11}$ when the link OSNR is ≥35 dB and the received optical power is ≥−30.25 dBm. Accordingly, in an exemplary embodiment, the compliant transceiver is configured to report the received optical power with an accuracy of ±2.0 dB for input powers greater than or equal −20 dBm, and less than or equal to 0 dBm. The transceiver should be further configured to report the received optical power with an accuracy of ±4.0 dB for input powers less than −20 dBm and greater than or equal to −31 dBm, as well as for input powers greater than 0 dBm and less than or equal to 7 dBm.

If the transceiver supports dual optical interfaces, the transceiver should be still further configured to achieve a post-FEC BER of ≤$10^{-15}$ when the received optical power is ≥−10 dBm and link OSNR is ≥14.5 dB, which is referred to as the baseline received OSNR requirement. If the transceiver supports a single optical interface, the transceiver should be configured to at least achieve a post-FEC BER of ≤$10^{-15}$ when the received optical power is ≥−9.25 dBm and link OSNR is ≥14.5 dB. In an embodiment, the transceiver may be configured to optionally report the received OSNR.

Chromatic dispersion (CD) causes different wavelengths to travel at different speeds through fiber, resulting in pulse broadening and inter-symbol interference. The specified value of CD may be determined to support links up to 120 km over standard single-mode fibers. In an exemplary embodiment, the compliant transceiver should be configured to support a minimum of 2400 ps/nm of CD. In the received optical power-limited case, when the CD is 2400 ps/nm, the transceiver should be further configured to achieve a post-FEC BER of ≤$10^{-15}$ when the received optical power is 0.5 dB greater than the baseline optical power requirement defined above. In the received OSNR-limited case, when the CD is 2400 ps/nm, the transceiver should be further configured to achieve a post-FEC BER of ≤$10^{-15}$ when the received OSNR is 0.5 dB greater than the baseline OSNR requirement defined above, and to report the measured CD.

FIG. 51 is a graphical illustration depicting a differential group delay (DGD) plot 5100. DGD plot represents, for example, an effect of polarization mode dispersion in the 200G QPSK mode of operation. Plot 5100 is illustrated with respect to a fiber optic waveguide 5102 that supports two optical modes (i.e., X and Y) of polarization 5104. PMD occurs when one of the polarizations 5104 travels faster through fiber 5102 than the other. The delay between the two polarizations 5104 increases with distance d, as illustrated in FIG. 51. More specifically, prior to traversing fiber 5102 polarization 5104$_X$ and 5104$_Y$ may be seen to roughly track with one another. However, after traversing a length of fiber 5102, polarization 5104$_X$ may be seen to have traveled faster through fiber 5102 than did polarization 5104$_Y$.

In general, PMD is viewed as a statistical quantity (i.e., a random variable). An instantaneous realization of this statistical quantity in a link may be measured as the DGD. Accordingly, with respect to the present 200G embodiments, the PMD value is understood to stand for the mean PMD, and the DGD is a realization which can be measured by the transceiver. In order to support standard single-mode fibers of around 100-120 km in length, the transceiver should be configured to tolerate a PMD value of at least 10 ps.

In the received optical power-limited case, when the PMD is 10 ps, the transceiver should achieve a post-FEC bit error-ratio (BER) of ≤$10^{-15}$ when the received optical power is 0.5 dB greater than the baseline optical power requirement defined above. In the received OSNR-limited case, when the PMD is 10 ps, the transceiver should achieve a post-FEC bit-error ratio (BER) of ≤$10^{-15}$ when the received OSNR is 0.5 dB greater than the baseline OSNR requirement. In the exemplary embodiment, the compliant transceiver should be configured to report the measured DGD.

Various external actions, such as vibration of the fiber or nearby lightning strikes, may cause changes to the SoP. In order to ensure the transceiver will continue to receive the signal correctly in the presence of such SoP changes, the transceiver may be further configured to implement SoP tracking. The SoP tracking rate may thus be defined as a minimum value that all transceivers are required to support in order to handle most cases without loss of data. Transceivers may be permitted to support faster tracking rates, which may be required in some less-common circumstances (such as long aerial runs in windy areas, areas with large numbers of lightning strikes, etc.). It should be noted though, that faster tracking rates may result in increased power and OSNR penalties. Accordingly, in the exemplary embodiment, the compliant transceiver is configured to support an SOP tracking rate of at least 50 krad/sec.

In the received optical power-limited case, when the SoP tracking rate is 50 krad/sec, the transceiver should be configured to achieve a post-FEC BER of ≤$10^{15}$ when the received optical power is 0.5 dB greater than the baseline optical power requirement. In the received OSNR-limited case, when the SoP tracking rate is 50 krad/sec, the transceiver should be configured to achieve a post-FEC BER of ≤$10^{-15}$ when the received OSNR is 0.5 dB greater than the baseline OSNR requirement. In an embodiment, the transceiver may be still further configured to report the SoP tracking rate in use, and may optionally support multiple SoP tracking rates, in which case the transceiver should be configured to support configuration of the SoP tracking rate.

In the present embodiments, the "polarization imbalance," or polarization-dependent loss (PDL), is defined as the absolute difference in optical power between the X polarization and the Y polarization seen at the input of a coherent receiver. The total PDL is generated by the combination of transmitter PDL, described above, as well as the various transmission network elements (e.g., multiplexers, splitters, optical amplifiers, etc.). In an embodiment, the receiver may be required to tolerate the maximum PDL expected for the optical input signal so it can properly decode the symbols. In the exemplary embodiment, the transceiver is configured to tolerate a total PDL of 2.5 dB for the incoming optical signal.

In the received optical power-limited case, when the PDL is 2.5 dB, the transceiver should be configured to achieve a post-FEC BER of ≤$10^{-15}$ when the received optical power is 1.5 dB greater than the baseline optical power requirement. In the received OSNR-limited case, when the PDL is 2.5 dB, the transceiver should be configured to achieve a post-FEC BER of ≤$10^{-15}$ when the received OSNR is 1.5 dB greater than the baseline OSNR requirement, and should also be configured to report the measured PDL.

As described above, the IQ imbalance is defined as the amplitude imbalance between the I and Q channels on the QPSK signals. The IQ imbalance compares the amplitude of the I signal with the amplitude of the Q signal, and outputs this different in dB. Within the present embodiments, it is not expected that the transmission path will introduce additional IQ imbalance, and therefore it is assumed that the source of any IQ imbalance arises from the transmitter and/or the receiver. Since receiver tolerance is defined herein at the input to the receiver, the required receiver tolerance will therefore be the same as the worst-case requirement for the transmitter. Additionally, lab testing has demonstrated that this level of IQ imbalance will not have a negative impact on system performance, and therefore, power and OSNR penalties are not significant considerations with respect to this Receiver Requirement. Nevertheless, the compliant transceiver should be configured to tolerate an IQ imbalance of 1 dB for the incoming signal.

To ensure the ability to receive signals successfully, the transceiver should also be configured to be able to receive signals that are within a certain offset of the defined channel grid, corresponding to the transmitter laser frequency accuracy defined above. In such cases, the transceiver should be configured to be capable of successfully receiving signals with a center frequency within +/−1.8 GHz of the DWDM grid, defined for example in Table 12, for any supported channel.

As described above, skew is defined as the inter-channel delay in the I-Q or X-Y branches, as seen by a receiver. In the exemplary embodiment, the receiver should be configured to tolerate the maximum I-Q and X-Y skews expected for the optical input signal in order to properly decode the symbols.

Quadrature skew may be generated by the transmitter, as described above, as well as by the receiver. Quadrature skew is not expected to change as the optical signal propagates through network, so the quadrature skew of the optical input signal to the receiver will be the same as the transmitter quadrature skew. As a result, the quadrature skew tolerance by a receiver need be only related to the transmitter quadrature skew and skew variation. Accordingly the compliant transceiver should be configured to have a minimum receiver quadrature skew tolerance of 1 ps for the incoming optical signal.

Polarization skew seen at a receiver DSP represents the combination of polarization skew (or DGD) generated by the transmitter, the optical fiber, the receiver, and other optical components in the link. Accordingly, a compliant transceiver should be configured to tolerate 30 ps polarization skew or DGD approximately equal to the 10 ps PMD tolerance defined above. The transceiver may also be configured to have a minimum receiver polarization skew tolerance of 30 ps for the incoming optical signal as seen by the receiver.

FIG. 52 is a schematic illustration depicting an exemplary receiver reflectance effect 5200. In the exemplary embodiment, receiver reflectance effect 5200 is described with respect to the 200G QPSK operational mode. In exemplary operation, some amount of the light arriving at a receiver 5202 of a transceiver 5204 will be reflected back into the fiber plant that connects receiver 5202 to the light source (e.g., from a network 5206). Reflections can contribute to noise at receiver 5202, and therefore should be controlled The reflectance of receiver 5202 is represented, in dB, as the ratio of reflected light power to the incident light power according to $R = 10 \log_{10}(P_R/P_I)$. In the exemplary embodiment, the compliant transceiver is therefore configured to have an maximum reflectance of ≤−20 dB or less from the receiver.

In an optical link, an event such as a fiber break-triggered protection switch or transmitter failure may cause a loss of optical signal to the receiver. The data reacquisition time is thus defined as how soon the received signal may be demodulated with post-FEC error free performance as soon as the fiber link is re-established with a valid incoming signal. In an exemplary embodiment, the compliant transceiver should be configured to operate with a data reacquisition time of 250 ms or less.

In addition to the 200G QPSK embodiments described above, the present embodiments may also be effectively implemented in a 200G 16QAM PHY layer operational mode. More particularly, a P2P coherent optics transceiver is alternatively, or additionally, configured to operate at 200 Gbps (200G) utilizing 16QAM modulation. Deployment of DWDM multiplexers are being anticipated in the field, which operate with 50 GHz channel spacing prior to the availability of coherent optic transceivers compliant with this specification. In order to avoid the cost of replacing such equipment, some operators are requesting a solution for 200G operation that will fit within a 50 GHz channel spacing. Accordingly, to meet this need, this specification also defines a mode for achieving 200G operation utilizing 16QAM modulation.

As the use case for the 200G 16QAM mode is expected to be more limited than the 200G QPSK mode, this mode is, at present, described as optional rather than mandatory. In addition, the present embodiments further include operational parameters and requirements for providing interoperability when operating in the 200G 16QAM mode, with less emphasis on mandatory optical performance. It is expected that an end customer requiring a 16QAM mode of operation will seek define their own requirements for the optical parameters. Accordingly, the requirements for the 200G 16QAM mode may be described, at present, as being contained within the single category of Common Requirements, which apply to both the transmit and receive operation of the transceiver.

For the symbol rate of this mode, the value of 31.5697339615 Gbaud was determined in order to allow 200 Gbps transmission of data as described herein, and the symbol rate accuracy enables the successful reception of the signal for this mode as well. If the transceiver supports the 200G 16-QAM mode of operation, then the transceiver should also be configured to support a symbol rate of 31.5697339615 Gbaud with the 16QAM modulation format, and should also be able to maintain the accuracy of the symbol rate of +/−20 ppm.

FIG. 53 is a graphical illustration of an exemplary constellation 5300. In the embodiment depicted in FIG. 53, constellation 5300 represents a 200G 16-QAM constellation. That is, because an optional modulation format for 200G is DP-16QAM, each polarization (Xpol, Ypol) of the I and Q carriers may be amplitude modulated to provide four symbols which leads to a sixteen symbol alphabet for the combined IQ system. Each of the resultant sixteen IQ symbols thus represents four bits, two of which select the amplitude of the I component, while the other two determine the amplitude of the Q component. The mapping of these data bits to constellation symbols is described above. In this embodiment, the shape of symbol constellation 5300 is square, and the respective abscissa and ordinate represent the relative amplitudes of the modulated I and Q components of the signal. The coordinates of the constellation points in the IQ plane are listed in Table 13, below.

TABLE 13

| -3, 3  | -1, 3  | 1, 3  | 3, 3  |
| -3, 1  | -1, 1  | 1, 1  | 3, 1  |
| -3, -1 | -1, -1 | 1, -1 | 3, -1 |
| -3, -3 | -1, -3 | 1, -3 | 3, -3 |

Accordingly, if the transceiver supports the 200G 16QAM mode of operation, then the transceiver should be configured to also support DP-16QAM modulation for the 200G signaling rate, and will also use a square constellation with symbols located according to Table 13, illustrated in FIG. 53, and utilizing the symbol mapping processes described above.

DP-16-QAM transmits 8 bits per symbol. Therefore, the line rate=8× symbol rate. Accordingly, if the transceiver supports the 200G 16-QAM mode of operation, then the transceiver should support a nominal signal line rate of 252,557,871.7 kbit/s.

In order to enable interoperability between transceivers operating in DWDM environments, and to interoperate with existing DWDM systems and equipment, the compliant transceiver may be further configured to adopt a subset of the channels identified in ITU-T G.694.1, using a 50 GHz channel spacing. More particularly, Table 14, below, lists the specific DWDM wavelengths, frequencies, and associated channel numbers on which compliant transceivers may operate.

TABLE 14

| Channel Number | Central Frequency (GHz) | Central Wavelength (nm) |
|---|---|---|
| 13.0 | 191300 | 1567.13 |
| 13.5 | 191350 | 1566.72 |
| 14.0 | 191400 | 1566.31 |
| 14.5 | 191450 | 1565.90 |
| 15.0 | 191500 | 1565.50 |
| 15.5 | 191550 | 1565.09 |
| 16.0 | 191600 | 1564.68 |
| 16.5 | 191650 | 1564.27 |
| 17.0 | 191700 | 1563.86 |
| 17.5 | 191750 | 1563.45 |
| 18.0 | 191800 | 1563.05 |
| 18.5 | 191850 | 1562.64 |
| 19.0 | 191900 | 1562.23 |
| 19.5 | 191950 | 1561.83 |
| 20.0 | 192000 | 1561.42 |
| 20.5 | 192050 | 1561.01 |
| 21.0 | 192100 | 1560.61 |
| 21.5 | 192150 | 1560.20 |
| 22.0 | 192200 | 1559.79 |
| 22.5 | 192250 | 1559.39 |
| 23.0 | 192300 | 1558.98 |
| 23.5 | 192350 | 1558.58 |
| 24.0 | 192400 | 1558.17 |
| 24.5 | 192450 | 1557.77 |
| 25.0 | 192500 | 1557.36 |
| 25.5 | 192550 | 1556.96 |
| 26.0 | 192600 | 1556.55 |
| 26.5 | 192650 | 1556.15 |
| 27.0 | 192700 | 1555.75 |
| 27.5 | 192750 | 1555.34 |
| 28.0 | 192800 | 1554.94 |
| 28.5 | 192850 | 1554.54 |
| 29.0 | 192900 | 1554.13 |
| 29.5 | 192950 | 1553.73 |
| 30.0 | 193000 | 1553.33 |
| 30.5 | 193050 | 1552.93 |
| 31.0 | 193100 | 1552.52 |
| 31.5 | 193150 | 1552.12 |
| 32.0 | 193200 | 1551.72 |
| 32.5 | 193250 | 1551.32 |
| 33.0 | 193300 | 1550.92 |
| 33.5 | 193350 | 1550.52 |
| 34.0 | 193400 | 1550.12 |
| 34.5 | 193450 | 1549.72 |
| 35.0 | 193500 | 1549.32 |
| 35.5 | 193550 | 1548.91 |
| 36.0 | 193600 | 1548.51 |
| 36.5 | 193650 | 1548.11 |
| 37.0 | 193700 | 1547.72 |
| 37.5 | 193750 | 1547.32 |
| 38.0 | 193800 | 1546.92 |
| 38.5 | 193850 | 1546.52 |
| 39.0 | 193900 | 1546.12 |
| 39.5 | 193950 | 1545.72 |
| 40.0 | 194000 | 1545.32 |
| 40.5 | 194050 | 1544.92 |
| 41.0 | 194100 | 1544.53 |
| 41.5 | 194150 | 1544.13 |
| 42.0 | 194200 | 1543.73 |
| 42.5 | 194250 | 1543.33 |
| 43.0 | 194300 | 1542.94 |
| 43.5 | 194350 | 1542.54 |
| 44.0 | 194400 | 1542.14 |
| 44.5 | 194450 | 1541.75 |
| 45.0 | 194500 | 1541.35 |
| 45.5 | 194550 | 1540.95 |
| 46.0 | 194600 | 1540.56 |
| 46.5 | 194650 | 1540.16 |
| 47.0 | 194700 | 1539.77 |
| 47.5 | 194750 | 1539.37 |
| 48.0 | 194800 | 1538.98 |
| 48.5 | 194850 | 1538.58 |
| 49.0 | 194900 | 1538.19 |
| 49.5 | 194950 | 1537.79 |
| 50.0 | 195000 | 1537.40 |
| 50.5 | 195050 | 1537.00 |
| 51.0 | 195100 | 1536.61 |
| 51.5 | 195150 | 1536.22 |
| 52.0 | 195200 | 1535.82 |
| 52.5 | 195250 | 1535.43 |
| 53.0 | 195300 | 1535.04 |
| 53.5 | 195350 | 1534.64 |
| 54.0 | 195400 | 1534.25 |
| 54.5 | 195450 | 1533.86 |
| 55.0 | 195500 | 1533.47 |
| 55.5 | 195550 | 1533.07 |
| 56.0 | 195600 | 1532.68 |
| 56.5 | 195650 | 1532.29 |
| 57.0 | 195700 | 1531.90 |
| 57.5 | 195750 | 1531.51 |
| 58.0 | 195800 | 1531.12 |
| 58.5 | 195850 | 1530.72 |
| 59.0 | 195900 | 1530.33 |
| 59.5 | 195950 | 1529.94 |
| 60.0 | 196000 | 1529.55 |
| 60.5 | 196050 | 1529.16 |
| 61.0 | 196100 | 1528.77 |
| 61.5 | 196150 | 1528.38 |
| 62.0 | 196200 | 1527.99 |

Therefore, in order to transmit a line rate of 200 Gb/s using the DP-16QAM modulation format, the symbol rate is approximately 32 Gbaud. When the light is modulated at this symbol rate, the optical signal bandwidth is at least 32 GHz. The wavelength filters in DWDM multiplexers and demultiplexers should thus be configured to have a bandwidth wide enough to pass the optical signal. In this case, the wavelength filters used in the 50 GHz channel spacing plan have sufficient bandwidth to pass the optical signal. Also, wavelength filters used in the 100 GHz channel spacing plan have sufficient bandwidth to pass the optical signal.

In order to enable low-cost implementations, transceivers may again only be required to support one channel from Table 14. However, in order to support greater flexibility, the devices may also be permitted to support multiple channels thereof, and may further include all channels of the list, or substantial portions thereof, and report any and all channels which are supported, and further include the channel assignment mechanism and related functionality described above with respect to the 200G QPSK mode embodiments, which use the relevant management interface definition for the form factor of the transceiver module.

The systems and methods described herein are therefore of particular advantage with respect the access network, whether for the cable environment or other telecommunication application, and may be implemented with respect to 4G, 5G, and 6G networks and related applications, as well as fronthaul, backhaul, and midhaul deployments, and for both the short- and longhaul environments.

Exemplary embodiments of coherent optics systems and methods for communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An interface subsystem for an access network, comprising:
    a coherent optical transceiver comprising (i) a transmitting portion, (ii) a receiving portion, and (iii) a switching mechanism configured to switch operation of the coherent optical transceiver between a first operational mode compliant with a first physical layer specification and a second operational mode compliant with a second physical layer specification different from the first physical layer specification;
    a control layer;
    a pre-interface portion comprising a framing unit, wherein the framing unit includes (i) a forward error correction (FEC) coding unit, (ii) an Ethernet mapping unit, and (iii) an optical transport network (OTN) framing module;
    an electrical interface portion in operable communication with the framing unit, and configured to transmit and receive first and second separate input 100 GbE electrical signals on a host side of the interface subsystem, wherein each of the first and second input electrical signals is according to the first operational mode;
    an optical interface portion in operable communication with the coherent optical transceiver, and configured (i) for 200G optical transport, (ii) to, on a line side of the interface subsystem, transmit and receive optical signals to and from, respectively, an optical transport medium coupled to the line side of the interface subsystem, wherein the transmitted and received optical signals are according to the second operational mode;
    a management interface portion in operable communication with the control layer; and
    a directional element disposed at the line side between the optical interface portion and the coherent optical transceiver,
    wherein the directional element is configured to route optical signals from the transmitting portion to the optical transport medium, and optical signals from the optical transport medium to the receiving portion,
    wherein the optical interface portion comprises a dual interface architecture between the directional element and the coherent optical transceiver,
    wherein the transmitting portion and the receiving portion are coupled with the optical transport medium through separate respective portions of the dual interface architecture,
    wherein the electrical interface portion includes a mapping unit configured to individually process the first and second separate input 100 GbE electrical signals into a dual 100G frame structure, and a multiplexing unit configured to interleave the dual 100G frame structure into a single-output 200G frame structure, and
    wherein the pre-interface portion is configured to integrate open FEC (oFEC) onto the single-output 200G frame structure in a continuous operation.

2. The interface subsystem of claim 1, wherein the first operational mode is a 100G mode and the second operational mode is a 200G mode.

3. The interface subsystem of claim 2, wherein the particular mode is the 100G mode, and wherein the electrical signals on the host side include a 100 Gigabit Ethernet (GbE) host.

4. The interface subsystem of claim 1, wherein the transmitting portion comprises at least one of a symbol mapping unit, a linear and nonlinear pre-emphasis unit, a digital-to-analog converter, and an I/Q modulation and polarization combining unit.

5. The interface subsystem of claim 4, wherein the receiving portion comprises at least one of an I/Q detection unit, an analog-to-digital converter (ADC), a deskew and orthogonality compensation unit, a chromatic dispersion compensation unit, a polarization mode dispersion compensation unit, a polarization multiplexing unit, a clock recovery unit, a carrier frequency offset compensation unit, a carrier phase compensation unit, a symbol demapping unit, an FEC decoding unit, an Ethernet demapping unit, and an OTN framing module.

6. The interface subsystem of claim 4, wherein the receiving portion further comprises a feedback loop to the ADC from at least one of the deskew and orthogonality compensation unit, the chromatic dispersion compensation unit, the polarization mode dispersion compensation unit, the polarization multiplexing unit, and the clock recovery unit.

7. The interface subsystem of claim 4, wherein the directional element is further configured to couple the optical transport medium with the I/Q modulation and polarization combining unit of the transmitting portion.

8. The interface subsystem of claim 7, wherein the directional element is further configured to couple the optical transport medium with the I/Q detection unit of the receiving portion.

9. The interface subsystem of claim 2, wherein the directional element comprises a single interface structure between the optical transport medium and the dual interface architecture.

10. The interface subsystem of claim 1, wherein the coherent optical transceiver further comprises a symbol mapper configured to map frames of the 200G frame structure into optical polarization constellation symbols for transport over the optical transport medium.

11. An interface subsystem for an access network, comprising:
a coherent optical transceiver comprising (i) a transmitting portion, (ii) a receiving portion, and (iii) a switching mechanism configured to switch operation of the coherent optical transceiver between a 100G operational mode compliant with a first physical layer specification and a 200G operational mode compliant with a second physical layer specification different from the first physical layer specification;
a control layer;
a pre-interface portion comprising a forward error correction (FEC) encoder and a framing unit including a physical coding sublayer (PCS) and an optical transport network (OTN) module;
an electrical interface portion in operable communication with the framing unit, and configured to transmit and receive first and second separate input 100 GbE electrical signals on a host side of the interface subsystem;
an optical interface portion in operable communication with the coherent optical transceiver, and configured (i) for 200G optical transport, (ii) to, on a line side of the interface subsystem, transmit and receive optical signals to and from, respectively, an optical transport medium coupled to the line side of the interface subsystem, wherein the transmitted and received optical signals are according to the 200G operational mode; and
a management interface portion in operable communication with the control layer,
wherein the control layer is configured for operable communication with the framing unit and the coherent optical transceiver,
wherein the PCS is configured to encode and convey the electrical signals received at the host side to the transmitting portion of the coherent optical transceiver,
wherein the electrical interface portion includes a mapping unit configured to individually process the first and second separate input 100 GbE electrical signals into a dual 100G frame structure, and a multiplexing unit configured to interleave the dual 100G frame structure into a single-output 200G frame structure, and
wherein the pre-interface portion is configured to integrate open FEC (oFEC) onto the single-output 200G frame structure in a continuous operation.

12. The interface subsystem of claim 11, wherein the transmitting portion comprises at least one of frame generator, a first bit interleaver, and a first bit de-interleaver.

13. The interface subsystem of claim 12, wherein the FEC encoder is configured to implement differential coding onto the optical signals in the continuous operation.

14. The interface subsystem of claim 12, wherein the FEC encoder is configured to code successive blocks of the optical signals into a codeword matrix in the continuous operation.

* * * * *